US008970518B2

(12) United States Patent
Ujiie et al.

(10) Patent No.: US 8,970,518 B2
(45) Date of Patent: Mar. 3, 2015

(54) CLICK POSITION CONTROL APPARATUS, CLICK POSITION CONTROL METHOD, AND TOUCH SENSOR SYSTEM

(75) Inventors: Yoshihiro Ujiie, Osaka (JP); Susumu Kobayashi, Kyoto (JP); Masaki Yamauchi, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 490 days.

(21) Appl. No.: 13/318,633

(22) PCT Filed: Feb. 14, 2011

(86) PCT No.: PCT/JP2011/000783
§ 371 (c)(1),
(2), (4) Date: Nov. 3, 2011

(87) PCT Pub. No.: WO2011/111302
PCT Pub. Date: Sep. 15, 2011

(65) Prior Publication Data
US 2012/0056730 A1 Mar. 8, 2012

(30) Foreign Application Priority Data

Mar. 10, 2010 (JP) ................................ 2010-053820

(51) Int. Cl.
*G06F 3/041* (2006.01)
*G06F 3/0354* (2013.01)
(Continued)

(52) U.S. Cl.
CPC ............ *G06F 3/03547* (2013.01); *G06F 3/038* (2013.01); *H04N 21/42224* (2013.01)
USPC ........................................................ 345/173

(58) Field of Classification Search
CPC combination set(s) only.
See application file for complete search history.

(56) References Cited

U.S. PATENT DOCUMENTS 7,254,775 B2   8/2007   Geaghan et al.
7,315,300 B2   1/2008   Hill et al.
(Continued)

FOREIGN PATENT DOCUMENTS

CN   1596412   3/2005
CN   1902573   1/2007
(Continued)

OTHER PUBLICATIONS

International Search Report issued Mar. 8, 2011 in International (PCT) Application No. PCT/JP2011/000783.
(Continued)

*Primary Examiner* — William Boddie
*Assistant Examiner* — Jeffrey A Parker
(74) *Attorney, Agent, or Firm* — Wenderoth, Lind & Ponack, L.L.P.

(57) ABSTRACT

A click position control apparatus that controls a click position on a touch sensor clicked by a user when the user operates an input device including a clickable touch sensor including the touch sensor and a click detecting unit, the click position control apparatus including: a touch position information generating unit which generates touch position information indicating a position on the touch sensor touched by the user; a click judging unit which detects a click on the click detecting unit; a click position information generating unit which generates click position information indicating a click position when the click is detected; and a correcting unit which corrects the click position information based on a positional relationship between a reference position on the input device and the click position.

17 Claims, 35 Drawing Sheets

(51) Int. Cl.
*G06F 3/038* (2013.01)
*H04N 21/422* (2011.01)

(56) References Cited

U.S. PATENT DOCUMENTS

| | | | |
|---|---|---|---|
| 8,552,977 | B2 | 10/2013 | Yamamoto et al. |
| 8,552,997 | B2 | 10/2013 | Paleczny |
| 2003/0063073 | A1 | 4/2003 | Geaghan et al. |
| 2005/0146511 | A1 | 7/2005 | Hill et al. |
| 2006/0139340 | A1 | 6/2006 | Geaghan |
| 2007/0236478 | A1 | 10/2007 | Geaghan et al. |
| 2010/0013777 | A1* | 1/2010 | Baudisch et al. ............ 345/173 |
| 2010/0289754 | A1* | 11/2010 | Sleeman et al. ............ 345/173 |
| 2011/0199289 | A1 | 8/2011 | Yamamoto et al. |

FOREIGN PATENT DOCUMENTS

| | | |
|---|---|---|
| CN | 101611371 | 12/2009 |
| JP | 3-196211 | 8/1991 |
| JP | 2004-518188 | 6/2004 |
| JP | 2008-242958 | 10/2008 |
| JP | 2008-276369 | 11/2008 |
| WO | 02/35461 | 5/2002 |

OTHER PUBLICATIONS

Office Action with Search Report mailed Sep. 3, 2014 in corresponding Chinese Application No. 201180001976.5, with English language translation of Search Report.

* cited by examiner

FIG. 4B
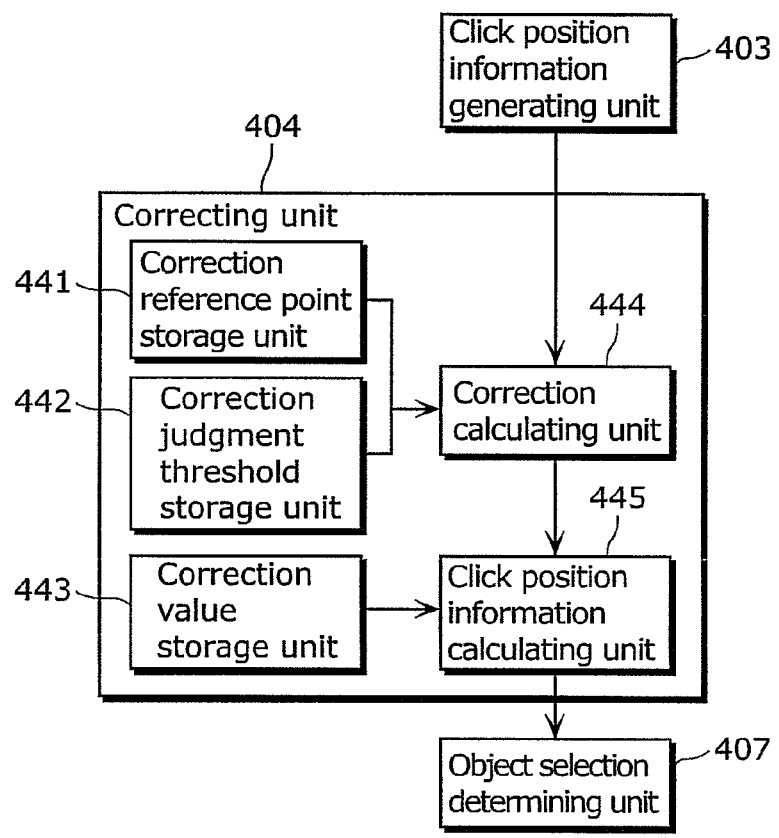
FIG. 5
| Correction reference point 301 | Click position 302 | Correction judgment distance 306 |
|---|---|---|
| (0, 0) | (200, 200) | 280 |
| (0, 0) | (300, 300) | 420 |
FIG. 6
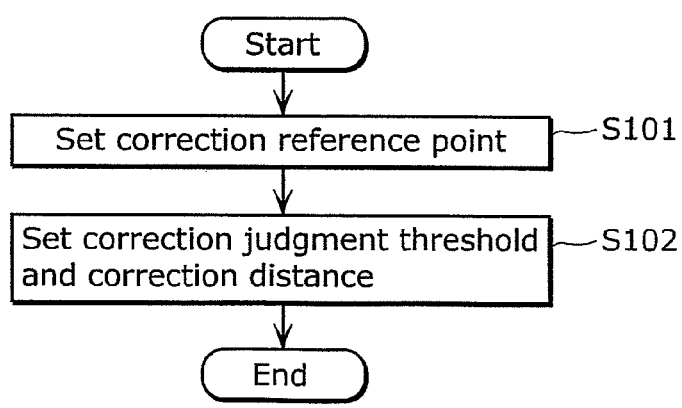

| Correction reference point 301 | Correction judgment threshold 501 | Correction distance 305 |
|---|---|---|
| (0, 0) | 300 | 20 |

| Correction reference point 301 | Correction judgment threshold 501 | Correction distance 305 |
|---|---|---|
| (0, 0) | 300 | 20 |
| (0, 0) | 400 | 30 |

FIG. 10

| Time 702 (ms) | Cursor position 703 |
|---|---|
| 30 | (480, 135) |
| 60 | (360, 160) |
| 90 | (355, 280) |
| 120 | (315, 300) |
| 150 | (300, 300) |

701

| Correction reference point 301 | Correction judgment threshold 501 | Correction amount of time 901 (ms) |
|---|---|---|
| (0, 0) | 300 | 30 |

| Correction reference point 301 | Correction judgment threshold 501 | Correction distance 1001 |
|---|---|---|
| (0, 0) | 300 | 20 |

FIG. 19

| Time 702 (ms) | Cursor position 703 | Click intensity 1302 |
|---|---|---|
| 30 | (480, 135) | 20 |
| 60 | (360, 160) | 40 |
| 90 | (355, 280) | 60 |
| 120 | (315, 300) | 80 |
| 150 | (300, 300) | 100 |

| Correction reference point 301 | Correction judgment threshold 501 | Click intensity threshold 1401 |
|---|---|---|
| (0, 0) | 300 | 60 |

| Information ID 1901 | Click position 1702 | Correction reference point 1701 | Correction judgment distance 1706 |
|---|---|---|---|
| Left | (200, 200) | (0, 0) | 280 |
| Right | (660, 300) | (960, 0) | 420 |
| Right | (860, 100) | (960, 0) | 140 |

| Information ID 1901 | Correction reference point 1701 | Correction judgment threshold 2002 | Correction distance 1705 |
|---|---|---|---|
| Left | (0, 0) | 300 | 20 |
| Right | (960, 0) | 300 | 20 |

2001

| Information ID 1901 | Correction reference point 1701 | Correction judgment threshold 2002 | Correction distance 1705 |
|---|---|---|---|
| Right | (960, 0) | 300 | 20 |

| Information ID 1901 | Time 2502 (ms) | Cursor position 2503 |
|---|---|---|
| Left | 30 | (150, 90) |
| Right | 30 | (520, 235) |
| Left | 60 | (180, 90) |
| Right | 60 | (580, 260) |
| Left | 90 | (195, 95) |
| Right | 90 | (640, 260) |
| Left | 120 | (160, 85) |
| Right | 120 | (640, 300) |
| Left | 150 | (100, 90) |
| Right | 150 | (660, 300) |

2501

| Information ID 1901 | Correction reference point 1701 | Correction judgment threshold 2002 | Correction amount of time 2702 (ms) |
|---|---|---|---|
| Left | (0, 0) | 300 | 30 |
| Right | (960, 0) | 300 | 30 |

2701

| Information ID 1901 | Correction reference point 1701 | Correction judgment threshold 2002 | Correction amount of time 2702 (ms) |
|---|---|---|---|
| Right | (0, 0) | 400 | 30 |

2801

| Information ID 1901 | Correction reference point 1701 | Correction judgment threshold 2002 | Correction distance 2902 |
|---|---|---|---|
| Left | (0, 0) | 300 | 15 |
| Right | (960, 0) | 300 | 25 |

2901

| Information ID 1901 | Correction reference point 1701 | Correction judgment threshold 2002 | Correction distance 2902 |
|---|---|---|---|
| Right | (0, 0) | 300 | 15 |

| Information ID 1901 | Time 2502 (ms) | Cursor position 2503 | Click intensity 3402 |
|---|---|---|---|
| Left | 30 | (150, 90) | 0 |
| Right | 30 | (520, 235) | 20 |
| Left | 60 | (180, 90) | 0 |
| Right | 60 | (580, 260) | 40 |
| Left | 90 | (195, 95) | 0 |
| Right | 90 | (640, 260) | 60 |
| Left | 120 | (160, 85) | 0 |
| Right | 120 | (640, 300) | 80 |
| Left | 150 | (100, 90) | 0 |
| Right | 150 | (660, 300) | 100 |

| Information ID 1901 | Correction reference point 1701 | Correction judgment threshold 2002 | Click intensity threshold 3502 |
|---|---|---|---|
| Left | (0, 0) | 300 | 60 |
| Right | (960, 0) | 300 | 60 |

3501

CLICK POSITION CONTROL APPARATUS, CLICK POSITION CONTROL METHOD, AND TOUCH SENSOR SYSTEM

TECHNICAL FIELD

The present invention relates to a click position control apparatus, a click position control method, and a touch sensor system that control a click position when a clickable touch sensor is clicked.

BACKGROUND ART

Recent CE (Consumer Electronics) apparatuses such as TV sets and BD recorders include network-ready applications to provide ways of use that are different from conventional TV viewing. Network-ready applications are applications such as video viewing using a network and photo viewers, for example. Cross keys, ten-keys and the like on existing remote controls do not allow sufficiently comfortable operations on these applications. Therefore there is a growing need for a new input device.

As such a new input device, a remote control using a clickable touch sensor that has a symmetric shape in both vertical and horizontal directions and provides a plurality of ways of holding to users has been developed. The clickable touch sensor includes a touch sensor which detects the position where a user is touching and a switch which is disposed under the touch sensor and is pressed when the user clicks the touch sensor.

To commercialize this remote control, robustness needs to be improved to withstand practical use by ordinary users and, in particular, unintended operation errors by users need to be prevented. An operation error can occur because there is a region where a finger used for the click operation deflects due to the structural makeup of the finger and the click operation cannot be performed at intended coordinates. For example, when a user operates the touch sensor with a finger (thumb, for example) while holding the remote control, it is difficult for the user to accurately press the touch sensor in the direction normal to the touch sensor and the press slightly deviates in the direction in which the finger (thumb) is bent. That is, a deflection of click occurs.

That is, there is a difference between the position where the user intentionally clicks on a touch sensor and the position where the user's click is actually detected because of an effect such as a deflection of click. The difference causes an operation error.

To prevent operation errors, PTL 1 discloses an input device having one or more buttons displayed on a touch panel to be pressed to perform an input, wherein correction is made. In the input device disclosed in PTL 1, a history of press operations performed on the tough panel by a user is maintained and when a pressed point is located out of a contact judgment range of a button displayed in a screen, the operation history of the past press operations performed up to that time is used to make rejudgment. If it is determined as a result of the rejudgment that one button has been pressed, the contact judgment range of the button is corrected to include the pressed point in the contact judgment range of the button.

CITATION LIST

Patent Literature

[PTL 1]
Japanese Unexamined Patent Application Publication No. 2008-242958

SUMMARY OF INVENTION

Technical Problem

However, the existing configuration described above has the following problems.

Because the apparatus in Patent Literature 1 uses an operation history of user's press operations for correcting a click position, no correction can be made until a certain amount of operation history of user's press operations is accumulated. Furthermore, when a history of press operations is not held, such as when the user is changed, no correction can be made.

Therefore, the present invention has been made to solve the conventional problem and an object of the present invention is to provide a click position control apparatus, a click position control method, and a touch sensor system that are capable of preventing operation errors in click operations on an input device including a clickable touch sensor without needing an operation history.

Solution to Problem

In order to solve the problem, a click position control apparatus according to an aspect of the present invention is a click position control apparatus that controls a click position on a touch sensor clicked by a user when the user operates an input device including a clickable touch sensor including the touch sensor and a click detecting unit which is disposed under the touch sensor and is pressed when the user clicks the touch sensor, the click position control apparatus including: a touch position information generating unit configured to generate touch position information indicating a position on the touch sensor touched by the user; a click judging unit configured to detect a click on the click detecting unit; a click position information generating unit configured to generate click position information indicating a click position by using the touch position information when the click judging unit detects the click on the click detecting unit, the click position being a position at which the click detecting unit is pressed; and a correcting unit configured to correct the click position information on the basis of a positional relationship between at least one reference position on the input device and the click position, the at least one reference position being indicated in predetermined correction information.

Accordingly, because correction is made on the basis of a positional relationship between a predetermined reference position and a click position, information such as an operation history does not need to be stored for each individual user and operation errors can be prevented without needing an operation history.

Moreover, the correction information may further indicate a predetermined distance threshold, and the correcting unit may correct the click position information when a distance between the reference position and the click position is equal to or greater than the distance threshold.

With this configuration, the amount of processing can be reduced because correction is made when the distance between a reference position and a click position is equal to or greater than a distance threshold, and therefore correction does not need to be made when the click position is close to the reference position and therefore the possibility of occurrence of a deflection of click is low. In other words, when a click position is away from the reference position and therefore the possibility of occurrence of a deflection of click is high, the click position can be reliably corrected and an operation error can be prevented.

Furthermore, the correction information may further indicate a predetermined correction distance, and the correcting unit may correct the click position information so that the click position corrected is a position at the correction distance from the click position and in a direction from the reference position toward the click position.

With this configuration, when a click position is away from a reference position, an operation error can be prevented by correcting the click position by a predetermined correction distance in the direction from the reference position toward the click position, because in such a case a deflection of click can occur in the direction from the click position toward the reference position.

Moreover, the touch position information may further indicate a time at which the user has touched the touch sensor, the click position control apparatus may further include a storage unit configured to store a plurality of pieces of touch position information including the touch position information, and the correcting unit may correct the click position information with reference to the pieces of touch position information stored in the storage unit.

With this configuration, a click position can be more accurately corrected to a position intended by the user because the correction is performed on the basis of a trajectory of touch positions on the touch sensor.

Furthermore, the click position information may further indicate a time at which the click detecting unit is pressed, the correction information may further indicate a predetermined correction amount of time, and the correcting unit may correct the click position information with reference to the pieces of touch position information stored in the storage unit so that the click position corrected is a position indicated in one of the pieces of touch position information which indicates a time which precedes the time indicated in the click position information by the correction amount of time.

With this configuration, an operation error can be prevented because a click position is corrected to a touch position indicating a time a correction amount of time before the time at which the click position has been detected, that is, the click position can be corrected to a position touched at a time before the occurrence of a deflection of click.

Moreover, the correction information may further indicate a predetermined correction distance, and the correcting unit may correct the click position information so that the click position corrected is, among positions indicated in the pieces of touch position information stored in the storage unit, a position closest to a position at the correction distance from the click position indicated in the click position information.

With this configuration, an operation error can be prevented because a click position is corrected to a touch position closest to a position at a correction distance from the click position, that is, the click position can be corrected to a position touched before the occurrence of a deflection of click.

Furthermore, the correcting unit may correct the click position information so that the click position corrected is, among the positions indicated in the pieces of touch position information stored in the storage unit, a position closest to a position at the correction distance from the click position indicated in the click position information along a trajectory of the touch position information.

With this configuration, more accurate correction can be made because a click position is corrected to a touch position closest to a position at a correction distance from the click position along the trajectory.

Moreover, the click detecting unit may be a pressure sensor which detects intensity of a click on the touch sensor by the user, the correction information may further indicate predetermined correction intensity, the click judging unit may: generate intensity information indicating intensity obtained from the pressure sensor; and detect the click on the click detecting unit when the intensity obtained from the pressure sensor is equal to or greater than a predetermined reference intensity value, the storage unit may further store the intensity information and the touch position information in association with each other, and the correcting unit may correct the click position information with reference to a plurality of pieces of intensity information and the pieces of touch position information stored in the storage unit so that the click position corrected is a position indicated in the touch position information associated with the intensity information indicating the intensity equal to or greater than the correction intensity, the pieces of intensity information including the intensity information.

With this configuration, a click position at the time when intensity at click position detection, namely click intensity, has become equal to or greater than reference click intensity is corrected to a touch position at which the click intensity has become equal to or greater than click intensity which is lower than the reference intensity value. Thus, the click position can be corrected to the position touched before occurrence of a deflection of click and an operation error can be prevented.

Furthermore, the click detecting unit may be a pressure sensor which detects intensity of a click on the touch sensor by the user, and the click judging unit may detect the click on the click detecting unit when intensity obtained from the pressure sensor is equal to or greater than a predetermined reference intensity value.

With this configuration, more accurate correction can be made because intensity information can be used.

Moreover, the click position control apparatus may further include: a grip information generating unit configured to generate grip information indicating how the user is holding the input device; a correction information storage unit configured to store a plurality of pieces of correction information including the correction information; and a selecting unit configured to select one of the pieces of correction information on the basis of the grip information, wherein the correcting unit may correct the click position information using the correction information selected by the selecting unit.

With this configuration, a click position can be corrected and an operation error can be prevented even when the user changes the way of holding the input device, because a plurality of pieces of correction information are stored beforehand and one of the pieces of correction information is selected according to holding information indicating the way of holding the input device.

Furthermore, the click position control apparatus may further include: a user information storage unit configured to store user information indicating a characteristic of the user, wherein the selecting unit may further correct the selected correction information on the basis of the user information, and the correcting unit may correct the click position information using the correction information corrected by said selecting unit.

With this configuration more accurate correction can be made in a manner appropriate to the user because correction information is changed according to a characteristic of the user.

Moreover, the grip information may be information indicating that the input device is being held by a left hand, a right hand or both hands of the user.

Furthermore, the grip information may be information indicating a position at which a hand of the user is in contact with the input device.

Moreover, the grip information may be information indicating an orientation of the input device.

Furthermore, the reference position may be a position on the clickable touch sensor or on a perimeter of the clickable touch sensor.

Moreover, the reference position may be a position at which a base of a finger operating the clickable touch sensor is located.

Furthermore, the present invention can be realized as a touch sensor system. The touch sensor system according to another aspect of the present invention includes: an input device which includes a clickable touch sensor; and a click position control apparatus which controls a click position on a touch sensor clicked by a user when the user operates the input device, wherein the clickable touch sensor includes: the touch sensor; and a click detecting unit which is disposed under the touch sensor and is pressed when the user clicks the touch sensor; the click position control apparatus includes: a touch position information generating unit configured to generate touch position information indicating a position on the touch sensor touched by the user; a click judging unit configured to detect a click on the click detecting unit; a click position information generating unit configured to generate click position information indicating a click position by using the touch position information when the click judging unit detects the click on the click detecting unit, the click position being a position at which the click detecting unit is pressed; and a correcting unit configured to correct the click position information on the basis of a positional relationship between at least one reference position on the input device and the click position, the at least one reference position being indicated in predetermined correction information.

It is to be noted that the present invention can be realized not only as the click position control apparatus but also as a method having, as steps, the processing units included in the click position control apparatus. Moreover, the present invention may be realized as a program causing a computer to execute the steps. Furthermore, the present invention may be realized as a computer-readable recording medium having the program recorded thereon such as a CD-ROM (Compact Disc-Read Only Memory) as well as information, data, or signals indicating the program. The program, information, data, and signals may be distributed via a communication network such as the Internet.

Moreover, part or all of the constituent elements included in each of the click position control apparatuses may be included in one system large scale integration (LSI). The system LSI is a super-multifunctional LSI manufactured by integrating the constituent elements on one chip and is, specifically, a computer system including a micro processing unit, a ROM, a RAM (Random Access Memory), and so on.

Advantageous Effects of Invention

The click position control apparatus according to the present invention is capable of preventing operation errors in click operations on a remote control including a clickable touch sensor without needing an operation history.

BRIEF DESCRIPTION OF DRAWINGS

FIG. 4B is a block diagram illustrating an example of a correcting unit in the first embodiment of the present invention.

FIG. 5 shows specific exemplary values of a correction reference point, a click position, and a correction judgment distance in the first embodiment of the present invention.

FIG. 6 is a flowchart illustrating an example of operation for presetting parameters such as a correction reference point and a correction distance on the basis of correction information in the first embodiment of the present invention.

FIG. 10 shows exemplary values of series of cursor positions information which represents a trajectory of a cursor displayed on a display screen of the display apparatus in the second embodiment of the present invention.

FIG. 19 shows exemplary values of series of cursor positions information which represent a trajectory of a cursor displayed on a display screen of the display apparatus in the third variation of the second embodiment of the present invention.

FIG. 20 shows exemplary values of a correction reference point, a correction judgment threshold, and a click intensity threshold in the third variation of the second embodiment of the present invention.

FIG. 34 shows exemplary values of series of cursor positions information which represents a trajectory of a cursor displayed on a display screen of the display apparatus in the fourth embodiment of the present invention.

FIG. 46 shows exemplary values of series of cursor positions information which represents a trajectory of a left cursor and a trajectory of a right cursor displayed on a display screen of the display apparatus in the fourth variation of the fourth embodiment of the present invention.

FIG. 47 shows exemplary values of correction information in the fourth variation of the fourth embodiment of the present invention.

DESCRIPTION OF EMBODIMENTS

Embodiments of a click position control apparatus, a click position control method, and a touch sensor system according to the present invention will be described below with reference to drawings.

First Embodiment

A click position control apparatus according to a first embodiment of the present invention is an apparatus that controls a click position on a touch sensor clicked by a user when the user operates an input device that includes a clickable touch sensor including the touch sensor and a switch which is disposed under the touch sensor and is pressed when the user clicks the touch sensor. The click position control apparatus according to this embodiment is characterized in that a click position at which the switch is pressed is corrected on the basis of a positional relationship between the click position and a predetermined reference position. Specifically, the click position control apparatus according to the first embodiment corrects a click position information so that a corrected click position is at a position at a predetermined correction distance from the click position in a direction from the reference position toward the click position.

In the first embodiment of the present invention, an example is given in which uniform correction is made to click position information according to the distance between a point (a reference position) that serves as a benchmark on an input device and a click position (coordinates) indicating a user input on a clickable touch sensor.

Figure 1:
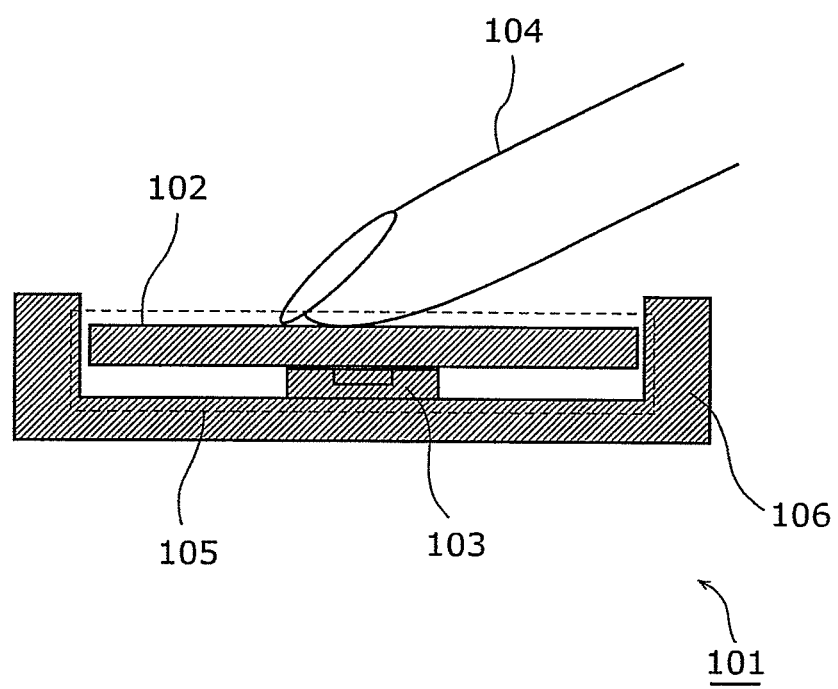
FIG. 1 is a cross sectional view illustrating an example of an input device in a first embodiment of the present invention.

FIG. 1 is a cross-sectional view illustrating an example of an input device 101 in the first embodiment of the present invention. As illustrated in FIG. 1, the input device 101 includes a clickable touch sensor 105 including a touch sensor 102 and a switch 103 and an enclosure 106.

The touch sensor 102 is an example of a sensor that detects a position touched by a user and moves downward when clicked by the user.

The switch 103 is an example of a click detecting unit according to the present invention, disposed under the touch sensor 102, and pressed when the user clicks the touch sensor 102. Specifically, the switch 103 is disposed under the touch sensor 102 and is integral with the touch sensor 102. When the user clicks the touch sensor 102 with a finger 104, the switch 103 integrally disposed is pressed.

The clickable touch sensor 105 is made up of the integrally disposed touch sensor 102 and switch 103. A technique to use a capacitive pad as the touch sensor 102 of the clickable touch sensor 105 to detect a position touched by a finger 104 is a well-known art and therefore description of such technique will be omitted.

Figure 2:
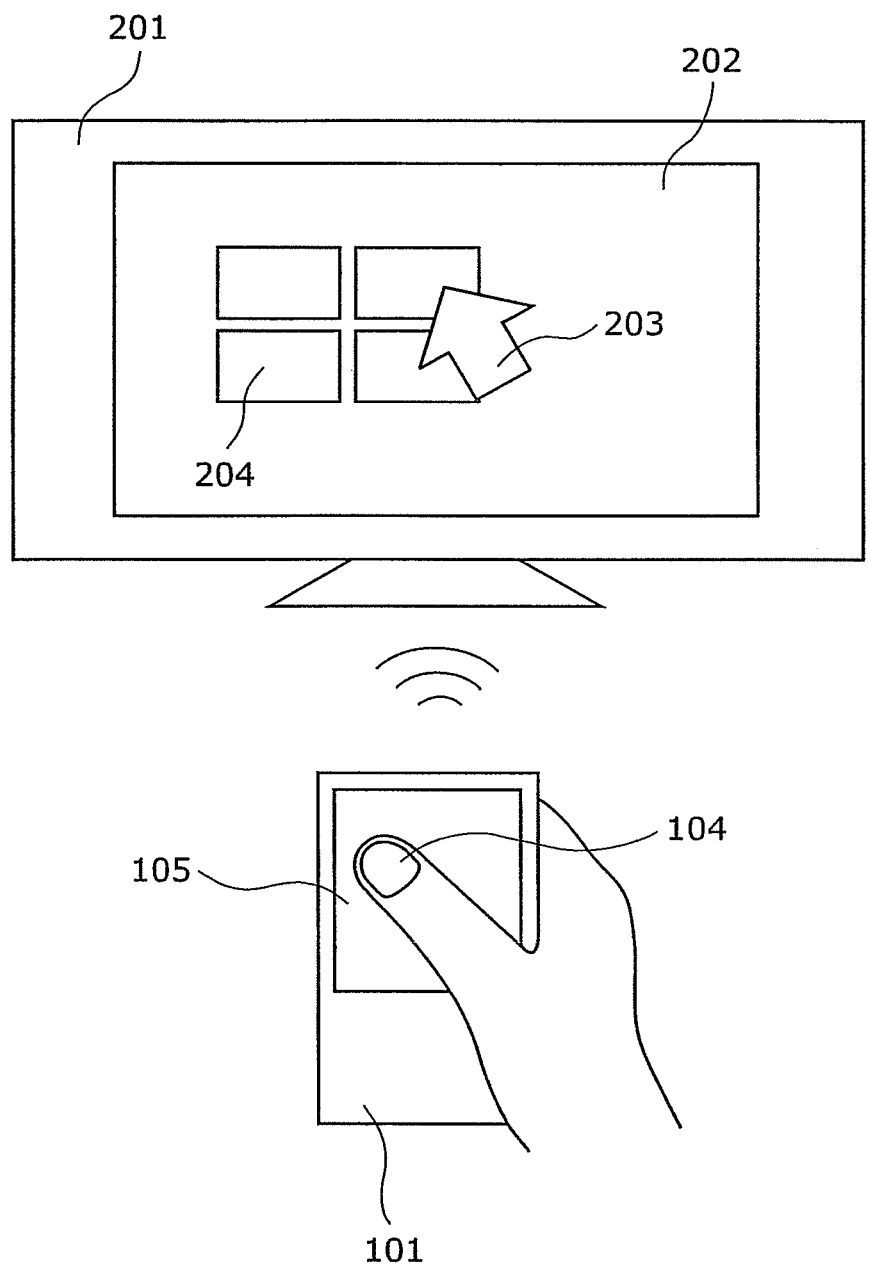
FIG. 2 is a schematic diagram illustrating an example of the input device and an example of a display apparatus in the first embodiment of the present invention.

FIG. 2 is a schematic diagram illustrating an example of the input device 101 and an example of a display apparatus 201 in the first embodiment of the present invention. In FIG. 2, the same elements as those in FIG. 1 are given the same reference numerals and description of those elements will be omitted.

The input device 101 provides, by wireless communication, a signal indicating a position being touched by a user's finger 104 on the clickable touch sensor 105 and a click signal indicating a click when the clickable touch sensor 105 is pressed to the display apparatus 201. A technology such as Bluetooth or ZigBee/IEEE 802.15.4 is used for the wireless communication, which is a well-known art and therefore description of such technology will be omitted here.

Based on the signal indicating the position provided from the input device 101, the display apparatus 201 obtains position information about a point being touched by the finger 104 on the clickable touch sensor 105 and displays a cursor 203 at a position within a display screen 202 that corresponds to the obtained position information. The user can manipulate the cursor 203 displayed on the display screen 202 by moving the finger 104 on the clickable touch sensor 105.

A coordinate system of the clickable touch sensor 105 and a coordinate system of the display screen 202 are associated with each other using absolute coordinates. Specifically, the coordinate systems are associated with each other on the basis of the ratio in size between the clickable touch sensor 105 and the display screen 202 (for example, widths in X-axis- and Y-axis-directions).

Assume for example that position information in the clickable touch sensor 105 is indicated in an X-coordinate range of 0 to 400 and a Y-coordinate range of 0 to 300 whereas position information in the display screen 202 is indicated in an X-coordinate range of 0 to 960 and a Y-coordinate range of 0 to 540. In this case, when the coordinates of a point in the clickable touch sensor 105 that is touched by a finger 104 of the user is (200, 150), the coordinate position of the cursor 203 displayed on the display screen 202 is (480, 270).

As the user moves the finger 104 on the clickable touch sensor 105, the cursor 203 in the display screen 202 moves. The user also can click the clickable touch sensor 105 at a time at which the finger overlaps an intended object 204.

At this point in time, the input device 101 detects the click on the touch sensor 102 by the user and provides a click signal to the display apparatus 201. The display apparatus 201 determines whether the object 204 is selected or not on the basis of a signal indicating the position and the click signal provided from the clickable touch sensor 105 and information indicating the display position of the object 204 displayed on the display screen 202.

For example, when the clickable touch sensor 105 is clicked while the coordinates of a point in the clickable touch sensor 105 that is touched by a finger of the user is (200, 150), the coordinate position (480, 270) at which the cursor 203 is currently displayed is recognized as a click position. When the coordinate position of the object 204 is (450, 200) and the size of the object 204 is 50 in an X-axis direction and 100 in a Y-axis direction, the display apparatus 201 determines that the object 204 is selected upon input of the coordinate position (480, 270) as a click position.

Figure 3:
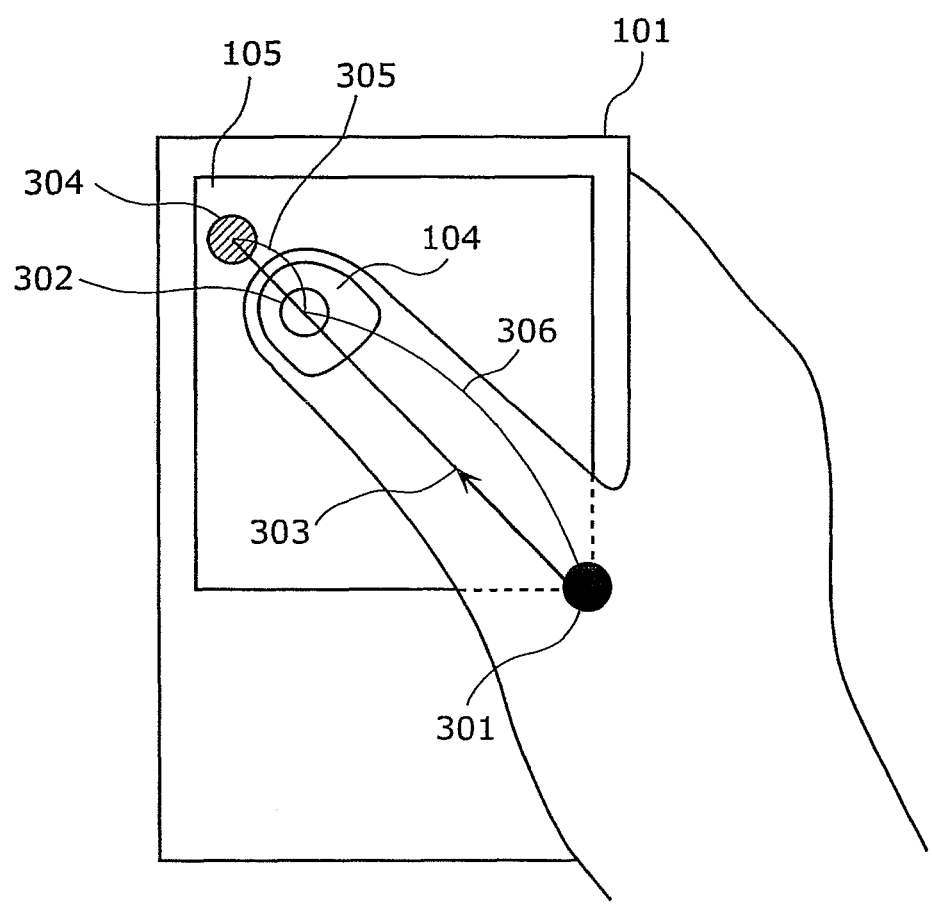
FIG. 3 is a diagram for explaining an example of correction of a click position in the first embodiment of the present invention.

FIG. 3 is a diagram for explaining an example of correction of a click position in the first embodiment of the present invention. In FIG. 3, the same elements as those in FIG. 1 are given the same reference numerals and description of those elements will be omitted.

First, a correction reference point 301 is defined at one point preset on the input device 101. The correction reference point 301 is a position at which the base of a finger with which the clickable touch sensor 105 is operated is expected to be located. Specifically, the correction reference point 301 is set on a perimeter of the touch sensor 102 at a point at which a portion of an operating finger of the user 104 other than the tip of the finger 104 contacts the input device 101. It should be noted that in the following description, coordinate values in the coordinate system of the display screen 202 that are converted from coordinate values of the correction reference point 301 on the clickable touch sensor 105 are used in all calculations using the correction reference point 301.

A click position 302 represents a position at which press of the switch 103 is detected when the switch 103 (not depicted in FIG. 3) is pressed by a click on the touch sensor 102 with a finger 104.

A correction direction 303 is a straight direction from the correction reference point 301 to the click position 302. Here, the click position 302 is (100, 200) in X- and Y-coordinates and the correction reference point 301 is (0, 0), for example. In this case, the correction direction 303 is a direction that has an inclination of (200−0)/(100−0)=2.

A corrected position 304 represents a position determined by correcting a click position according to the first embodiment. Specifically, the corrected position 304 represents a position at a predetermined correction distance 305 from a click position 302 in the correction direction 303. A process for determining the corrected position 304 will be described later in detail.

A correction judgment distance 306 is the distance between the correction reference point 301 and a click position 302. When the correction judgment distance 306 is equal to or greater than a predetermined distance threshold, the click position 302 is corrected to the corrected position 304.

Here, the correction reference point 301, the correction distance 305, and the distance threshold (correction judgment threshold) are determined by predetermined correction information.

While the correction reference point 301 is on the perimeter of the clickable touch sensor 105 at the point at which a portion excluding the tip of the user's finger 104 with which the clickable touch sensor 105 is operated contacts the input device 101 in the first embodiment, the correction reference point 301 may be a point on the clickable touch sensor 105, or a point at which a hand with which the input device 101 is held contacts the input device 101, or a combination of these four points.

Figure 4A:
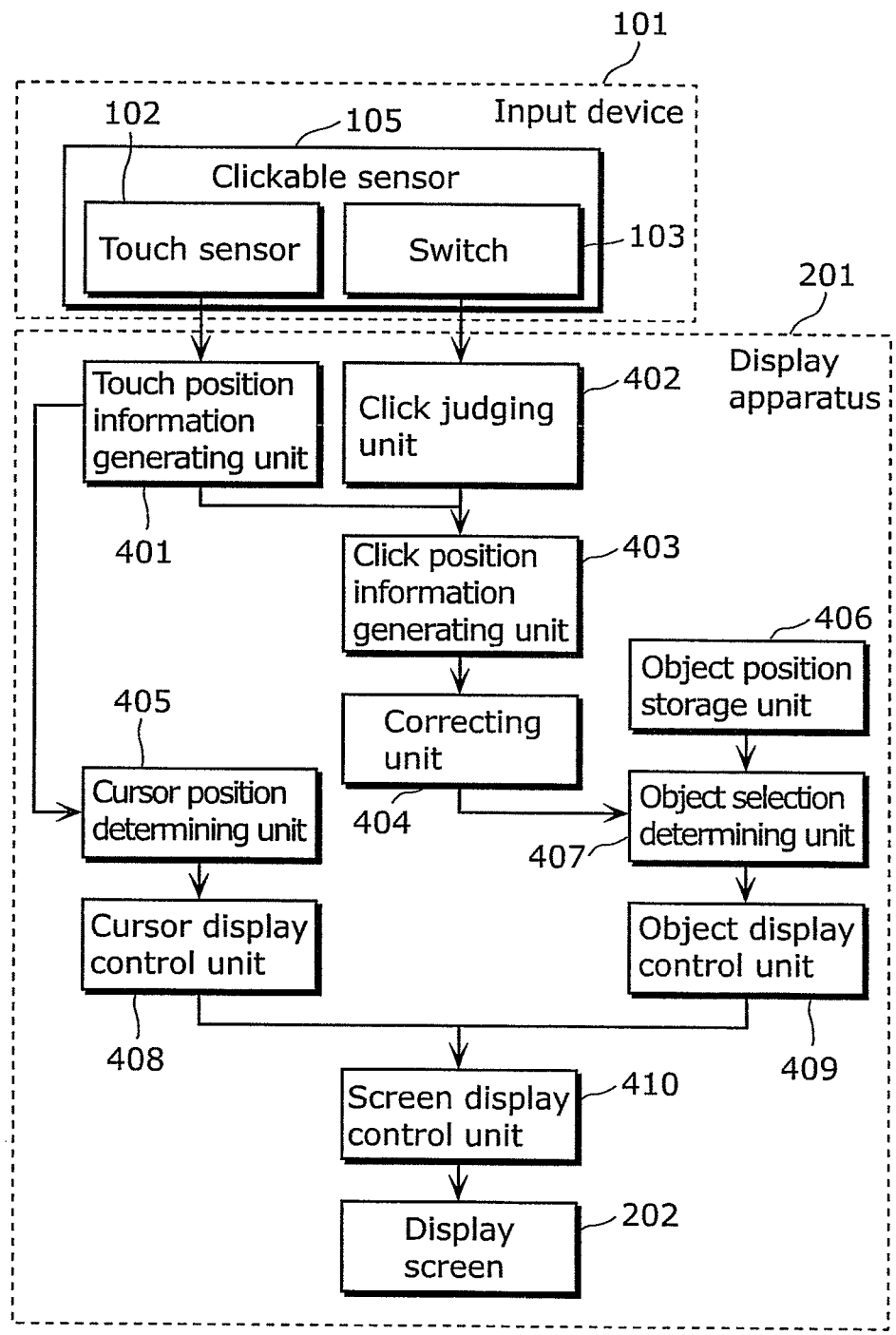
FIG. 4A is a block diagram illustrating an exemplary internal configuration of an input device including a clickable touch sensor and an exemplary internal configuration of a display apparatus, which is an example of the click position control apparatus, in the first embodiment of the present invention.

FIG. 4A is a block diagram illustrating an exemplary internal configuration of an input device 101 including a clickable touch sensor 105 in the first embodiment of the present invention and an exemplary internal configuration of a display apparatus 201, which is an example of the click position control apparatus in the first embodiment of the present invention. In FIG. 4A, the same components as those in FIGS. 1 and 2 are given the same reference numerals and description of those components will be omitted.

The input device 101 includes a clickable touch sensor 105 including a touch sensor 102 and a switch 103.

The display apparatus 201 includes a touch position information generating unit 401, a click judging unit 402, a click position information generating unit 403, a correcting unit 404, a cursor position determining unit 405, an object position storage unit 406, an object selection determining unit 407, a cursor display control unit 408, an object display control unit 409, a screen display control unit 410, and a display screen 202.

The touch position information generating unit 401 generates touch position information indicating a position within the touch sensor 102 touched by a user (hereinafter also referred to as a touch position). Specifically, the touch position information generating unit 401 obtains from the touch sensor 102 a signal indicating a position at which the user is touching the touch sensor 102. The touch position information generating unit 401 then represents the position at which the user is touching the touch sensor 102 by X- and Y-coordinates and provides the coordinates representing the touch position to the click position information generating unit 403 and the cursor position determining unit 405 as touch position information.

It should be noted that the touch position information also indicates the time at which the user touched the touch sensor 102. The touch position information indicates the position on the touch sensor 102 touched by the user by coordinate values in a coordinate system of the display screen 202 converted from coordinate values in a coordinate system of the touch sensor 102. In this case, the touch position information is identical to cursor position information, which will be described later.

The click judging unit 402 detects a click on the switch 103 which is an example of the click detecting unit. Specifically, the click judging unit 402 receives a signal when the user clicks or releases the switch 103, and represents the time at which the user has clicked the switch 103 by time information, and provides the time information to the click position information generating unit 403 as click information.

When the click judging unit 402 detects the click on the switch 103, the click position information generating unit 403 uses touch position information to generate click position information indicating a click position (click position 302 in FIG. 3), which is a position at which the switch 103 has been clicked. Note that the click position is specifically a position where the user is touching the touch sensor 102 at the time of press on the switch 103.

For example, based on click information provided from the click judging unit 402 and touch position information provided from the touch position information generating unit 401, the click position information generating unit 403 provides touch position information indicating the time identical to the time at which the user has clicked the clickable touch sensor 105 to the correcting unit 404 as click position information. It should be noted that like the touch position information, the click position information indicates the position on the touch sensor 102 at the time of the click on the touch sensor 102 by the user, represented by values in the coordinate system of the display screen 202 converted from the coordinate system of the touch sensor 102.

The correcting unit 404 corrects click position information on the basis of a positional relationship between at least one reference position on the clickable touch sensor indicated in predetermined correction information and the click position. Note that the reference position is for example the correction reference point 301 depicted in FIG. 3.

For example, the correcting unit 404 determines a correction distance to be applied to a click position 302 according to the distance between the click position 302 indicated in click position information provided from the click position information generating unit 403 and the correction reference point 301. The correcting unit 404 then corrects the click position information so that a corrected position 304 is at a position at the determined correction distance from the click position 302 in a correction direction 303. The correcting unit 404 then provides the corrected click position information to the object selection determining unit 407.

A detailed configuration of the correcting unit 404 will be described later with reference to FIG. 4B. Specific exemplary values of the click position 302, the correction reference point 301, and the correction judgment distance 306 are shown in FIG. 5.

The cursor position determining unit 405 determines cursor position information of the cursor 203 to be displayed on the display screen 202 from touch position information provided from the touch position information generating unit 401 and provides the determined cursor position information to the cursor display control unit 408.

The object position storage unit 406 is a memory or the like that stores position information for all objects 204 displayed on the display screen 202. The object position storage unit 406 provides stored position information of all objects 204 to the object selection determining unit 407. The position information for an object is information indicating a position and size in which the object is to be displayed in the display screen 202.

The object selection determining unit 407 determines an object 204 selected, on the basis of corrected click position information provided from the correcting unit 404 and position information of objects 204 provided from the object position storage unit 406. The object selection determining unit 407 then provides information indicating the selected object 204 to the object display control unit 409.

The cursor display control unit 408 performs control concerning display of the cursor 203 such as a display effect of the cursor 203 when moved, on the basis of position information of the cursor 203 provided from the cursor position determining unit 405. The cursor display control unit 408 then provides cursor display information indicating the result of the control concerning the cursor 203 to the screen display control unit 410.

The object display control unit 409 performs control concerning display of objects 204 in general such as a display effect of a selected object 204, on the basis of information indicating the selected object 204 provided from the object selection determining unit 407. The object display control unit 409 then provides object display information indicating the result of the control concerning to the object 204 to the screen display control unit 410.

The screen display control unit 410 receives cursor display information provided from the cursor display control unit 408 and object display information provided from the object display control unit 409 and controls display in general such as the cursor 203 and all objects 204 displayed on the display screen 202.

A detailed configuration of the correcting unit 404 according to the first embodiment of the present invention will be described below. FIG. 4B is a block diagram illustrating an exemplary detailed configuration of the correcting unit 404 according to the first embodiment of the present invention.

The correcting unit 404 according to the first embodiment corrects click position information when the distance between a correction reference point 301 and a click position 302 is equal to or greater than a predetermined distance threshold. Specifically, the correcting unit 404 corrects click position information so that a click position after correction is at a position (a corrected position 304) a correction distance 305 from the click position 302 in the direction from the correction reference point 301 to the click position 302, that is, in a correction direction 303. As illustrated in FIG. 4B, the correcting unit 404 includes a correction reference point storage unit 441, a correction judgment threshold storage unit 442, a correction value storage unit 443, a correction calculating unit 444, and a click position information calculating unit 445.

The correction reference point storage unit 441 is a memory for storing information indicating a correction reference point 301.

The correction judgment threshold storage unit 442 is a memory for storing a distance threshold which is a threshold used in determination as to whether or not a correction process is to be performed.

The correction value storage unit 443 is a memory for storing information indicating a correction distance 305 which represents the amount of correction of a click position.

The correction calculating unit 444 uses information indicating a correction reference point 301 and click position information indicating a click position 302 to calculate the distance between the correction reference point 301 and the click position 302 (a correction judgment distance 306). The correction calculating unit 444 then determines whether or not the calculated correction judgment distance 306 is equal to or greater than the distance threshold stored in the correction judgment threshold storage unit 442.

When the correction calculating unit 444 determines that the correction judgment distance 306 is equal to or greater than the distance threshold, the correction calculating unit 444 determines a correction direction 303. Specifically, the correction calculating unit 444 calculates an inclination between the correction reference point 301 and the click position 302 to determine the correction direction 303. The correction calculating unit 444 then provides information indicating the determined correction direction 303 and the click position information to the click position information calculating unit 445.

On the other hand, when the correction calculating unit 444 determines that the calculated distance is smaller than the distance threshold, the correction calculating unit 444 provides the click position information to the object selection determining unit 407 without correction because correction does not need to be made.

The click position information calculating unit 445 calculates a corrected position 304 on the basis of click position information, information indicating a correction direction 303, and information indicating a correction distance 305. Specifically, the click position information calculating unit 445 calculates a corrected position 304 which is a position at the correction distance 305 from the click position 302 in the correction direction 303. The click position information calculating unit 445 then provides corrected click position information indicating the calculated corrected position 304 to the object selection determining unit 407.

An operation of the click position control apparatus in the first embodiment having the configuration described above will be described below in detail with specific examples.

FIG. 5 shows specific exemplary values of a correction reference point 301, a click position 302, and a correction judgment distance 306 in the first embodiment of the present invention. In FIG. 5, the same elements as those in FIG. 3 are given the same reference numerals and description of those elements will be omitted.

FIG. 5 illustrates an example in which "occurrence of a click operation on the clickable touch sensor 105 has been detected at (200, 200)" and an example in which "occurrence of a click operation on the clickable touch sensor 105 has been detected at (300, 300)".

It should be noted that the correction judgment distance 306 is the distance between a correction reference point 301 and a click position 302 as described above and is calculated by the correcting unit 404 by using coordinate values represented by X- and Y-coordinates. Specifically, the correction judgment distance 306 is calculated as the square root of the sum of squares of a difference between the X-coordinate of the correction reference point 301 and the X-coordinate of the click position 302 and a difference between the Y-coordinate of the correction reference point 301 and the Y-coordinate of the click position 302.

FIG. 6 is a flowchart illustrating an example of operation for presetting parameters such as a correction reference point 301 and a correction distance 305 on the basis of correction information in the first embodiment of the present invention.

First, the correcting unit 404 sets a correction reference point 301 which serves as a reference point required for calculating a correction judgment distance 306 (step S101). Specifically, the correcting unit 404 causes the correction reference point storage unit 441 to store a correction reference point 301 indicated in correction information. Note that the correction information here is information predetermined at the time of manufacture or predetermined by the user when using the input device 101, for example, and is information indicating conditions for correcting a click position.

The correcting unit 404 then sets a correction judgment threshold (distance threshold) for determining whether or not a click position is to be corrected and a correction distance corresponding to the correction judgment threshold (step S102). Specifically, the correcting unit 404 causes the correction judgment threshold storage unit 442 to store a correction judgment threshold indicated in correction information and causes the correction value storage unit 443 to store a correction distance 305.

Figures 7A, 7B, 8:
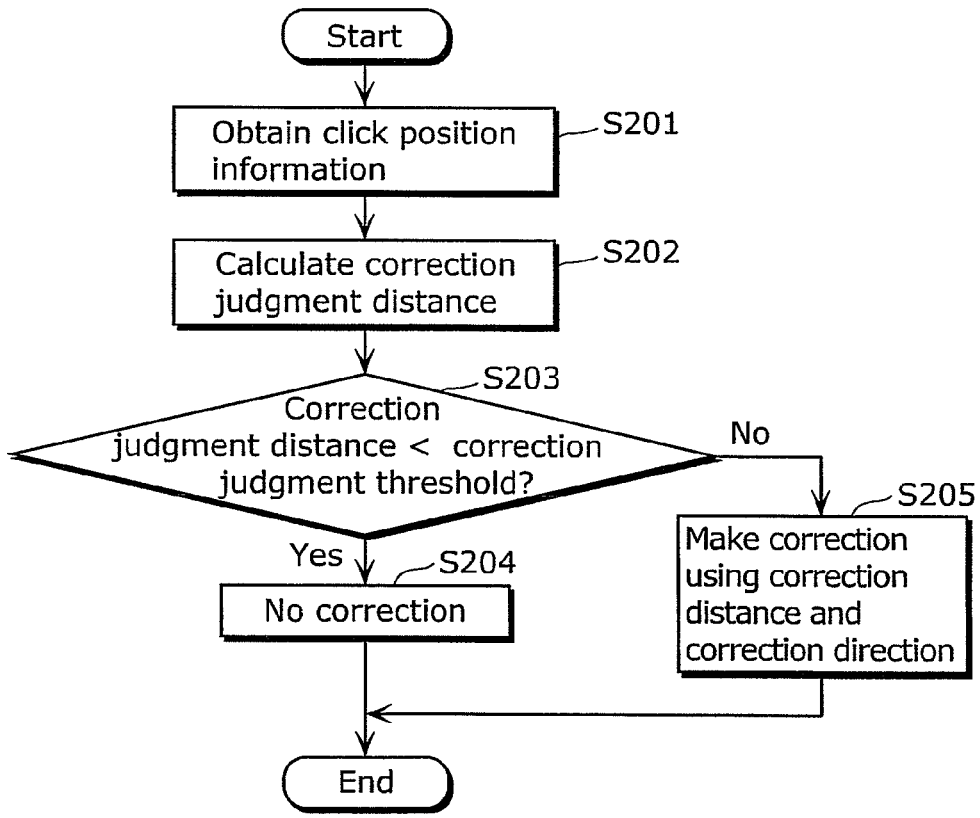
FIG. 7A shows exemplary values of a correction reference point, a correction judgment threshold, and a correction distance in the first embodiment of the present invention.
FIG. 7B shows other exemplary values of the correction reference point, the correction judgment threshold, and the correction distance in the first embodiment of the present invention.
FIG. 8 is a flowchart illustrating an example of a method for correcting click position information performed by the correcting unit in the first embodiment of the present invention.

FIG. 7A shows specific exemplary values of coordinates of the correction reference point 301, the correction judgment threshold, and the correction distance 305 set by the correcting unit 404.

FIG. 7A shows exemplary values of the correction reference point 301, the correction judgment threshold 501, and the correction distance 305 in the first embodiment of the present invention. In FIG. 7A, the same elements as those in FIG. 3 are given the same reference numerals and description of those elements will be omitted.

FIG. 7A illustrates an example in which "when the correction reference point 301 is at (0, 0) and the correction judgment distance 306 is equal to or greater than the correction judgment threshold 501 (300), a position at a correction distance 305 of (20) from a click position 302 in a correction direction 303 is set as a corrected click position".

It should be noted that while one correction judgment threshold 501 and one correction distance 305 associated with the correction judgment threshold 501 are used in the example illustrated in FIG. 7A, a plurality of correction judgment thresholds 501 and a plurality of correction distances 305 may be used. Here, the correction judgment threshold storage unit 442 and the correction value storage unit 443 store the correction judgment threshold 501 and the correction distance 305 in association with each other.

Referring to FIG. 7B, an example will be described in which a plurality of correction judgment thresholds 501 and a plurality of correction distances 305 are stored.

The example in FIG. 7B shows that "when the correction judgment distance 306 is equal to or greater than a correction judgment threshold 501 of (300) and smaller than a correction threshold of (400), a position at a correction distance 305 of (20) from a click position 302 in a correction direction 303 is set as a corrected position". The example also shows that "when the correction judgment distance 306 is greater than a correction judgment threshold 501 of (400), a position at a correction distance 305 of (30) from a click position 302 in the correction direction 303 is set as a corrected click position".

In this way, if a plurality of correction judgment thresholds 501 are used, the correction judgment thresholds 501 and correction distances 305 are stored in association with each other. It should be noted that preferably, the greater the correction judgment threshold 501 is, the greater the correction distance 305 is. That is, preferably, the farther a click position is from a predetermined reference position (correction reference point 301), the greater correction is made, that is, the greater correction distance 305 is set. This is because a deflection of click generally increases as the distance from the correction reference point 301 increases.

FIG. 8 is a flowchart illustrating an example of a click position information correcting method performed by the correcting unit 404 in the first embodiment of the present invention.

First, the correcting unit 404 obtains click position information (step S201). Specifically, a click on the clickable touch sensor 105 by the user causes the click position information generating unit 403 to provide click position information to the correcting unit 404.

Then, the correcting unit 404 calculates a correction judgment distance 306, which is the distance between the correction reference point 301 and the click position 302 (step S202).

The correcting unit 404 then compares the correction judgment distance 306 with the correction judgment threshold 501 (step S203). When the correction judgment distance 306 is less than the correction judgment threshold 501 (Yes at step S203), the correcting unit 404 does not correct the click position information (step S204). That is, the correcting unit 404 provides the click position information provided from the click position information generating unit 403 to the object selection determining unit 407.

When the correction judgment distance 306 is equal to or greater than the correction judgment threshold 501 (No at step S203), the correcting unit 404 uses the correction distance 305 and the correction direction 303 to correct the click position information (step S205). Specifically, the correcting unit 404 calculates a corrected position which is a position at the correction distance 305 from the click position 302 indicated in the click position information in the correction direction 303 and generates information indicating the calculated corrected position 304 as corrected click position information.

The process described above and illustrated in FIG. 8 will be described using specific exemplary values.

As illustrated in FIG. 5, (0, 0) is used as the correction reference point 301 and two points (200, 200) and (300, 300) are used as click positions 302. Also, (300) is used as the correction judgment threshold 501 and (20) is used as the correction distance 305 as illustrated in FIG. 7A.

First, the correcting unit 404 calculates correction judgment distances 306 (step S202). The correction judgment distances 306 calculated are (280) and (420).

The correcting unit 404 then compares each correction judgment distance 306 with the correction judgment threshold 501 (step S203). Since the correction judgment distance 306 (280) is less than the correction judgment threshold 501 (300) (Yes at step S203), the correcting unit 404 does not correct the click position (200, 200). Accordingly, the click information indicating the click position (200, 200) is provided to the object selection determining unit 407 without correction.

Then, since the correction judgment distance 306 (420) is greater than the correction judgment threshold 501 (300) (No at step S203), the correcting unit 404 calculates a corrected position 304 which is a position at a correction distance of (20) from the click position (300, 300) in a direction of a straight line between the click position 302 and the correction reference point 301 (correction direction 300). That is, the X-coordinate of the corrected position 304 is 300+14=314 and the Y-coordinate of the corrected position 304 is 300+14=314. Thus, the corrected position 304 indicated in the corrected click position information is calculated as (314, 314).

As described above, the click position control apparatus according to the first embodiment corrects a click position at which the switch 103 is pressed when the distance between a predetermined reference position and the click position is equal to or greater than a threshold. Specifically, the click position control apparatus according to the first embodiment corrects click position information so that a corrected click position is at a position at a correction distance from the click position in the direction from a reference position toward the click position. That is, the click position control apparatus according to the first embodiment assumes a detected click position to be deflected from the click position intended by a user in the direction of the reference position and corrects the deflection.

Thus, a click position can be corrected simply by presetting parameters such as a threshold and a correction distance. Accordingly, an operation error due to a deflection of a click by a user can be prevented without needing a user operation history or the like even when the user is changed or when a new user uses the apparatus.

Second Embodiment

A click position control apparatus according to a second embodiment of the present invention is characterized by including a storage unit which stores a plurality of pieces of touch position information, and by correcting click position information with reference to the pieces of touch position information stored in the storage unit.

In the second embodiment, an example will be given first in which click position information is corrected on the basis of a record of touch position information indicating positions at which a user touched a touch sensor, that is, a trajectory of touch positions according to the distance between a point (reference position) which serves as a benchmark on an input device and a click position (coordinates) which indicates an input by the user on a clickable touch sensor.

It should be noted that since a touch position is represented as coordinates on a display screen in the second embodiment, a touch position is identical to a cursor position. Therefore, a trajectory of a cursor displayed on the display screen is used as a trajectory of touch positions in the second embodiment.

A cross section of an input device 101 in the second embodiment of the present invention is similar to that in the first embodiment and therefore a cross-sectional view of the input device 101 will be omitted.

Figure 9:
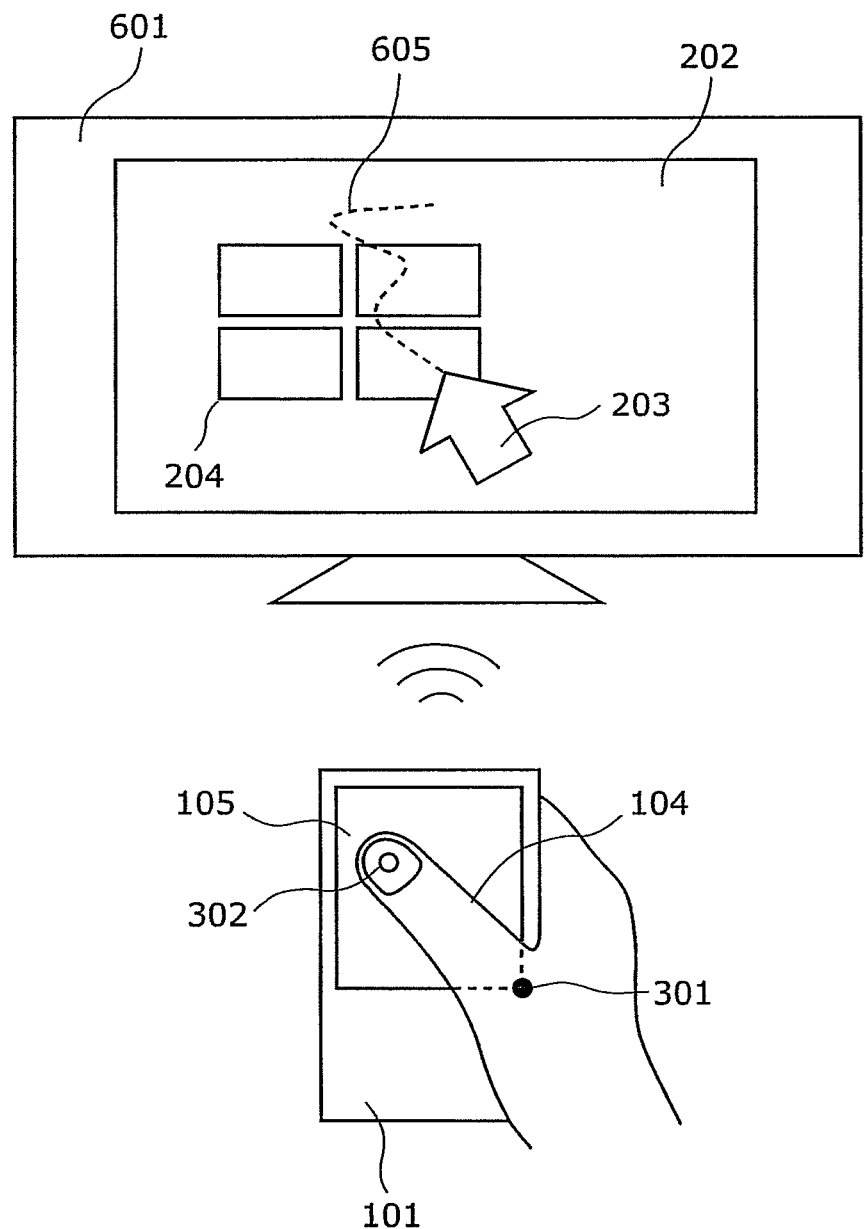
FIG. 9 is a schematic diagram illustrating an example of an input device and an example of a display apparatus in a second embodiment of the present invention.

FIG. 9 is a schematic diagram illustrating an example of the input device 101 and an example of a display apparatus 601 in the second embodiment of the present invention. In FIG. 9, the same elements as those in FIG. 1 are given the same reference numerals and description of those elements will be omitted.

The display apparatus 601 obtains position information on a point at which a finger 104 is touching a clickable touch sensor 105 on the basis of a position signal provided from the input device 101 and displays a cursor 203 at a position on a display screen 202 that corresponds to the obtained position information in the same fashion as the display apparatus 201 in the first embodiment. The display apparatus 601 also detects a click on the clickable touch sensor 105 by a user and performs processing such as object 204 judgment processing in the same fashion as the display apparatus 201 in the first embodiment.

In addition, the display apparatus 601 includes a storage unit which stores a history of movements of the cursor 203 displayed on the display screen 202 (a cursor trajectory 605) as series of cursor positions information. In the second embodiment, correction of click position information is made by selecting one cursor position from the series of cursor positions information indicating a cursor position trajectory 205. A specific example of series of cursor positions information will be described in detail with reference to FIG. 10.

FIG. 10 shows exemplary values of series of cursor positions information 701 indicating a trajectory of the cursor 203 displayed on the display screen 202 of the display apparatus 601 in the second embodiment of the present invention.

The series of cursor positions information 701 indicates times 702 at which position information of the cursor 203 (that is, touch position information) was inputted and cursor positions 703 corresponding to the times 702. The example in FIG. 10 illustrates that "the cursor 203 was displayed at positions (480, 135), (360, 160), (355, 280), (315, 300), and (300, 300) on the display screen 202 at times 30 ms, 60 ms, 90 ms, 120 ms, and 150 ms, respectively".

Figure 11:
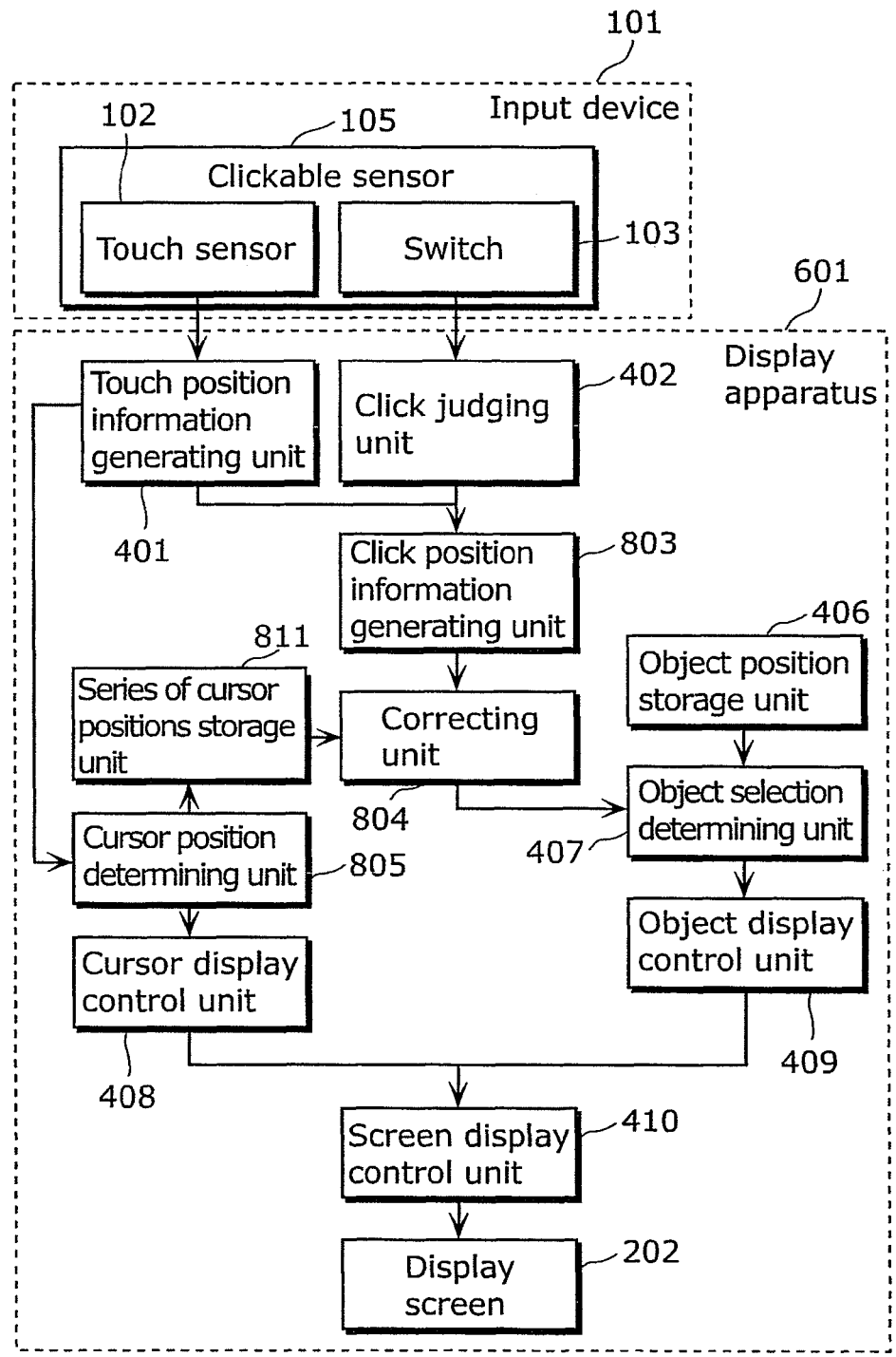
FIG. 11 is a block diagram illustrating an exemplary internal configuration of an input device including a clickable touch sensor and an exemplary internal configuration of a display apparatus, which is an example of the click position control apparatus, in the second embodiment of the present invention.

FIG. 11 is a block diagram illustrating an exemplary internal configuration of an input device 101 including a clickable touch sensor 105 and an exemplary internal configuration of a display apparatus 601, which is an example of the click position control apparatus in the second embodiment of the present invention. In FIG. 11, the same components as those in FIGS. 1, 4A and 9 are given the same reference numerals and description of those components will be omitted.

The display apparatus 601 differs from the display apparatus 201 described in the first embodiment in that the display apparatus 601 includes a click position information generating unit 803, a correcting unit 804, and a cursor position determining unit 805 instead of the click position information generating unit 403, the correcting unit 404, and the cursor position determining unit 405 and includes a series of cursor positions storage unit 811 in addition.

Like the click position information generating unit 403, the click position information generating unit 803 generates click position information and provides the generated click position information to the correcting unit 804. The click position information generating unit 803 also puts time information (click information) provided from a click judging unit 402 in the click position information and provides the information to the correcting unit 804. That is, the click position information provided to the correcting unit 804 indicates a time at which a switch 103 was pressed and the position at which the user touched the touch sensor 102 at that time.

The correcting unit 804 refers to series of cursor positions information 701 stored in the series of cursor positions storage unit 811 to correct click position information. Specifically, the correcting unit 804 refers to series of cursor positions information 701 to correct click position information so that corrected click position information represents a position indicated in cursor position information indicating a time which precedes the time indicated in the click position information by a predetermined correction amount of time.

More specifically, the correcting unit 804 selects one cursor position from the series of cursor positions information 701 provided from the series of cursor positions storage unit 811, according to the distance between a click position 302 indicated in the click position information provided from the click position information generating unit 803 and a correction reference point 301. The correcting unit 804 then provides cursor position information indicating the one cursor position 703 selected from the series of cursor positions information 701 to an object selection determining unit 407 as a click position information.

Exemplary values of the click position 302, the correction reference point 301, and the correction judgment distance 306 are shown in FIG. 5. A process performed by the correcting unit 804 for selecting one cursor point from the series of cursor positions information 701 is illustrated in detail in FIG. 14.

The cursor position determining unit 805 determines cursor position information of the cursor 203 displayed on the display screen 202 from touch position information provided from the touch position information generating unit 401 in the same fashion as the cursor position determining unit 405. The cursor position determining unit 805 then provides the determined cursor position information to the series of cursor positions storage unit 811 as well as to a cursor display control unit 408. It should be noted that as shown in FIG. 10, the cursor position information is information which indicates a cursor position 703 determined on the basis of touch positions indicated in touch position information and a time 702 indicated in the touch position information (that is, information in one row in FIG. 10).

The series of cursor positions storage unit 811, which is an example of the storage unit according to the present invention, stores cursor position information generated on the basis of touch position information. Specifically, the series of cursor positions storage unit 811 stores, as series of cursor positions information 701, a plurality of pieces of cursor position information including cursor positions 703 and times 702 associated with the cursor positions 703, provided from the cursor position determining unit 805. The series of cursor positions storage unit 811 provides the stored series of cursor positions information 701 to the correcting unit 804 according to an instruction from the correcting unit 804.

Figures 12, 13:
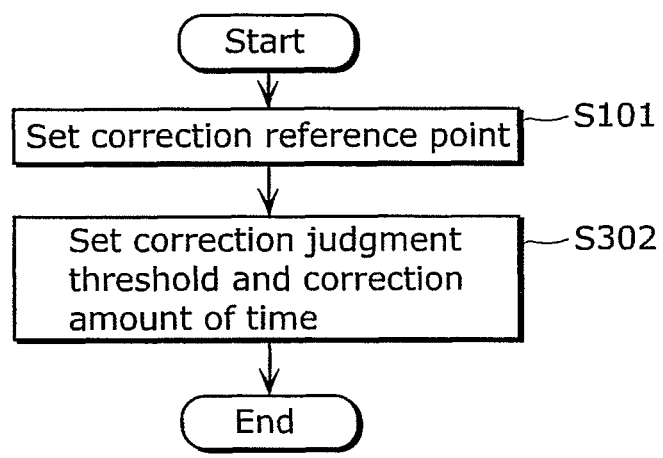
FIG. 12 is a flowchart illustrating an example of operation for presetting parameters such as a correction reference point and a correction amount of time on the basis of correction information in the second embodiment of the present invention.
FIG. 13 shows exemplary values of a correction reference point, a correction judgment threshold, and a correction amount of time in the second embodiment of the present invention.

FIG. 12 is a flowchart illustrating an example of operation for presetting parameters such as a correction reference point 301 and a correction amount of time on the basis of correction information in the second embodiment of the present invention. In FIG. 12, the same operations as those in FIG. 6 are given the same reference numerals and description of those operations will be omitted.

First, the correcting unit 804 sets a correction reference point 301 which serves as a reference position required for calculating a correction judgment distance 306 (step S101). Specific operation is the same as the operation performed by the correcting unit 404 according to the first embodiment.

Then, the correcting unit 804 sets a correction judgment threshold for determining whether or not a click position is to be corrected and a correction amount of time corresponding to the correction judgment threshold (step S302). FIG. 13 shows specific exemplary values of the coordinates of the correction reference point 301, the correction judgment threshold, and the correction amount of time set by the correcting unit 804.

FIG. 13 shows exemplary values of the correction reference point 301, the correction judgment threshold 501, and the correction amount of time 901 in the second embodiment of the present invention. In FIG. 13, the same elements as those in FIGS. 3 and 7A are given the same reference numerals and description of those elements will be omitted.

FIG. 13 illustrates that "when the correction reference point 301 is at (0, 0) and the correction judgment distance 306 is equal to or greater than the correction judgment threshold 501 (300), a correction amount of time 901 of (30 ms) is used to make correction". More specifically, FIG. 13 illustrates that "when the correction reference point 301 is at (0, 0) and the correction judgment distance 306 is equal to or greater than the correction judgment threshold 501 (300), a position at which the user was touching the touch sensor 102 a correction amount of time 901 of (30 ms) before the time indicated in click position information is set as a corrected click position".

While one correction judgment threshold 501 and one correction amount of time 901 associated with the correction judgment threshold 501 are used in the example illustrated in FIG. 13, a plurality of correction judgment thresholds 501 and a plurality of correction amounts of time 901 may be used. Specifically, if a plurality of correction judgment thresholds 501 are used, the correction judgment thresholds 501 and correction amounts of time 901 are stored in association with each other. In this case, preferably the correction amount of time 901 increases as the correction judgment threshold 501 increases. That is, preferably the farther a click position is from a predetermined reference position (correction reference point 301), the greater correction is made, that is, the greater correction amount of time 901 is set. This is because a deflection of click generally increases as the distance from the correction reference point 301 increases.

Figures 14, 15:
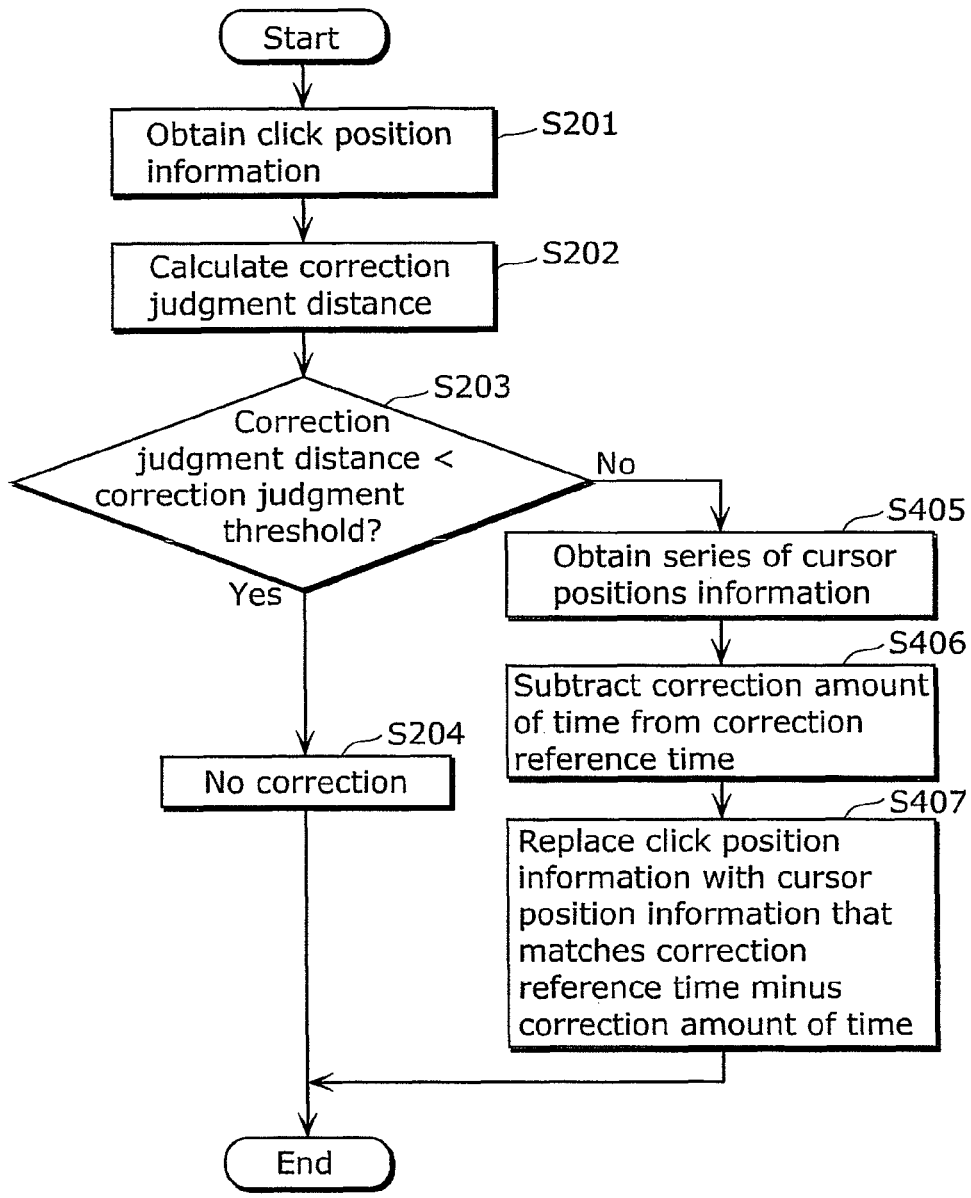
FIG. 14 is a flowchart illustrating an example of a method for correcting click position information performed by a correcting unit in the second embodiment of the present invention.
FIG. 15 shows exemplary values of a correction reference point, a correction judgment threshold, and a correction distance in a first variation of the second embodiment of the present invention.

FIG. 14 is a flowchart illustrating an example of a method performed by the correcting unit 804 for correcting click position information in the second embodiment of the present invention. In FIG. 14, the same operations as those in FIG. 8 are given the same reference numerals and description of those operations will be omitted.

As illustrated in FIG. 14, the operations (step S201 to step S203) of obtaining click position information by the correcting unit 804, calculating a correction judgment distance 306, and comparing the calculated correction judgment distance 306 with a correction judgment threshold 501 are the same as those in FIG. 8.

When the correction judgment distance 306 is equal to or greater than the correction judgment threshold 501 (No at step S203), the correcting unit 804 obtains series of cursor positions information 701 from the series of cursor positions storage unit 811 (step S405). Here, time information indicating a time at which a click position 302 was detected is referred to as correction reference time information. That is, the correction reference time is a time indicated in click position information and indicates a time at which the switch 103 was pressed by a click on the touch sensor 102 by the user.

The correcting unit 804 subtracts the correction amount of time 901 from the correction reference time information (step S406). That is, the correcting unit 804 calculates a time the correction amount of time 901 before the time indicated in the correction reference time information, that is, the time at which the switch 103 was clicked.

The correcting unit 804 then replaces the click position information with cursor position information indicating a cursor position 703 corresponding to a time 702 identical to the calculated past time.

In this way, the correcting unit 804 refers to cursor position information stored in the series of cursor positions storage unit 811 to correct click position information so that a position corresponding to a corrected click position is the cursor position corresponding to a time a correction amount of time 901 before the time indicated in the click position information.

The process described above and illustrated in FIG. 14 will be described using specific exemplary values.

As illustrated in FIG. 5, (0, 0) is used as the correction reference point 301 and two points (200, 200) and (300, 300) are used as click positions 302. Also, (300) is used as the correction judgment threshold 501 and (20) is used as the correction amount of time 901 as illustrated in FIG. 13.

First, the correcting unit 804 calculates correction judgment distances 306 (step S202). The correction judgment distances 306 calculated are (280) and (420).

The correcting unit 804 then compares each correction judgment distance 306 with the correction judgment threshold 501 (step S203). Since the correction judgment distance 306 (280) is less than the correction judgment threshold 501 (300) (Yes at step S203), the correcting unit 804 does not correct the click position 302 (200, 200). Accordingly, click information indicating the click position (200, 200) is provided to an object selection determining unit 407.

Then, since the correction judgment distance 306 (420) is greater than the correction judgment threshold 501 (300) (No at step S203), the correcting unit 804 corrects the click position information that indicates the click position (300, 300). First, the correcting unit 804 obtains series of cursor positions information 701 from the series of cursor positions storage unit 811 (step S405). For example, the correcting unit 804 obtains the series of cursor positions information shown in FIG. 10.

Here, the correction reference time is a time indicated in the click position information indicating the click position (300, 300). The correction reference time in this case is (150 ms) as shown in FIG. 10.

The correcting unit 804 then subtracts the correction amount of time 901 (30 ms) from the correction reference time (150 ms) to obtain a past time (step S406). Here, the past time is (120 ms).

The correcting unit 804 then replaces the click position information with cursor position information indicating a cursor position (315, 300) corresponding to a time 702 identical to the past time (120 ms) (step S407). That is, the correcting unit 804 corrects the click position information so that a corrected position is the cursor position (315, 340).

In this way, the click position control apparatus according to the second embodiment corrects a click position when the distance between a predetermined reference position and a click position at which the switch 103 was clicked is equal to or greater than a threshold. Specifically, the click position control apparatus according to the second embodiment refers to series of cursor positions information stored in the series of cursor positions storage unit 811 to correct click position information so that a corrected click position is a position indicated in the cursor position information that indicates a past time a correction amount of time before the time indicated in the click position information.

Thus, a click position can be corrected simply by presetting parameters such as a threshold and a correction amount of time. Accordingly, an operation error due to a deflection of a click by a user can be prevented without needing a user operation history or the like even when the user is changed or when a new uses the apparatus.

(First Variation of Second Embodiment)

While a method performed by the correcting unit 804 for correcting click position information using a correction amount of time 901 has been described with reference to FIGS. 13 and 14, a click position control apparatus according to a first variation of the second embodiment may use a correction distance instead of the correction amount of time 901. A method for correcting click position information using a correction distance will be described below with reference to FIGS. 15 and 16.

FIG. 15 shows exemplary values of a correction reference point 301, a correction judgment threshold 501, and a correction distance 1001 in the first variation of the second embodiment of the present invention. In FIG. 15, the same elements as those in FIGS. 3 and 7A are given the same reference numerals and description of those elements will be omitted.

FIG. 15 shows that "when the correction reference point 301 is at (0, 0) and the correction judgment distance 306 is equal to or greater than a correction judgment threshold 501 of (300), a correction distance 1001 of (20) is used to perform correction". More specifically, FIG. 15 shows that "when the correction reference point 301 is at (0, 0) and the correction judgment distance 306 is equal to or greater than a correction judgment threshold 501 of (300), a click position 302 is corrected to a position closest to a position at a correction distance 1001 of (20) from the click position 302".

While one correction judgment threshold 501 and one correction distance 1001 associated with the correction judgment threshold 501 are used in the example shown in FIG. 15, a plurality of correction judgment thresholds 501 and a plurality of correction distances 1001 may be used.

Figure 16:
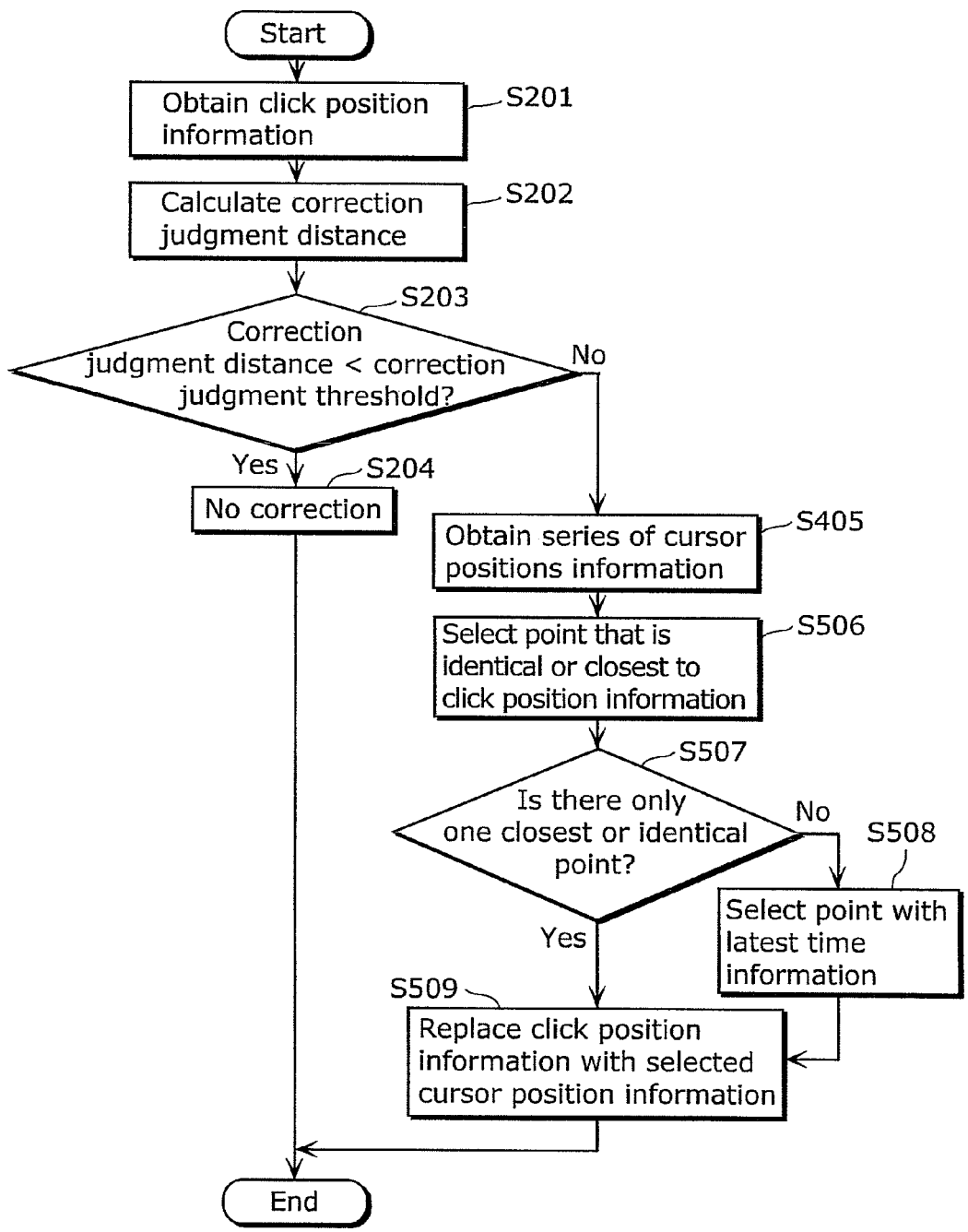
FIG. 16 is a flowchart illustrating an example of a method for correcting click position information performed by a correcting unit in the first variation of the second embodiment of the present invention.

FIG. 16 is a flowchart illustrating an example of a method performed by a correcting unit 804 for correcting click position information in the first variation of the second embodiment of the present invention. In FIG. 16, the same operations as those in FIG. 14 are given the same reference numerals and description of those operations will be omitted.

As illustrated in FIG. 16, the operations (step S201 to step S203) of obtaining click position information by the correcting unit 804, calculating a correction judgment distance 306, and comparing the calculated correction judgment distance 306 with a correction judgment threshold 501 are the same as those in FIG. 14. The operation of obtaining series of cursor positions information (step S405) performed by the correcting unit 804 when the correction judgment distance 306 is greater than the correction judgment threshold 501 is also the same as the operation in FIG. 14.

The correcting unit 804 calculates the distance between a cursor positions 703 indicated in every piece of cursor position information contained in series of cursor positions information 701 and a click position 302 indicated in the click position information. It should be noted that the calculation here is performed with one of the coordinate system in the touch sensor 102 and the coordinate system in the display screen 202. The correcting unit 804 then determines cursor position information that resulted in a calculated distance identical or closest to the correction distance 1001 (step S506).

Here, when there are a plurality of identical or closest pieces of cursor position information (No at step S507), the correcting unit 804 selects a piece of cursor position information that corresponds to a time closest to the time indicated in the click position information among the plurality of pieces of cursor position information (step S508). The correcting unit 804 replaces the click position information with the cursor position information thus determined or selected (step S509).

In this way, the correcting unit 804 refers to cursor position information stored in the series of cursor positions storage unit 811 to correct click position information so that a corrected click position is a position closest to a position at the correction distance 1001 from the position indicated in the click position information.

The process described above and illustrated in FIG. 16 will be described using specific exemplary values. The values used are the same as those used in FIG. 14 and the results of the calculations illustrated in FIG. 14 are used.

The correcting unit 804 calculates the distance between a click position 302 (300, 300) indicated in click position information and every cursor position (480, 135), (360, 160), (355, 280), (315, 300) in series of cursor positions information 701 obtained from the series of cursor positions storage unit 811, excluding a cursor position that is identical to the click position 302 (300, 300). Results of the calculations are 244, 152, 62, and 15 (digits to the right of the decimal point of each values were discarded), respectively, and a cursor position information closest to the correction distance 1001 (20) is (315, 300) (step S506).

Then, correcting unit 804 determines whether or not there are a plurality of pieces of cursor position information with calculated distances that are equal or closest to the correction distance 1001. Here, there are not a plurality of pieces of cursor position information (Yes at step S507). Therefore the cursor position information indicating the cursor position (315, 300) is determined to be corrected click position information (step S509).

While the distance between the cursor position indicated in every piece of cursor position information contained in the series of cursor positions information 701 and the click position indicated in click position information is calculated in the example described above, only the distances to cursor positions at times before the time indicated in the click position information need to be calculated. Alternatively, the distances to cursor positions at times within a predetermined time period before the time indicated in the click position information may be calculated. In this way, the distances to only some of the cursor positions need to be calculated and the amount of processing can be reduced accordingly.

(Second Variation of Second Embodiment)

Referring to FIG. 16, a method for correcting click position information performed by the correcting unit 804 has been described in which the click position information is replaced with cursor position information indicating a distance to the click position 302 that is equal or closest to the correction distance 1001. That is, the click position 302 is corrected to a cursor position that coincides with or closest to the circumference of a circle that is centered on the click position 302 and has a radius equal to the correction distance 1001.

A method of a second variation of the second embodiment will be described with reference to FIG. 17 in which correction is made by calculating distances between cursor positions along a trajectory of the cursor and replacing click position information with cursor position information with a sum of the calculated distances between cursor positions that is equal or closest to a correction distance.

Figure 17:
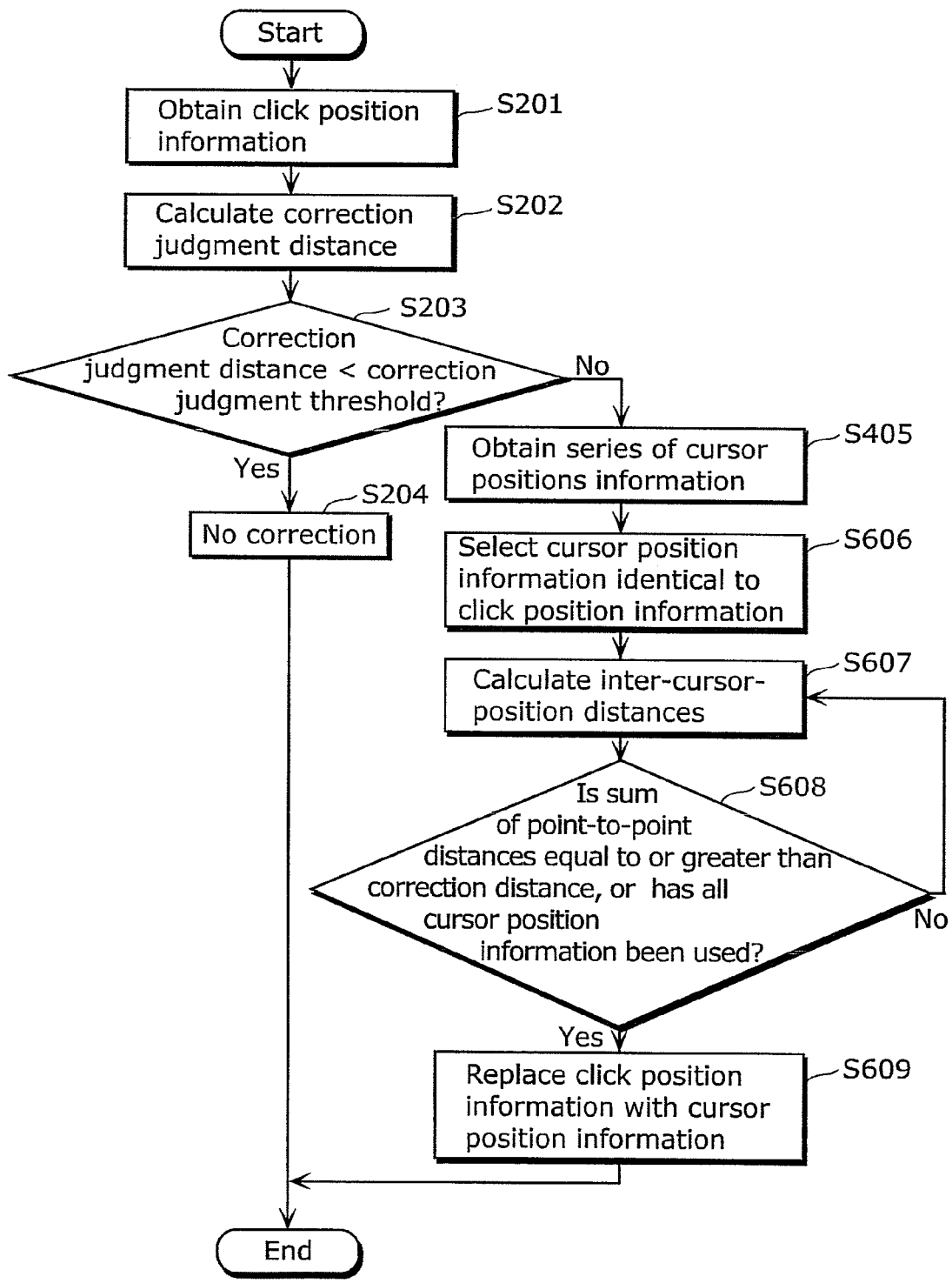
FIG. 17 is a flowchart illustrating an example of a method for correcting click position information performed by a correcting unit in a second variation of the second embodiment of the present invention.

FIG. 17 is a flowchart illustrating an example of a method for correcting click position information performed by a correcting unit 804 in the second variation of the second embodiment of the present invention. In FIG. 17, the same operations as those in FIG. 14 are given the same reference numerals and description of those operations will be omitted.

As illustrated in FIG. 17, the operations (step S201 to step S203) of obtaining click position information by the correcting unit 804, calculating a correction judgment distance 306, and comparing the calculated correction judgment distance 306 with a correction judgment threshold 501 are the same as those in FIG. 14. The operation of obtaining series of cursor positions information (step S405) performed by the correcting unit 804 when the correction judgment distance 306 is greater than the correction judgment threshold 501 is also the same as the operation in FIG. 14.

The correcting unit 804 selects cursor position information that indicates a cursor position 703 identical to a click position 302 indicated in click position information from series of cursor positions information 701 (step S606). Here, a cursor position 703 that is identical to a click position 302 indicated in click position information is referred to as a correction reference position and cursor position information indicating the cursor position 703 is referred to as correction reference position information.

The correcting unit 804 refers to the series of cursor positions information 701 and, based on time information indicating times 702 contained in the series of cursor positions information 701, calculates the distance between a cursor position indicated in cursor position information just preceding in time the correction reference position information and the correction reference position (step S607). The distance between two cursor positions indicate by series of cursor positions information 701 is hereinafter referred to as an inter-cursor-position distance.

The correcting unit 804 then determines whether or not the calculated inter-cursor-position distance is equal to or greater than a correction distance 1001 (step S608). When the calculated inter-cursor-position distance is equal to or greater than the correction distance 1001 (Yes at step S608), the correcting unit 804 replaces the click position information with earliest-time cursor position information among the cursor position information used in the inter-cursor-position distance calculation (step S609).

On the other hand, when the calculated inter-cursor-position distance is less than the correction distance 1001 (No at step S608), the correcting unit 804 goes back to previous two adjacent pieces of cursor position information according to the time information and performs the same calculation on them (step S607). The correcting unit 804 then adds the calculated distance to the inter-cursor-position distance. Thus, the correcting unit 804 calculates sums of inter-cursor-position distances one after another.

Specifically, at the second calculation, the distance between a cursor position indicated in cursor position information just preceding in time the correction reference position information and a cursor position indicted by cursor position information preceding in time that cursor position information is calculated. Then, the distance between the two positions is added to the inter-cursor-position distance (the distance between the correction reference position and the cursor position just preceding in time the correction reference position information).

The correcting unit 804 then compares the sum of the inter-cursor-position distances with the correction distance 1001 (step S608). When the sum of the inter-cursor-position distances is less than the correction distance 1001 (No at step S608), the correcting unit 804 calculates an additional inter-cursor-position distance (returns to step S607).

When the sum of the inter-cursor-position distances is equal to or greater than the correction distance 1001, or when all pieces of cursor position information stored as series of cursor positions information 701 are used in the distance calculation (Yes at step S608), the correcting unit 804 replaces the click position information with the earliest-time cursor position information among the cursor position information used in the cursor position distance calculations (step S609).

In this way, the correcting unit 804 calculates the distances between adjacent two points along a trajectory of cursor positions one after another. Then, the correcting unit 804 calculates the sum of the distances calculated one after another and corrects the click position information so that a corrected click position is a cursor position at which the calculated sum becomes equal to or greater than the correction distance 1001.

The process described above and illustrated in FIG. 17 will be described using specific exemplary values. The values used are the same as those used in FIGS. 14 and 16 and the results of calculations illustrated in FIGS. 14 and 16 will be used.

Since the click position 302 indicated in click position information is (300, 300), the correcting unit 804 refers to series of cursor positions information 701 to determine correction reference position information (step S606). Here, the correction reference position indicated in the correction reference position information is (300, 300).

The correcting unit 804 then calculates the distance between the correction reference position (300, 300) and a cursor position (315, 300) immediately preceding the correction reference position (300, 300) to yield an inter-cursor-position distance of (15) (step S607). The correcting unit 804 then compares the inter-cursor-position distance (15) with the correction distance 1001 (20) (step S608).

Here, the inter-cursor-position distance (15) is smaller (No at step S608). Therefore the correcting unit 804 calculates the distance between the cursor position (315, 300) immediately preceding the correction reference position and a cursor position (355, 280) preceding that cursor position (315, 300) to yield an inter-cursor-position distance of (50).

The inter-cursor-position distance (50) is added to the previously yielded inter-cursor-position distance (15) to yield a sum of (65). The correcting unit 804 then compares the sum (65) of the inter-cursor-position distances with the correction distance 1001 (20) (step S608).

Here, the sum (65) of the inter-cursor-position distances is greater than the correction distance 1001 (15) (Yes at step S608). Therefore the correcting unit 804 sets as a corrected click position a cursor position (355, 280) that corresponds to the earliest time among cursor positions (300, 300), (315, 300), (355, 280) indicated in the cursor position information used in the inter-cursor-position distance calculation.

In this way, the correcting unit 804 may correct click position information so that a corrected position 304 is a cursor position closest to a position at a correction distance 1001 from a click position 302 indicated in click position information. In this case, the correcting unit 804 may correct the click position information so that the corrected position 304 is the cursor position closest to a position at the correction distance 1001 from the click position 302 along a trajectory of the cursor.

(Third Variation of Second Embodiment)

An input device according to the second embodiment may include a pressure sensor instead of the switch. A method for correcting click position information using an input device 1101 including a pressure sensor 1103 in place of the switch 103 illustrated in FIG. 11 will be described with reference to FIGS. 18 to 21.

Figure 18:
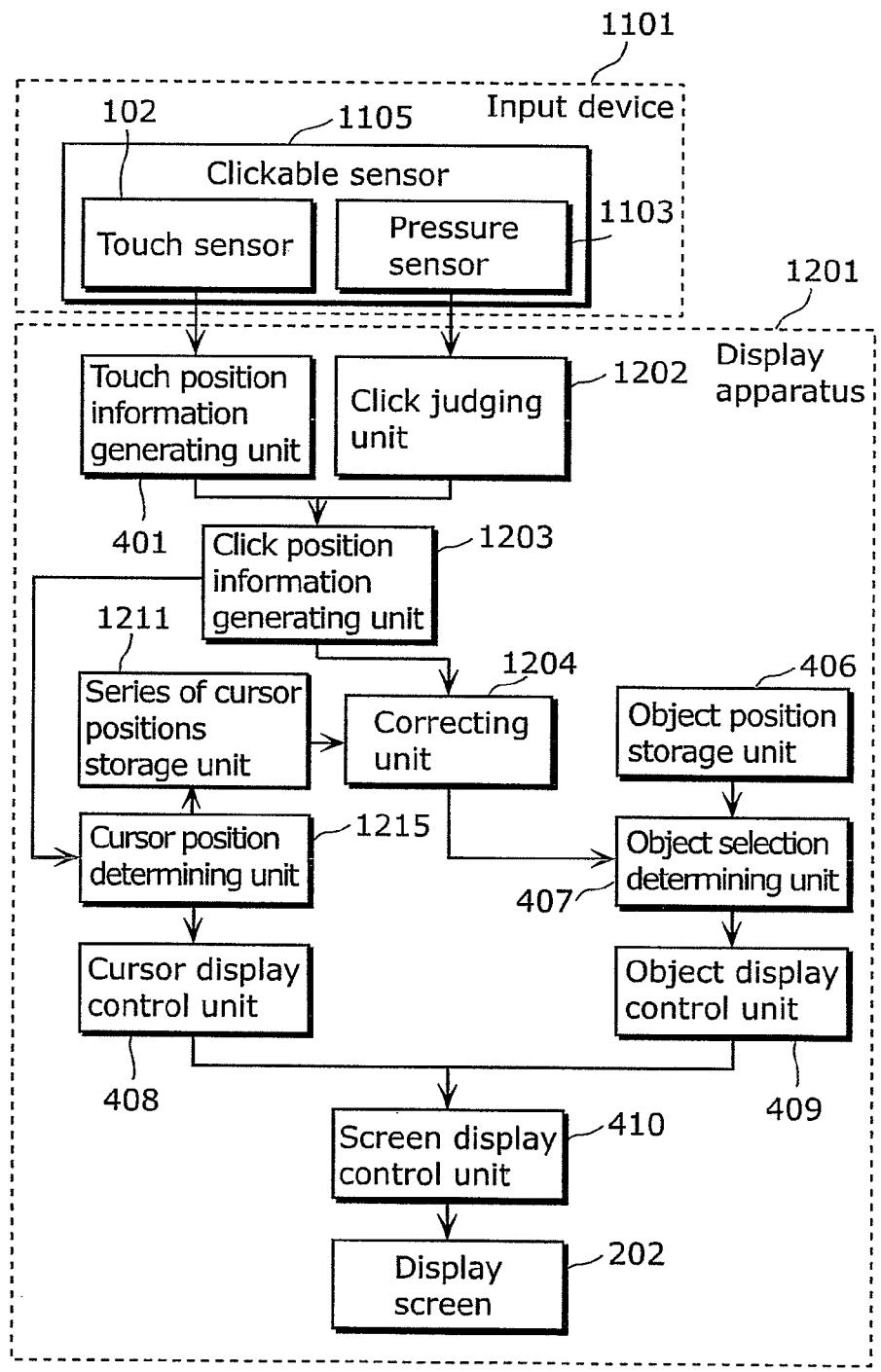
FIG. 18 is a block diagram illustrating an exemplary internal configuration of an input device including a clickable touch sensor and an exemplary internal configuration of a display apparatus, which is an example of the click position control apparatus, in a third variation of the second embodiment of the present invention.

FIG. 18 is a block diagram illustrating an exemplary internal configuration of an input device 1101 including a clickable touch sensor 1105 and an exemplary internal configuration of a display apparatus 1201, which is an example of the click position control apparatus, in a third variation of the second embodiment of the present invention. In FIG. 18, the same elements as those in FIGS. 1 and 11 are given the same reference numerals and description of those elements will be omitted.

The input device 1101 includes a clickable touch sensor 1105 including a touch sensor 102 and a pressure sensor 1103.

The pressure sensor 1103, which is an example of the click detecting unit according to the present invention, is disposed under the touch sensor 102, is integral with the touch sensor 102, and detects the intensity of a click on the touch sensor 102 by a user. The pressure sensor 1103 provides a signal indicating the intensity of a click on the touch sensor by the user to a display apparatus 1201. That is, whereas the switch 103 can be placed in two states, pressed and not pressed, the pressure sensor 1103 detects the degree of press as the intensity of a click.

The display apparatus 1201 differs from the display apparatus 601 in the second embodiment illustrated in FIG. 11 in that the display apparatus 1201 includes a click judging unit 1202, a click position information generating unit 1203, a correcting unit 1204, a cursor position determining unit 1205, and a series of cursor positions storage unit 1211 in place of the click judging unit 402, the click position information generating unit 403, the correcting unit 404, the cursor position determining unit 805, and the series of cursor positions storage unit 811.

The click judging unit 1202 generates intensity information indicating intensity obtained from the pressure sensor 1103 and, when the intensity obtained from the pressure sensor 1103 is equal to or greater than a predetermined reference intensity value, detects a click on the pressure sensor 1103. It should be noted that "the click on the pressure sensor 1103" means that the user has pressed the touch sensor 102 sufficiently in order to select an object 204 displayed on the display screen 202, for example.

Specifically, the click judging unit 1202 receives a signal indicating the intensity of a click on the pressure sensor 1103 by a user from the pressure sensor 1103 and generates click intensity information indicating the intensity it received. The click judging unit 1202 also represents a timing at which the intensity of the click on the pressure sensor 1103 by the user has been measured as time information and provides click information indicating the click intensity information and the time information to the click position information generating unit 1203.

Based on click information provided from the click judging unit 1202 and touch position information provided from a touch position information generating unit 401, the click position information generating unit 1203 associates click information with touch position information that indicates the same time information as the click information. The click position information generating unit 1203 provides the click information and the touch position information associated with each other to the cursor position determining unit 1205. The click position information generating unit 1203 also provides touch position information that coincides with the time at which the user has clicked the clickable touch sensor 105 with an intensity equal to or greater than the reference intensity value to the correcting unit 1204 as click position information.

The correcting unit 1204 selects one cursor position from series of cursor positions information obtained from the series of cursor positions storage unit 1211 according to the distance between a click position 302 indicated in click position information provided from the click position information generating unit 1203 and a correction reference point 301. The correcting unit 1204 then provides cursor position information indicating the selected cursor position to an object selection determining unit 407 as click position information.

Specific exemplary values of the click position 302, the correction reference point 301, and the correction judgment distance 306 are the same as those in the first embodiment and therefore description of such values will be omitted (see FIG. 5, for example). An example of series of cursor positions information provided from the series of cursor positions storage unit 1211 will be describe later with reference to FIG. 19.

Based on touch position information and click information provided from the click position information generating unit 1203, the cursor position determining unit 1205 determines cursor position information of a cursor 203 to be displayed on the display screen 202. The cursor position determining unit 1205 then provides the determined cursor position information to a cursor display control unit 408. The cursor position determining unit 1205 provides the cursor position information and the click position information obtained from the click position information generating unit 1203 to the series of cursor positions storage unit 1211.

The series of cursor positions storage unit 1211 associates cursor position information provided from the cursor position determining unit 1205 in which a cursor position and a time are associated with each other with click information and stores the information as series of cursor positions information. The series of cursor positions information is stored for a predetermined period of time. Series of cursor positions information that has been stored for a period of time beyond the predetermined period of time is discarded. The series of cursor positions storage unit 1211 provides all series of cursor positions information stored in it to the correcting unit 1204 according to an instruction from the correcting unit 1204.

FIG. 19 shows exemplary values of series of cursor positions information 1301 indicating a trajectory of the cursor 203 displayed on the display screen 202 of the display apparatus 1201 in the third variation of the second embodiment of the present invention. In FIG. 19, the same elements as those in FIG. 10 are given the same reference numerals and description of those elements will be omitted.

The series of cursor positions information 1301 indicates a time 702 at which cursor 203 position information (that is, touch position information) was input, a cursor position 703 corresponding to the time 702, and a click intensity 1302.

The click intensity 1302 in the example shown in FIG. 19 is represented by a value ranging from 0 to 100, where 0 represents a "not pressed at all" state and 100 represents a "fully pressed" state. FIG. 19 illustrates that "the clickable touch sensor 1105 was clicked with intensities of (20), (40), (60), (80), and (100) at times 30 ms, 60 ms, 90 ms, 120 ms, and 150 ms, respectively, while the cursor 203 was at positions of (480, 135), (360, 160), (355, 280), (315, 300), and (300, 300), respectively.

Note that the reference intensity value is 100, for example. Accordingly, the click judging unit 1202 detects the click on the touch sensor 102 when the user clicks the touch sensor 102 to fully press the pressure sensor 1103.

FIG. 20 shows exemplary values of a correction reference point 301, a correction judgment threshold 501, and a click intensity threshold 1401 in the third variation of the second embodiment of the present invention. In FIG. 20, the same elements as those in FIGS. 3 and 7A are given the same reference numerals and description of those elements will be omitted.

The click intensity threshold 1401 is a value used for correcting click position information. Details about how the click intensity threshold 1401 is used will be described with reference to FIG. 21.

FIG. 20 illustrates that "when the correction reference point 301 is at (0, 0) and the correction judgment distance 306 is equal to or greater than a correction judgment threshold 501 of (300), a click intensity threshold 1401 of (60) is used to make correction". Specifically, FIG. 20 illustrates that "when the correction reference point 301 is at (0, 0) and the correction judgment distance 306 is equal to or greater than a correction judgment threshold 501 of (300), a correction position 302 is corrected to a cursor position associated with intensity information indicating intensity equal to or greater than a click intensity threshold 1401 of (60)".

While one correction judgment threshold 501 and one click intensity threshold 1401 associated with the correction judgment threshold 501 are used in the example illustrated in FIG. 20, a plurality of correction judgment thresholds 501 and a plurality of click intensity thresholds 1401 may be used. Specifically, if a plurality of correction judgment thresholds 501 are used, the correction judgment thresholds 501 and click intensity thresholds 1401 are stored in association with each other. Here, preferably the click intensity threshold 1401 is decreased as the correction judgment threshold 501 increases. That is, preferably, the farther a click position is from a predetermined reference position (correction reference point 301), the greater correction is made, that is, the smaller click intensity threshold 1401 is set. This is because a deflection of click generally increases as the distance from the correction reference point 301 increases.

Figure 21:
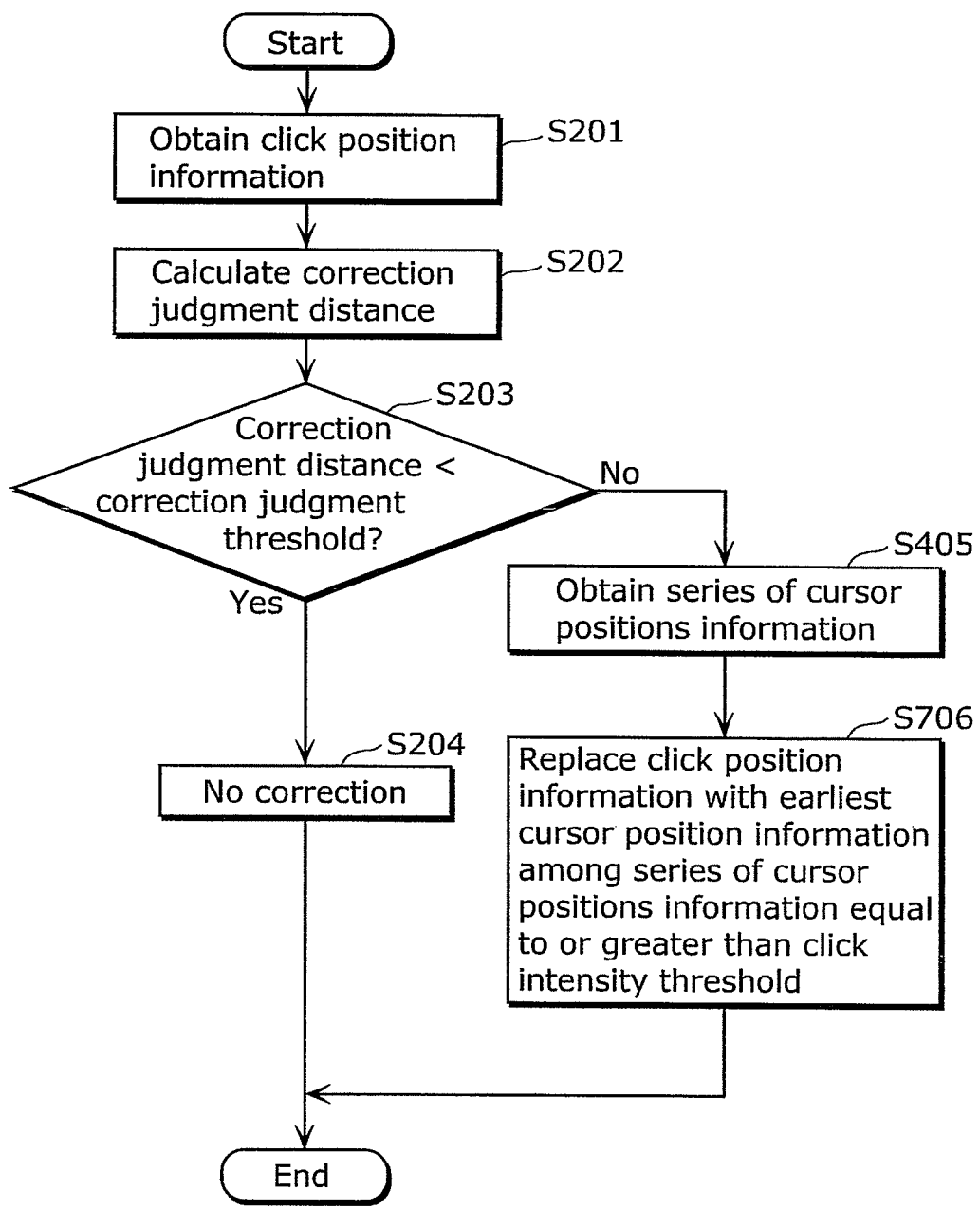
FIG. 21 is a flowchart illustrating an example of a method for correcting click position information performed by a correcting unit in the third variation of the second embodiment of the present invention.

FIG. 21 is a flowchart illustrating an example of a method performed by the correcting unit 1204 for correcting click position information in the third variation of the second embodiment of the present invention. In FIG. 21, the same operations as those in FIG. 14 are given the same reference numerals and description of those operations will be omitted.

As illustrated in FIG. 21, the operations (step S201 to step S203) of obtaining click position information by the correcting unit 1204, calculating a correction judgment distance 306, and comparing the calculated correction judgment distance 306 with a correction judgment threshold 501 are the same as those in FIG. 14. The operation of obtaining series of cursor positions information (step S405) performed by the correcting unit 1204 when the correction judgment distance 306 is greater than the correction judgment threshold 501 is also the same as the operation in FIG. 14. However, the correcting unit 1204 obtains series of cursor positions information 1301 including intensity information as shown in FIG. 20.

The correcting unit 1204 selects click intensity information that indicates intensity greater than the click intensity threshold 1401 and that is associated with the earliest time from the series of cursor positions information 1301 and replaces the click position information with cursor position information associated with the selected click intensity information (step S706).

In this way, the correcting unit 1204 refers to cursor position information stored in the series of cursor positions storage unit 1211 to replace click position information with the earliest cursor position information among the cursor position information that has click intensity information associated with the click position information that is equal to or greater than the click intensity threshold 1401. That is, the correcting unit 1204 corrects the click position information so that a corrected click position is a position at which the user touched the touch sensor 102 at the time the click intensity exceeds the click intensity threshold 1401 for the first time.

The process described above and illustrated in FIG. 21 will be described using specific exemplary values. For example, when the click reference intensity value is (100), click position information is cursor position information indicating a cursor position (300, 300) as shown in FIG. 19. In association with this, (0, 0) is used as the correction reference point 301 and (300, 300) is used as a click position 302 as shown in FIG. 5. As shown in FIG. 20, (300) is used as a correction judgment threshold 501 and (60) is used as the click intensity threshold 1401.

The correction judgment distance 306 is as described with respect to FIG. 14 and is greater than the correction judgment threshold 501 (No at step S203). Therefore the correcting unit 1204 obtains series of cursor positions information 1301 (step S405).

Cursor positions that correspond to click intensity 1302 equal to or greater than the click intensity threshold 1401 among the series of cursor positions information 1301 obtained are (355, 280), (315, 300), and (300, 300). Among the cursor position information, the cursor position information that corresponds to the earliest time information is (355, 280). Therefore, the correcting unit 1204 sets the cursor position information indicating the cursor position (355, 280) as corrected click position information.

In this way, the input device 1101 according to the third variation of the second embodiment may include a pressure sensor 1103 that detects click intensity in place of the switch 103. In this case, when it is determined that the touch sensor 102 has been clicked, that is, when intensity detected by the pressure sensor 1103 is equal to or greater than a reference intensity value (for example 100), the correcting unit 1204 corrects the click position information. Specifically, the correcting unit 1204 corrects the click position information so that a corrected position 304 is the earliest cursor position among the cursor positions with intensity equal to or greater than the click intensity threshold 1401. Thus, the click position 302 can be corrected to a touch position touched prior to occurrence of a deflection of click and therefore an operation error can be prevented.

It should be noted that while cursor position information, rather than touch position information, is stored in the storage unit in the embodiment described above, touch position information may be stored instead. That is, while the calculations are performed using the coordinate system in the display screen 202, the calculations may be performed using the coordinate system in the touch sensor 102.

Third Embodiment

A click position control apparatus according to a third embodiment is characterized by including a grip information generating unit which generates grip information indicating how a user is holding an input device, a correction information storage unit which stores a plurality of pieces of correction information, and a selecting unit which selects one of the plurality of pieces of correction information on the basis of the grip information.

In the third embodiment of the present invention, when correction is made based on the distance between a point (reference position) that serves as a benchmark on the input device and a click position (coordinates) indicating a user input on a clickable touch sensor, correction information is changed on the basis of grip information about how the input device is being held.

The input device in the third embodiment of the present invention has a cross section similar to that in the first embodiment and therefore a cross sectional view of the input device is omitted.

Figure 22:
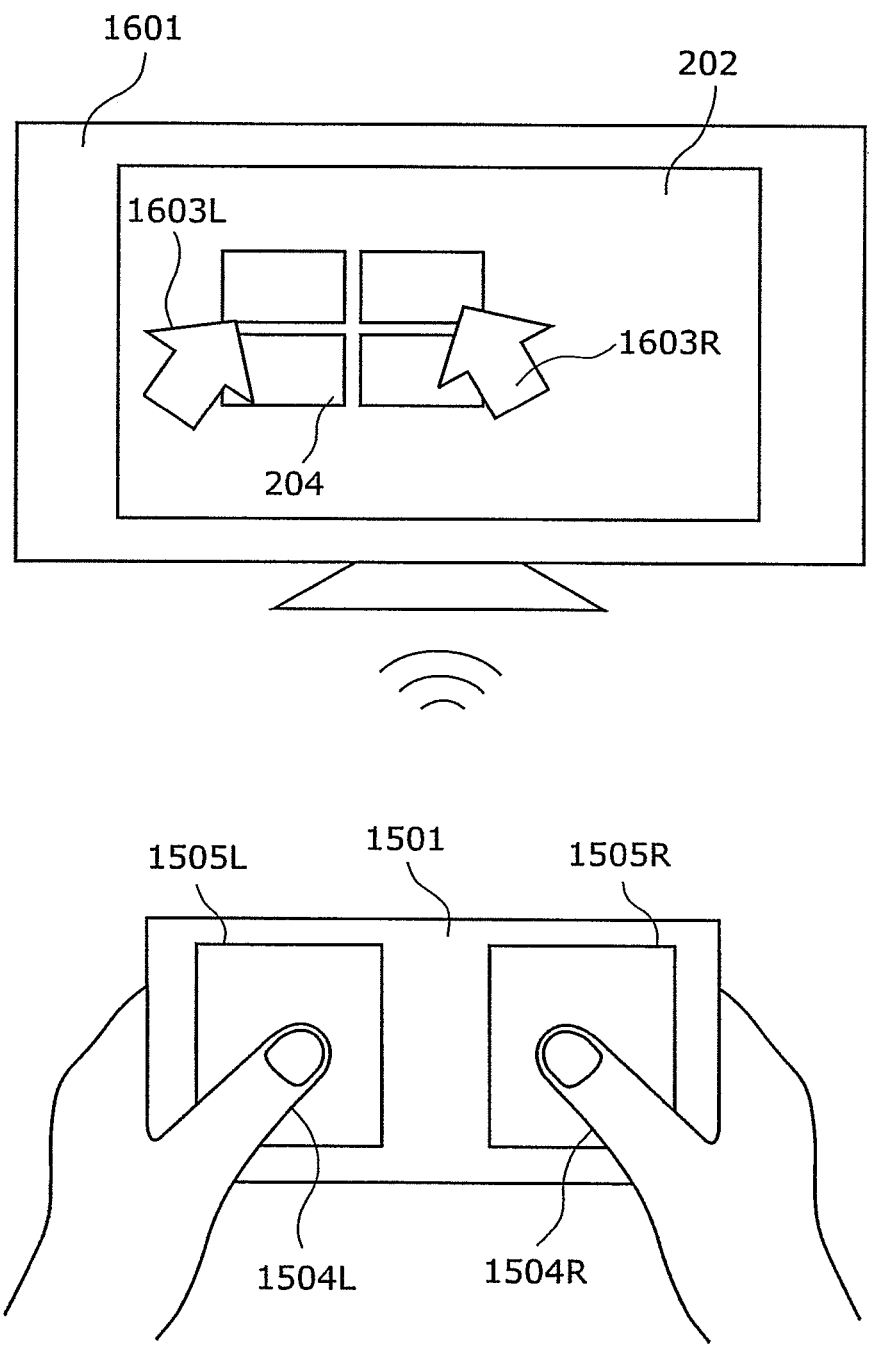
FIG. 22 is a schematic diagram illustrating an example of an input device and an example of a display apparatus in a third embodiment of the present invention.

FIG. 22 is a schematic diagram illustrating an example of the input device 1501 and an example of a display apparatus 1601 in the third embodiment of the present invention. In FIG. 22, the same components as those in FIG. 2 are given the same reference numerals and description of those components will be omitted.

The input device 1501 includes two clickable touch sensors (a left clickable touch sensor 1505L and a right clickable touch sensor 1505R), a grip sensor (not depicted in FIG. 22), and an acceleration sensor (not depicted in FIG. 22).

The left clickable touch sensor 1505L includes a left touch sensor 1502L and a left switch 1503L which is disposed under the left touch sensor 1502L and is pressed when a user clicks on the left touch sensor 1502L (not depicted in FIG. 22. See FIGS. 1 and 25). Similarly, the right clickable touch sensor 1505R includes a right touch sensor 1502R and a right switch 1503R which is disposed under the right touch sensor 1502R and is pressed when the user clicks on the right touch sensor 1502R (not depicted in FIG. 22. See FIGS. 1 and 25).

The left clickable touch sensor 1505L and the right clickable touch sensor 1505R are operated with a left finger 1504L and a right finger 1504R, respectively. The input device 1501 sends signals obtained through the left clickable touch sensor 1505L and the right clickable touch sensor 1505R to the display apparatus 1601 by wireless communication. A technology such as Bluetooth or ZigBee/IEEE 802.15.4 is used for the wireless communication, which is a well-known art and therefore description of such technology will be omitted here.

The signals that the input device 1501 sends to the display apparatus 1601 include a signal indicating a position at which a left finger 1504L of the user is touching the left clickable touch sensor 1505L and a signal indicating a click when left finger 1504L of the user clicks the left clickable touch sensor 1505L, a signal indicating a position at which a right finger 1504R of the user is touching the right clickable touch sensor 1505R, a signal indicating a click when the right finger 1504R of the user clicks the right clickable touch sensor 1505R, a signal indicating an orientation of the input device 1501 obtained through the acceleration sensor, and a signal indicating contact of a hand of the user with the input device 1501 obtained through the grip sensor.

A technology to measure the orientation of the input device 1501 with the acceleration sensor is a well-known art and therefore description of such technology will be omitted here. A technique to detect contact of a user's hand with the input device 1501 is also a known art and therefore description of such technology will be omitted.

The display apparatus 1601 obtains position information indicating a point at which the left finger 1504L is touching the left clickable touch sensor 1505L and position information indicating a position at which the right finger 1504R is touching the right clickable touch sensor 1505R, on the basis of the position-indicating signals provided from the input device 1501 and displays a left cursor 1603L and a right cursor 1603R at positions in a display screen 202 that correspond to the obtained position information. The user can manipulate the left cursor 1603L displayed on the display screen 202 by moving the left finger 1504L on the left clickable touch sensor 1505L and can manipulate the right cursor 1603R displayed on the display screen 202 by moving the right finger 1504R on the right clickable touch sensor 1505R.

A coordinate system of a left half of the entire display screen 202 is associated with a coordinate system of the left clickable touch sensor 1505L through absolute coordinates. A coordinate system of a right half of the entire display screen 202 is associated with a coordinate system of the right clickable touch sensor 1505R through absolute coordinates.

For example, position information on both of the left clickable touch sensor 1505L and the right clickable touch sensor 1505R is represented by X-coordinates ranging from 0 to 400 and Y-coordinates ranging from 0 to 300, where an origin point (0, 0) is at an end point at bottom left. Position information in the display screen 202 is represented by X-coordinates ranging from 0 to 960 and Y-coordinates ranging from 0 to 540, where an origin point (0, 0) is at an end point at bottom left.

In this case, the left half (an area with X-coordinates ranging from 0 to 480 and Y-coordinates ranging from 0 to 300) of the display screen 202 corresponds to the left clickable touch sensor 1505L and is an area where the left cursor 1603L moves around. The right half (an area with X-coordinates ranging from 480 to 960 and Y-coordinates ranging from 0 to 540) corresponds to the right clickable touch sensor 1505R and is an area where the right cursor 1603R moves around.

When the coordinate position on the left clickable touch sensor 1505L that is being touched by the user's left finger 1504L is (200, 150), the coordinate position of the left cursor 1603L displayed on the display screen 202 is (240, 270); when the coordinate position on the right clickable touch sensor 1505R that is being touched by the user's right finger 1504R is (200, 150), the coordinate position of the right cursor 1603R displayed on the display screen 202 is (720, 270).

When the user selects an object 204 located in the left half of the display screen 202, the user moves the left finger 1504L on the left clickable touch sensor 1505L to move the left cursor 1603L in the display screen 202 and clicks the left clickable touch sensor 1505L at the timing of the left cursor 1603L being superimposed on the intended object 204. Upon the click on the left clickable touch sensor 1505L by the user, the input device 1501 sends a click signal to the display apparatus 1601.

The display apparatus 1601 determines whether or not an object 204 displayed on the display screen 202 has been selected, on the basis of a signal indicating a position and a click signal provided from the left clickable touch sensor 1505L and information indicating the display position of the object 204. For example, when the left clickable touch sensor 1505L is clicked while a finger of the user is touching a point at the coordinates (200, 150) in the left clickable touch sensor 1505L, the coordinate position (240, 270) at which the left cursor 1603L is currently displayed is recognized as a click position. When the coordinate position (240, 270) given above is input as a click position in the case where the object 204 is at a coordinate position (200, 200) and has a size of 50 along an X-axis direction and 100 along a Y-axis direction, the display apparatus 1601 determines that the object 204 has been selected.

Note that operation performed when the user selects an object located in the right half of the display screen 202 is similar to the operation performed when the user selects an object located in the left half and therefore description of such an operation will be omitted.

Figure 23:
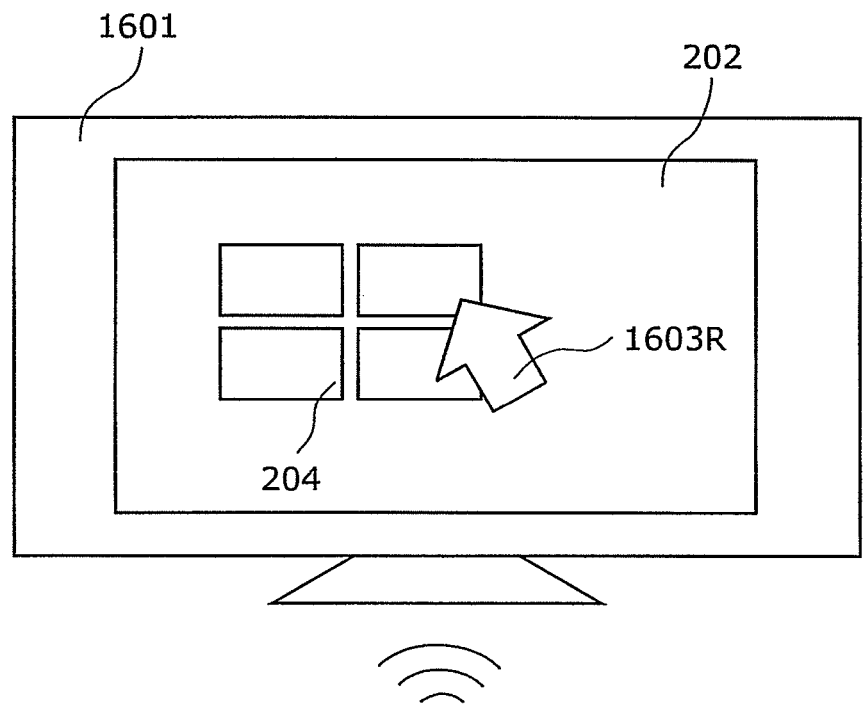
FIG. 23 is a schematic diagram illustrating a method for operating the input device held in a vertical orientation in the third embodiment of the present invention.

An input device 1501 including two clickable touch sensors like the one illustrated in FIG. 22 may be held and operated in a vertical orientation, in addition to horizontal orientation. Here, operation in a horizontal orientation is a mode in which the input device 1501 is held with both hands in a horizontal orientation as, illustrated in FIG. 22, the left clickable touch sensor 1505L is operated with a left finger 1504L and the right clickable touch sensor 1505R is operated with a right finger 1504R. Operation in a vertical orientation is a mode in which the input device 1501 is rotated 90 degrees as illustrated in FIG. 23, held with one hand in a vertical orientation, and the left clickable touch sensor 1505L is operated with a left finger 1504L, or the right clickable touch sensor 1505R is operated with a right finger 1504R. The user can change the input device 1501 from a horizontal orientation to a vertical orientation even while operating the input device 1501. An operation in vertical orientation will be described in detail with reference to FIG. 23.

It should be noted that the input device 1501 can determine its own orientation and make assignments of the left and right clickable touch sensors to rotate a logical direction of the input device 1501 to allow the right clickable touch sensor 1505R to be operated with a left finger 1504L or the left clickable touch sensor 1505L to be operated with a right finger 1504R. Similarly, in a horizontal orientation, the input device 1501 can be rotated so that the right clickable touch sensor 1505R can be operated with a left finger 1504L and the left clickable touch sensor 1505L can be operated with a right finger 1504R.

Here, the display apparatus 1601 determines a hand or hands (one of the left and right hands or both hands) holding the input device 1501 and the orientation of the input device 1501 on the basis of signals sent from the input device 1501, namely a touch signal obtained through the grip sensor and an orientation signal obtained through the acceleration sensor. The display apparatus 1601 uses the determination as to the hand(s) holding the input device 1501 and orientation of the input device 1501 to determine a cursor to display on the display screen 202 on the basis of a position indicating signal and a click signal sent from the input device 1501.

FIG. 23 is a schematic diagram illustrating a method for operating the input device 1501 held in a vertical orientation in the third embodiment of the present invention. In FIG. 23, the same elements as those in FIG. 22 are given the same reference numerals and description of those elements will be omitted.

FIG. 23 illustrates an example in which the right clickable touch sensor 1505R is operated with a right finger 1504R while the input device 1501 is held only with the right hand in a vertical orientation. In this case, only the right cursor 1603R is displayed on the display apparatus 1601. The coordinate system of the display screen 202 differ from that in FIG. 22; the coordinate system of the entire display screen 202 is associated with the coordinate system of the right clickable touch sensor 1505R through absolute coordinates.

For example, position information in the display screen 202 is represented by X-coordinates ranging from 0 to 960 and Y-coordinates ranging from 0 to 540, where an origin point (0, 0) is at an end point at bottom left as in FIG. 22. Position information on the right clickable touch sensor 1505R is represented by X-coordinates ranging from 0 to 400 and Y-coordinates ranging from 0 to 300, where an origin point (0, 0) is at an end point at bottom right because the right clickable touch sensor 1505R is rotated 90 degrees counterclockwise compared to the orientation of right clickable touch sensor 1505R in FIG. 22.

In this case, the entire display screen 202 corresponds to the right clickable touch sensor 1505R and serves as an area where the right cursor 1603R moves around. However, because the right clickable touch sensor 1505R is rotated 90 degrees counterclockwise compared with the orientation of the right clickable touch sensor 1505R in FIG. 22, the coordinate systems of the display screen 202 and the right clickable touch sensor 1505R correspond to each other in a different way: when a right finger 1504R of the user is touching a coordinate position (150, 200) on the right clickable touch sensor 1505R, the right cursor 1603R is displayed at a coordinate position (480, 270) on the display screen 202.

Figure 24:
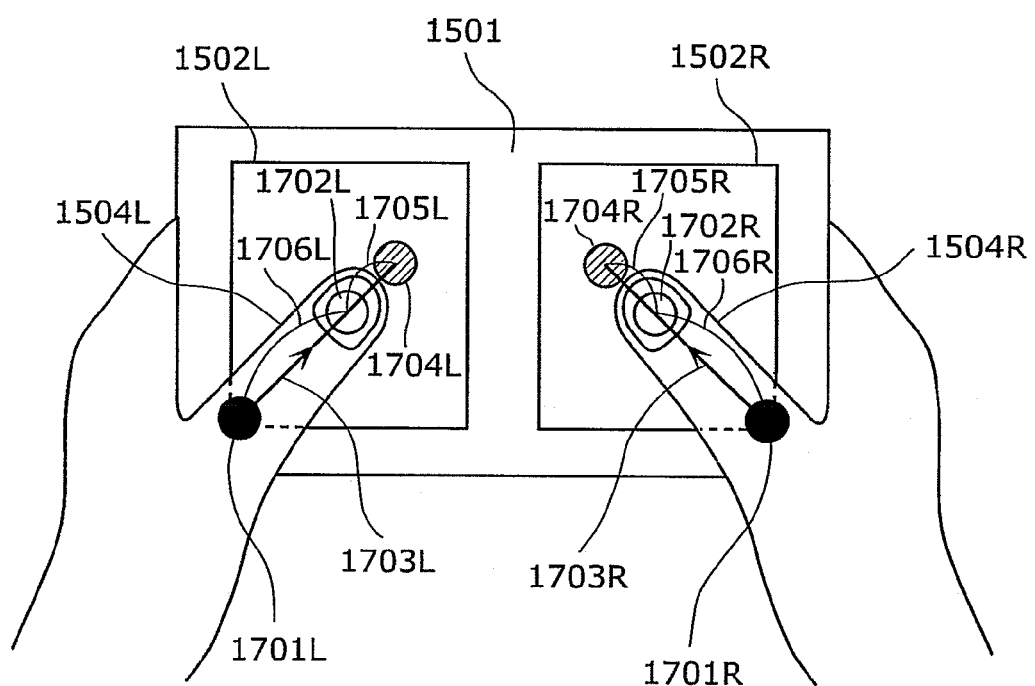
FIG. 24 is a diagram for explaining an example of correction of a left click position which is a position clicked with a left hand and an example of correction of a right click position which is a position clicked with a right hand in the third embodiment of the present invention.

FIG. 24 is a diagram for explaining an example of correction of a left click position, which is a position clicked with a left hand, and a correction of a right click position, which is a position clicked with a right hand, in the third embodiment of the present invention. In FIG. 24, the same elements as those in FIG. 22 are given the same reference numerals and description of those elements will be omitted.

A left correction reference point 1701L is fixed at a preset point on the input device 1501. For example, the left correction reference point 1701L is at a position at which the base of a left finger 1504L operating the left clickable touch sensor 1505L is expected to be located. Specifically, the left correction reference point 1701L is set on a perimeter of the left clickable touch sensor 1505L at a point at which a portion of the user's operating left finger 1504L other than the tip of the left finger 1504L contacts the input device 1501. It should be noted that coordinate values of the left correction reference point 1701L on the left clickable touch sensor 1505L are converted to coordinate values in the coordinate system of the display screen 202 and the converted coordinate values are used in all calculations using the left correction reference point 1701L.

A right correction reference point 1701R is fixed at a preset point on the input device 1501. For example, the right correction reference point 1701R is at a position at which the base of a right finger 1504R operating the right clickable touch sensor 1505R is expected to be located. Specifically, the right correction reference point 1701R is set on a perimeter of the right clickable touch sensor 1505R at a point at which a portion of the user's operating right finger 1504R other than the tip of the right finger 1504R contacts the input device 1501. It should be noted that coordinate values of the right correction reference point 1701R on the right clickable touch sensor 1505R are converted to coordinate values in the coordinate system of the display screen 202 and the converted coordinate values are used in all calculations using the right correction reference point 1701R.

A left click position 1702L represents a position at which press of the left switch 1503L is detected when the left clickable touch sensor 1505L is clicked with a left finger 1504L of the user to press the left switch 1503L.

A right click position 1702R represents a position at which press of the right switch 1503R is pressed when the right clickable touch sensor 1505R is clicked with a right finger 1504R of the user to press the right switch 1503R.

A left correction direction 1703L is a straight direction from the left correction reference point 1701L to the left click position 1702L.

A right correction direction 1703R is a straight direction from the right correction reference point 1701R to the right click position 1702R.

Suppose for example the left click position 1702L represented by X- and Y-coordinates is (100, 200) and the left correction reference point 1701L is at (0, 0). In this case, the left correction direction 1703L is a direction that has an inclination of (200−0)/(100−0)=2. The right correction direction 1703R can be calculated in the same way that the left correction direction 1703L is calculated and therefore exemplification of specific values will be omitted.

A corrected left position 1704L represents a position determined by correcting the left click position 1702L according to the third embodiment. Specifically, the corrected left position 1704L represents a position at a predetermined left correction distance 1705L from the left click position 1702L in the left correction direction 1703L.

A corrected right position 1704R represents a position determined by correcting the right click position 1702R according to the third embodiment. Specifically, the corrected right position 1704R represents a position at a predetermined right correction distance 1705R from the right click position 1702R in the right correction direction 1703R.

A left correction judgment distance 1706L is the distance between the left correction reference point 1701L and a left click position 1702L. When the left correction judgment distance 1706L is equal to or greater than a predetermine distance threshold, the left click position 1702L is corrected to a corrected left position 1704L.

A right correction judgment distance 1706R is the distance between the right correction reference point 1701R and a right click position 1702R. When the right correction judgment distance 1706R is equal to or greater than the predetermine distance threshold, the right click position 1702R is corrected to a corrected right position 1704R.

Here, the left correction reference point 1701L, the right correction reference point 1701R, the left correction distance 1705L, the right correction distance 1705R, and the distance threshold (correction judgment threshold) are determined by predetermined correction information. It should be noted that because the correction information varies depending on the way of holding the input device 1501, the click position control apparatus according to the third embodiment stores a plurality of pieces of correction information and selects among the plurality of pieces of the correction information according to the way of holding the input device 1501 indicated in grip information.

While the left correction reference point 1701L is on a perimeter of the left clickable touch sensor 1505 at a point at which a portion of a user's operating left finger 1504L other than the tip of the left finger 1504L contacts the input device 1501 in the third embodiment, the left correction reference point 1701L may be at a point on the left clickable touch sensor 1505L, or a point at which a hand holding the input device 1501 contacts the input device 1501, or a combination of all of the four points. Similarly, while the right correction reference point 1701R is on a perimeter of the right clickable touch sensor 1505R at a point at which a portion of a user's operating right finger 1504R other than the tip of the right finger 1504R contacts the input device 1501 in the third embodiment, the right correction reference point 1701R may be at a point on the right clickable touch sensor 1505R, a point at which a hand holding the input device 1501 contacts the input device 1501, or a combination of all of the four points.

A correction direction in the case of holding in a vertical orientation illustrated in FIG. 23 is the same as the correction direction in FIG. 3 and therefore description of the correction direction will be omitted.

Figure 25:
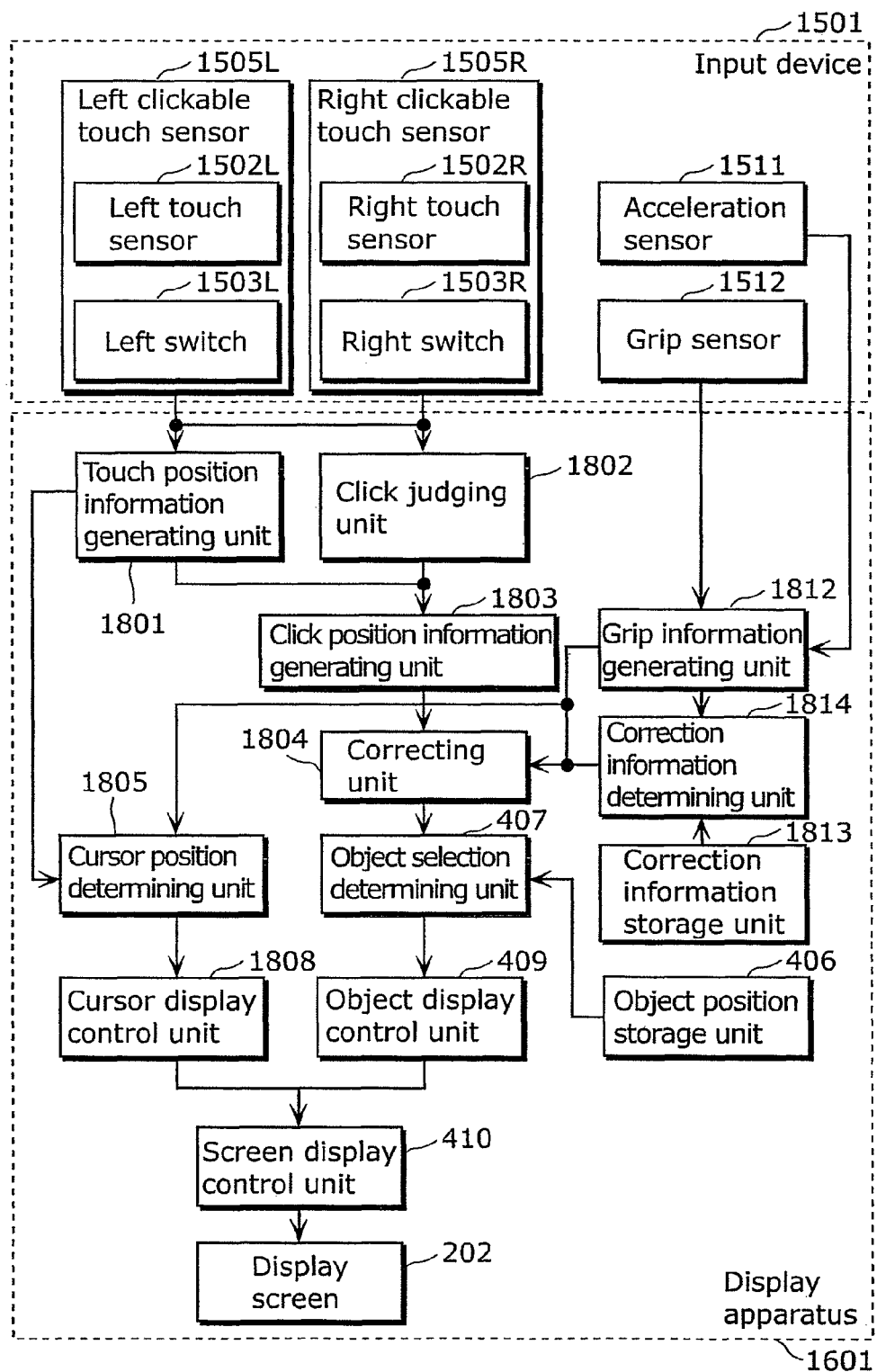
FIG. 25 is a block diagram illustrating an exemplary internal configuration of an input device including a clickable touch sensor and an exemplary internal configuration of a display apparatus, which is an example of the click position control apparatus, in the third embodiment of the present invention.

FIG. 25 is a block diagram illustrating an exemplary internal configuration of the input device 1501 and an exemplary internal configuration of a display apparatus 1601, which is an example of the click position control apparatus, in the third embodiment of the present invention. In FIG. 25, the same components as those in FIGS. 4A and 22 are given the same reference numerals and description of those components will be omitted.

The input device 1501 includes a left clickable touch sensor 1505L including a left touch sensor 1502L and a left switch 1503L, a right clickable touch sensor 1505R including a right touch sensor 1502R and a right switch 1503R, an acceleration sensor 1511, and a grip sensor 1512.

The left touch sensor 1502L and the right touch sensor 1502R are the same as the touch sensor 102 according to the first embodiment; the left switch 1503L and the right switch 1503R are the same as the switch 103 according to the first embodiment. Therefore, description of these components will be omitted.

The acceleration sensor 1511 is an example of a sensor that detects the orientation of the input device 1501. The grip sensor 1512 is an example of a sensor that detects a position at which a user is in contact with the input device 1501.

It should be noted that the acceleration sensor 1511 and the grip sensor 1512 are examples of detecting units for detecting how a user is holding the input device 1501 and may be any sensors.

The display apparatus 1601 differs from the display apparatus 201 according to the first embodiment in FIG. 4A in that the display apparatus 1601 includes a touch position information generating unit 1801, a click judging unit 1802, a click position information generating unit 1803, a correcting unit 1804, a cursor position determining unit 1805, and a cursor display control unit 1808 instead of the touch position information generating unit 401, the click judging unit 402, the click position information generating unit 403, the correcting unit 404, the cursor position determining unit 405, and the cursor display control unit 408. The display apparatus 1601 differs from the display apparatus 201 according to the first embodiment in FIG. 4A also in that the display apparatus

1601 further includes a grip information generating unit 1812, a correction information storage unit 1813, and a correction information determining unit 1814.

The touch position information generating unit 1801 generates touch position information indicating positions in the left touch sensor 1502L and the right touch sensor 1502R touched by a user (a left touch position and a right touch position). Specifically, the touch position information generating unit 1801 obtains signals indicating positions at which the user is touching the left touch sensor 1502L and the right touch sensor 1502R from the left touch sensor 1502L and the right touch sensors 1502R.

The touch position information generating unit 1801 then represents the positions at which the user is touching the touch sensors using X- and Y-coordinates and provides the coordinates indicating the touch positions to the click position information generating unit 1803 and the cursor position determining unit 1805 as touch position information. Note that the touch position information also indicates a time at which the user touched any of the touch sensors. When the touch position information generating unit 1801 provides the touch position information, the touch position information generating unit 1801 puts an information ID indicating "left" or "right" information in the touch position information and provides the information. The information ID will be described later with reference to FIG. 26.

The click judging unit 1802 detects a click on at least one of the left switch 1503L and the right switch 1503R, which are an example of a click detecting unit. Specifically, when the user presses or releases each of the left and right switches 1503L and 1503R, the click judging unit 1802 receives a signal from each of the left and right switches 1503L and 1503R, represents the timing at which the user has pressed each switch by time information, and provides the time information to the click position information generating unit 1803 as click information. Note that when the click judging unit 1802 provides the click information, the click judging unit 1802 puts an information ID indicating "left" or "right" information in the click information and provides the information.

When the click judging unit 1802 detects the click on at least one of the left switch 1503L and the right switch 1503R, the click position information generating unit 1803 uses touch position information to generate click position information indicating a left click position 1702L or a right click position 1702R which is a position at which at least one of the left switch 1503L and the right switch 1503R has been pressed.

Specifically, the click position information generating unit 1803 compares the information ID contained in click information provided from the click judging unit 1802 with the information ID contained in touch position information provided from the touch position information generating unit 1801. That is, the click position information generating unit 1803 selects touch position information that contains the same information ID as the information ID contained in the click position information.

The click position information generating unit 1803 then provides touch position information containing time information indicating a time identical to a time contained in the click information from the selected touch position information to the correcting unit 1804 as click position information. Note that when the click position information generating unit 1803 provides the click position information, the click position information generating unit 1803 puts an information ID indicating "left" or "right" information in the click position information and provides the information.

Figures 26, 27, 28:
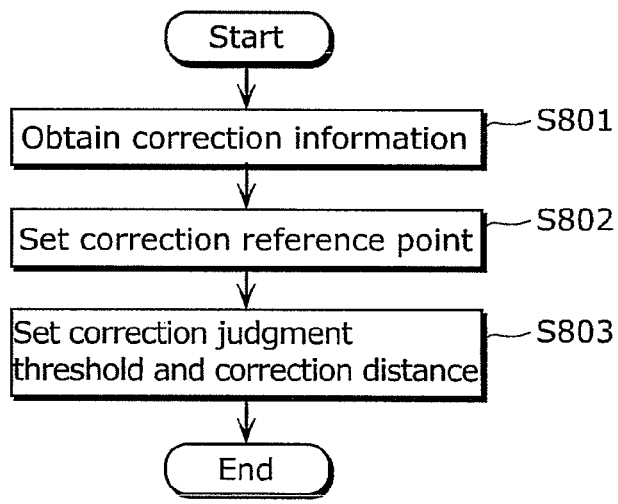
FIG. 26 shows specific exemplary values of an information ID, a click position, a correction reference point and a correction judgment distance in the third embodiment of the present invention.
FIG. 27 is a flowchart illustrating an example of operation for presetting parameters such as a correction reference point and a correction distance on the basis of correction information in the third embodiment of the present invention.
FIG. 28 shows exemplary values of correction information in the third embodiment of the present invention.

The correcting unit 1804 uses correction information determined by the correction information determining unit 1814 to correct click position information provided from the click position information generating unit 1803. Specifically, the correcting unit 1804 corrects click position information according to the distance (correction judgment distance) between a click position indicated in click position information provided from the click position information generating unit 18903 and a correction reference point indicated in correction information containing the information ID identical to the information ID contained in the click position information. The correcting unit 1804 then provides the corrected click position information to an object selection determining unit 407. Specific exemplary values of the click position information, the correction reference point, and the correction judgment distance are shown in FIG. 26.

The cursor position determining unit 1805 determines cursor position information on positions of the left cursor 1603L and the right cursor 1603R to be displayed on the display screen 202 on the basis of touch position information provided from the touch position information generating unit 1801 and grip information provided from grip information generating unit 1812 and provides the determined cursor position information to the cursor display control unit 1808.

The cursor display control unit 1808 performs control concerning display of the left cursor 1603L and the right cursor 1603R, such as a display effect associated with movements of the cursors, on the basis of the position information of the left and right cursors 1603L and 1603R provided from the cursor position determining unit 1805. The cursor display control unit 1808 then provides cursor display information indicating the result of the control performed for the left and right cursors 1603L and 1603R to a screen display control unit 410.

The grip information generating unit 1812 generates grip information indicating how the user is holding the input device 1501. Specifically, the grip information generating unit 1812 obtains a signal indicating a tilt of the input device 1501 from the acceleration sensor 1511. A method for detecting a tilt of the input device 1501 through the acceleration sensor 1511 is a well-known art and therefore description of the method will be omitted here.

The grip information generating unit 1812 also obtains a signal indicating contact of a hand of the user with the input device 1501. Based on the obtained signal indicating the tilt and the signal indicating the contact, the grip information generating unit 1812 generates grip information indicating which hand the user is holding the input device 1501 with and in which orientation. The grip information generating unit 1812 provides the generated grip information to the cursor position determining unit 1805, the correction information determining unit 1814, and the correcting unit 1804.

For example, the grip information is information indicating an orientation of the input device 1501 with respect to the display apparatus 1601, for example information indicating which side of the input device 1501 is closest to the display screen 202. The grip information also indicates whether the input device 1501 is held in a vertical orientation or a horizontal orientation, and if held in a vertical orientation, which of the left and right hand the input device 1501 is held with.

The correction information storage unit 1813 is a memory for storing a plurality of pieces of correction information. Specifically, the correction information storage unit 1813 stores correction information for making correction according to grip information about how the user is holding the input device 1501.

For example, the correction information is information indicating a correction reference point, a threshold used for determining whether or not to make correction, a value (correction distance) used when the correction is actually made, and others. The correction information is provided to the correction information determining unit 1814 according to an instruction from the correction information determining unit 1814. Specific exemplary values of the correction information will be described later with reference to FIGS. 28 and 29.

The correction information determining unit 1814 is an example of a selecting unit according to the present invention and selects one of a plurality of pieces of correction information on the basis of grip information. Specifically, the correction information determining unit 1814 determines, on the basis of grip information provided from the grip information generating unit 1812, which of the pieces of correction information stored in the correction information storage unit 1813 is to be used. After the determination, the correction information determining unit 1814 selects the piece of correction information used for correction and provides the selected correction information to the correcting unit 1804.

For example, there are various pieces of correction information associated with how the input device 1501 is held (that is, grip information) such as correction information for vertical holding or horizontal holding, or correction information used when the right clickable touch sensor 1505R is used in a vertical orientation or correction information used when the left clickable touch sensor 1505L is used in a vertical orientation. That is, since correction information and grip information are stored in association with each other in the correction information storage unit 1813, the correction information determining unit 1814 can select correction information corresponding to grip information provided from the grip information generating unit 1812.

FIG. 26 shows specific exemplary values of the information ID 1901, the click position 1702, the correction reference point 1701, and the correction judgment distance 1706 in the third embodiment of the present invention. The exemplary values in FIG. 26 represent information for the "left clickable touch sensor 1505L held in a horizontal orientation", information for the "right clickable touch sensor 1505R held in a horizontal orientation", and information for the "right clickable touch sensor 1505R held in a vertical orientation", from top to bottom rows.

The information ID 1901 is contained in information such as click position information provided from the click position information generating unit 1803 and correction information provided from the correction information determining unit 1814 and indicates which of the left clickable touch sensor 1505L and the right clickable touch sensor 1505R each item of information relates to. There are two types of information IDs: "left" and "right" information IDs.

The click position 1702 is a position on the clickable touch sensor at which the user has performed a click operation. The click position information contains an information ID 1901. For example, the click position information containing an information ID 1901 of "left", in the first row is information representing coordinate values of a left click position 1702L. The click position information containing an information ID 1901 of "right", in the second or third row is information representing coordinate values of a right click position 1702R.

The correction reference point 1701 is set on a perimeter of the clickable touch sensor at a point at which a portion of an operating finger of the user other than the tip of the finger contacts the input device 1501. The correction reference point 1701 is associated with an information ID 1901 and contained in correction information. The correction reference point 1701 associated with an information ID 1901 of "Left", represents coordinate values of a left correction reference point 1701L. The correction reference point 1701 associated with an information ID 1901 of "Right", represents coordinate values of a right correction reference point 1701R.

It should be noted that the coordinate values of the left correction reference point 1701L on the left clickable touch sensor 1505L and the coordinate values of the right correction reference point 1701R on the right clickable touch sensor 1501R are converted to coordinate values in the coordinate system of the display screen 202 and the converted coordinate values are used in all calculations using the correction reference points 1701.

The correction judgment distance 1706 represents the distance between a click position 1702 indicated in click position information and the correction reference point 1701 having the same information ID 1901 as the click position 1702. That is, a correction judgment distance 1706 associate with the information ID 1901 indicating "left" is a left correction judgment distance 1706L, which is the distance between the left correction reference point 1701L and a left click position 1702L. Similarly, a correction judgment distance 1706 associated with the information ID 1901 indicating "right" is a right correction judgment distance 1706R, which is the distance between the right correction reference point 1701R and a right click position 1702R. It should be noted that the distances are calculated using coordinate values represented by X- and Y-coordinates and the square root of the sum of squares of a difference between the X-coordinate of a correction reference point 1701 and the X-coordinate of a click position 1702 and a difference between the Y-coordinate of the correction reference point 1701 and the Y-coordinate of the click position 1702.

The example shown in FIG. 26 illustrates a case where "a click operation on the left clickable touch sensor 1505L held in a horizontal orientation has occurred at (200, 200)", a case where "a click operation on the right clickable touch sensor 1505R held in a horizontal orientation has occurred at (660, 300)", and a case where "a click operation on the right clickable touch sensor 1505R held in a vertical orientation has occurred at (860, 440)".

FIG. 27 is a flowchart illustrating an example of operation for presetting parameters such as the correction reference point 1701 and the correction distance 1705 on the basis of correction information in the third embodiment of the present invention. The presetting takes place at timing when grip information on the input device 1501 has changed. For example, the presetting takes place when a user holds the input device 1501, or when the user changes the way of holding the input device 1501. Specifically, the presetting takes place when the acceleration sensor 1511 and the grip sensor 1512 detect a signal anew or when a detected signal significantly changes.

First, when grip information on the input device 1501 provided from the grip information generating unit 1812 changes, the correcting unit 1804 obtains correction information corresponding to the grip information on the input device 1501 from the correction information determining unit 1814 (step S801). Here, the correction information contains a correction reference point 1701, a correction judgment threshold, and an information ID.

Specifically, the grip information generating unit 1812 receives signals from the acceleration sensor 1511 and the grip sensor 1512 at regular intervals and generates grip information on the basis of the received signals. When the generated grip information differs from grip information previously generated, the grip information generating unit 1812 determines that the user has changed the way of holding the input device 1501 and provides the grip information to the correction information determining unit 1814. The correction information determining unit 1814 selects correction information from the correction information storage unit 1813 on the basis of the provided grip information and provides the selected correction information to the correcting unit 1804. Thus, the correcting unit 1804 obtains the correction information.

Then, the correcting unit 1804 sets coordinates for the correction reference point 1701 on the basis of the correction information provided from the correction information determining unit 1814 (step S802).

The correcting unit 1804 then sets a correction judgment threshold and a correction distance required for correcting click position information from the correction information obtained from the correction information determining unit 1814 (step S803).

Figures 29, 30:
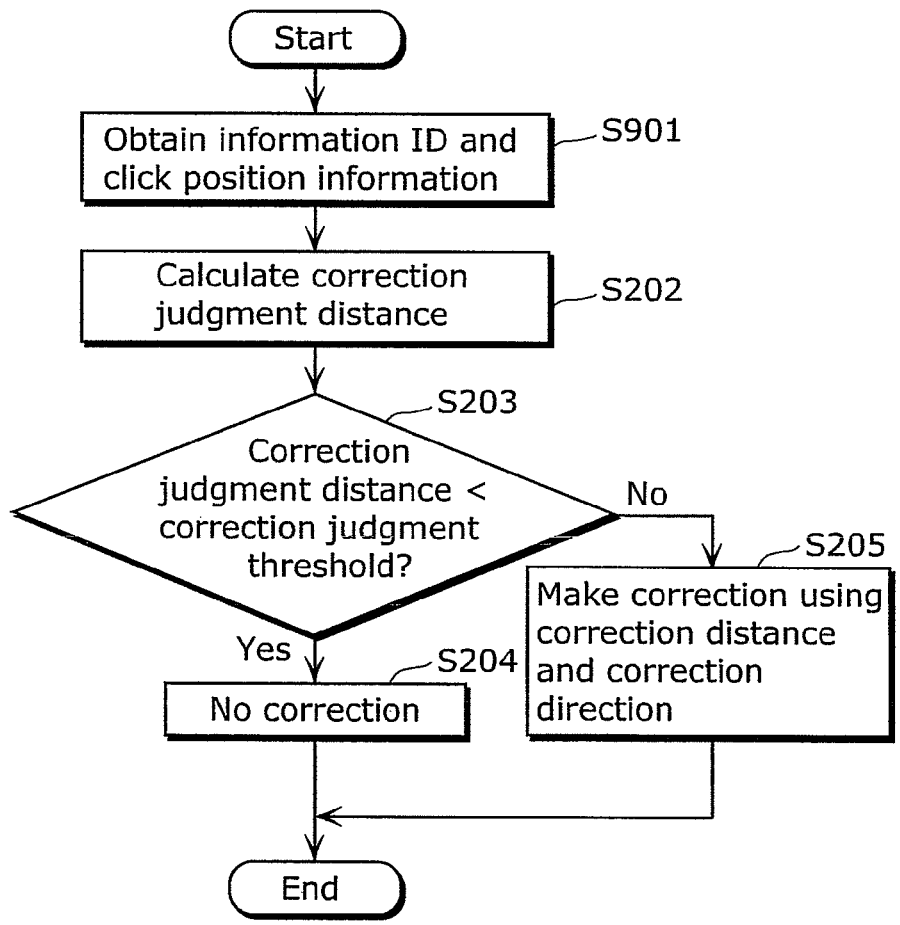
FIG. 29 shows exemplary values of correction information in the third embodiment of the present invention.
FIG. 30 is a flowchart illustrating an example of a method for correcting click position information performed by a correcting unit in the third embodiment of the present invention.

FIGS. 28 and 29 show specific exemplary values of the coordinates of the correction reference point 1701, the correction judgment threshold, and the correction distance 1705 set by the correcting unit 1804.

FIG. 28 shows exemplary values of correction information 2001 in the third embodiment of the present invention.

The correction information 2001 includes an information ID 1901, a correction reference point 1701, a correction judgment threshold 2002, and a correction distance 1705. The exemplary values shown in FIG. 28 indicates a case where the input device 1501 is held and operated in a horizontal orientation as illustrated in FIG. 22. In FIG. 28, the same elements as those in FIGS. 24 and 26 are given the same reference numerals and description of those elements will be omitted.

A correction judgment threshold 2002 is associated with an information ID 1901 and a correction distance 1705. The correction judgment threshold 2002 is used for comparison with a correction judgment distance 1706 associated with the same information ID 1901 as that of the correction judgment threshold 2002 during correction of click position information.

A correction judgment distance 1706 associated with the information ID 1901 indicating "left" (that is, a left correction judgment distance 1706L) is compared with a correction judgment threshold 2002 associated with the information ID 1901 indicating "left". Similarly, a correction judgment distance 1706 associated with the information ID 1901 indicating "right" (that is, a right correction judgment distance 1706R) is compared with a correction judgment threshold 2002 associated with the information ID 1901 indicating "right".

A correction distance 1705 is associated with an information ID 1901 and a correction judgment threshold 2002 and indicates a value applied to click position information when determination is made using the correction judgment threshold 2002.

A correction distance 1705 associated with the information ID 1901 indicating "left" (that is, a left correction distance 1705L) is applied to a click position 1702 associated with the information ID 1901 indicating "left" (that is, a left click position 1702L). Similarly, a correction distance 1705 associated with the information ID 1901 indicating "right" (that is, a right correction distance 1705R) is applied to a click position 1702 associated with the information ID 1901 indicating "right" (that is, a right click position 1702R).

FIG. 28 indicates that "when the left correction reference point 1701L associated with the information ID 1901 indicating "left" is (0, 0) and the left correction judgment distance 1706L is equal to or greater than a correction judgment threshold 2002 of (300), a position at a left correction distance 1705L of (20) from a left click position 1702L in the left correction direction 1703L is set as a corrected left click position". FIG. 28 also indicates that "when the right correction reference point 1701R associated with the information ID 1901 indicating "right" is (960, 0) and the right correction judgment distance 1706R is equal to or greater than a correction judgment threshold 2002 of (300), a position at a right correction distance 1705R of (20) from a right click position 1702R in the right correction direction 1703R is set as a corrected right click position".

FIG. 29 shows exemplary values of correction information 2101 in the third embodiment of the present invention. The exemplary values shown in FIG. 29 indicate a case where the input device 1501 is held and operated in a vertical orientation as illustrated in FIG. 23. In FIG. 29, the same elements as those in FIGS. 24 and 26 are given the same reference numerals and description of those elements will be omitted.

FIG. 29 indicates that "when the right correction reference point 1701R associated with the information ID 1901 indicating "right" is (960, 0) and the right correction judgment distance 1706R is equal to or greater than a correction judgment threshold 2002 of (300), a position at a right correction distance 1705R of (20) from a right click position 1702R in the right correction direction 1703R is set as a corrected right click position".

While one correction judgment threshold 2002 and one correction distance 1705 associated with the correction judgment threshold 2002 are used in the examples shown in FIGS. 28 and 29, a plurality of correction judgment thresholds 2002 and a plurality of correction distances 1705 may be used. Furthermore, while one piece of correction information 2001 and 2101 is stored for each way of holding in the examples shown, the correction information storage unit 1813 can store a plurality of pieces of correction information for each way of holding the input device 1501.

FIG. 30 is a flowchart illustrating an example of a method for correcting click position information performed by the correcting unit 1804 in the third embodiment of the present invention. In FIG. 30, the same operations as those in FIG. 8 are given the same reference numerals and description of those operations will be omitted.

First, the correcting unit 1804 obtains click position information including an information ID 1901 (step S901). Specifically, when a user clicks the left clickable touch sensor 1505L or the right clickable touch sensor 1505R, click position information including an information ID 1901 is provided from the click position information generating unit 1803 to the correcting unit 1804.

The rest of the process is the same as the process performed by the correcting unit 404 of the first embodiment illustrated in FIG. 8. However, the correcting unit 1804 according to the third embodiment uses information associated with the same information ID 1901 as the information ID 1901 provided to perform the rest of the process (steps S202 to S205).

The process illustrated in FIG. 30 will be described using specific exemplary values.

A case will be described first in which an information ID 1901 indicating "left", a correction reference point 1701 of (0, 0), and click position information indicating a click position 1702 (200, 200) as shown in the first row of FIG. 26 are provided. Here, because the information ID associated with the click position information is "left", the correcting unit 1804 uses (300) as the correction judgment threshold 2002 associated with the information ID 1901 indicating "left" and (20) as the correction distance 1705 as illustrated in FIG. 28.

First, the correcting unit 1804 calculates a correction judgment distance 1706 (step S202). As a result, a correction judgment distance 1706 of (280) is yielded.

The correcting unit 1804 then compares the correction judgment distance 1706 (280) with the correction judgment threshold 2002 (300) (step S203). Since the correction judgment distance 1706 (280) is less than the correction judgment threshold 2002 (300) (Yes at step S203), the correcting unit 1804 does not correct the click position information (step S204). Thus, the click position information indicating the click position (200, 200) is provided to an object selection determining unit 407 without being corrected.

A case will be described next in which an information ID 1901 indicating "right", a correction reference point 1701 of (960, 0), and click position information indicating a click position 1702 of (660, 300) as shown in the second row of FIG. 26 are provided. Here, because the information ID associated with the click position information is "right", the correcting unit 1804 uses (300) as the correction judgment threshold 2002 corresponding to the information ID 1901 indicating "right" and (20) as the correction distance 1705 as illustrated in FIG. 28.

First, the correcting unit 1804 calculates a correction judgment distance 1706 (step S202). As a result, a correction judgment distance 1706 of (420) is yielded.

The correcting unit 1804 then compares the correction judgment distance 1706 (420) with the correction judgment threshold 2002 (300) (step S203). Since the correction judgment distance 1706 (420) is greater than the correction judgment threshold 2002 (300) (No at step S203), the correcting unit 1804 calculates a corrected position which is a position at a correction distance of (20) from the click position (660, 300) in a straight direction (a right correction direction 1703R) from the click position 1702 to the correction reference point 1701. That is, the X-coordinate of the click position 1702 is 660−14=646 and the Y-coordinates of the click position 1702 is 300+14=314. Thus, the corrected position 1704 indicated in the corrected click position information is (646, 314).

The process illustrated in FIG. 30 performed when the user has switched to holding the input device 1501 only with the right hand in a vertical orientation as illustrated in FIG. 23 will also be described using specific exemplary values.

For example, a case will be described in which an information ID 1901 indicating "right", a correction reference point 1701 of (960, 0), and click position information indicating a click position 1702 (860, 100) as shown in the third row of FIG. 26 are provided.

It should be noted that the fact that the user is holding the input device 1501 in a vertical orientation can be determined from grip information provided from the grip information generating unit 1812. Accordingly, the correcting unit 1804 makes settings such as a correction reference point 1701 on the basis of correction information 2101 shown in FIG. 29, for example, according to the flowchart illustrated in FIG. 27. As shown in FIG. 29, (300) is used as the correction judgment threshold 2002 corresponding to the information ID 1901 indicating "right" and (20) is used as the correction distance 1705 as shown in FIG. 29.

First, the correcting unit 1804 calculates a correction judgment distance 1706 (step S202). As a result, a correction judgment distance 1706 of (140) is yielded.

Then, the correcting unit 1804 compares the correction judgment distance 1706 (140) with the correction judgment threshold 2002 (300) (step S203). Since the correction judgment distance 1706 (140) is less than the correction judgment threshold 2002 (300) (Yes at step S203), the correcting unit 1804 does not correct the click position information (step S204). Thus, the click position information indicating the click position (860, 100) is provided to the object selection determining unit 407 without being corrected.

In this way, the click position control apparatus according to the third embodiment determines how a user is holding the input device 1501 and changes correction information on the basis of the result of the determination to correct a click position. Specifically, because the input device 1501 according to the third embodiment includes two clickable touch sensors, the click position control apparatus according to the third embodiment puts an information ID indicating which of the clickable touch sensors information is related to in information such as touch position information, click position information, and correction information and provides the information to each processing unit. Each processing unit then uses information indicating the same information ID to correct click position information. Details of the correction method are the same as those in the first embodiment.

Thus, a click position can be corrected simply by storing a plurality of pieces of correction information for each way of holding the input device 1501 and for each clickable touch sensor. Accordingly, an operation error due to a deflection of click by a user can be prevented without needing a history of user operations even when the user is changed or a new user uses the input device.

(Variation of the Third Embodiment)

Figure 31:
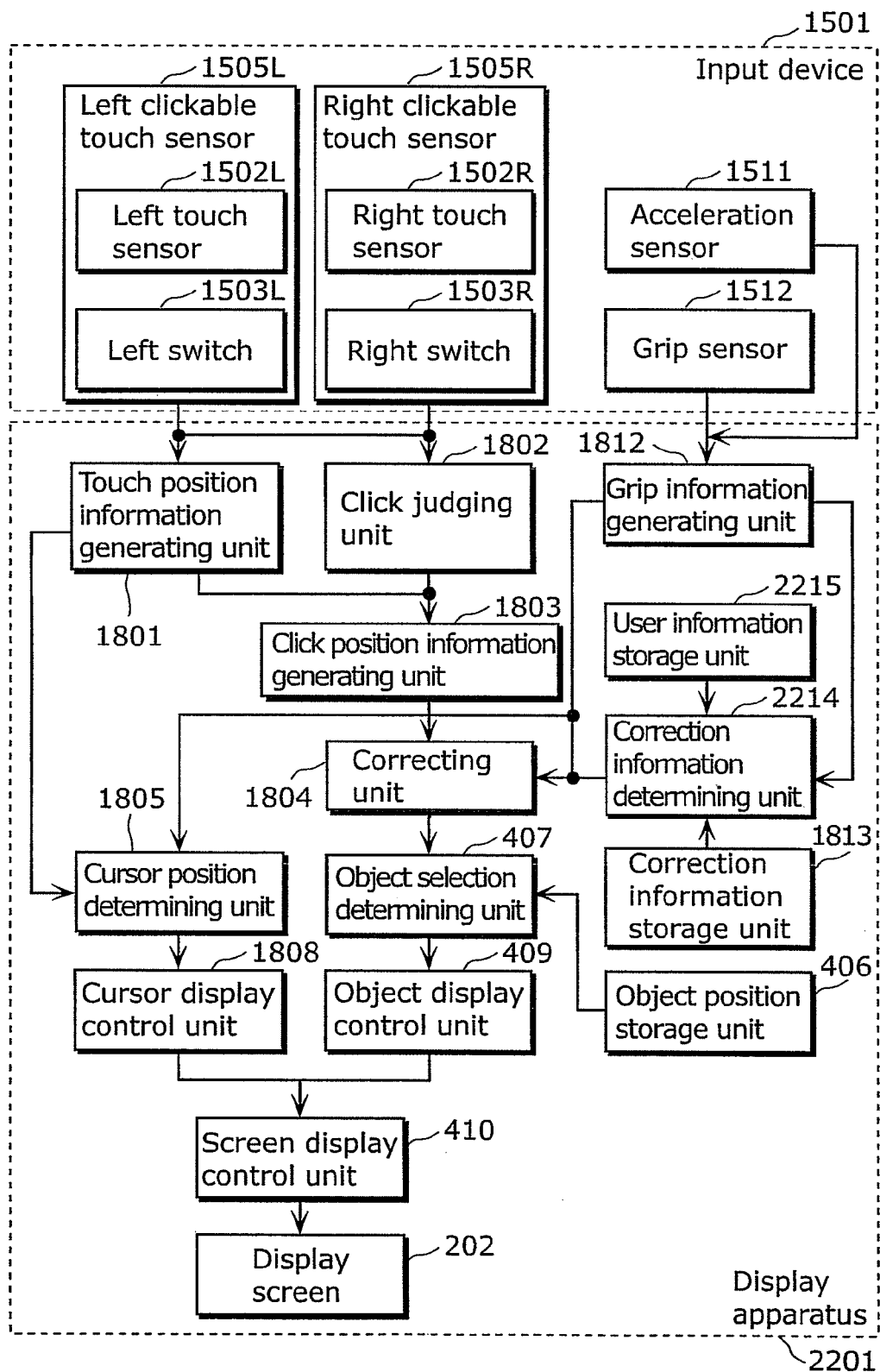
FIG. 31 is a block diagram illustrating an exemplary internal configuration of an input device including a clickable touch sensor and an exemplary internal configuration of a display apparatus, which is an example of the click position control apparatus, in a variation of the third embodiment of the present invention.

Correction information may be changed on the basis of user information registered previously. FIG. 31 shows a block diagram of an implementation in which correction information is changed on the basis of previously registered information about a user.

FIG. 31 is a block diagram illustrating exemplary internal configurations of an input device 1501 and a display apparatus 2201, which is an example of the click position control apparatus, in a variation of the third embodiment of the present invention. In FIG. 31, the same components as those in FIGS. 22 and 25 are given the same reference numerals and description of those components will be omitted.

The display apparatus 2201 differs from the display apparatus 1601 illustrated in FIG. 25 in that the display apparatus 2201 includes a correction information determining unit 2214 in place of the correction information determining unit 1814 and includes a user information storage unit 2215 in addition.

The user information storage unit 2215 is a storage, such as a memory, that stores user information indicating characteristics of a user. Specifically, the user information storage unit 2215 stores user information registered previously, and provides the user information to the correction information determining unit 2214. The user information is information indicating a user's characteristics relating to the efficiency of operations on a clickable touch sensor, for example information such as the lengths of fingers of the user and dominant hands of the user.

The correction information determining unit 2214 selects one of pieces of correction information stored in a correction information storage unit 1813 on the basis of grip information provided from a grip information generating unit 1812. The correction information determining unit 2214 then corrects the selected correction information on the basis of user information provided from the user information storage unit 2215. The correction information determining unit 2214 provides the corrected correction information to be used for correcting click information to a correcting unit 1804.

The correction information determining unit 2214 may store the corrected correction information in the correction information storage unit 1813.

Figures 32, 33:
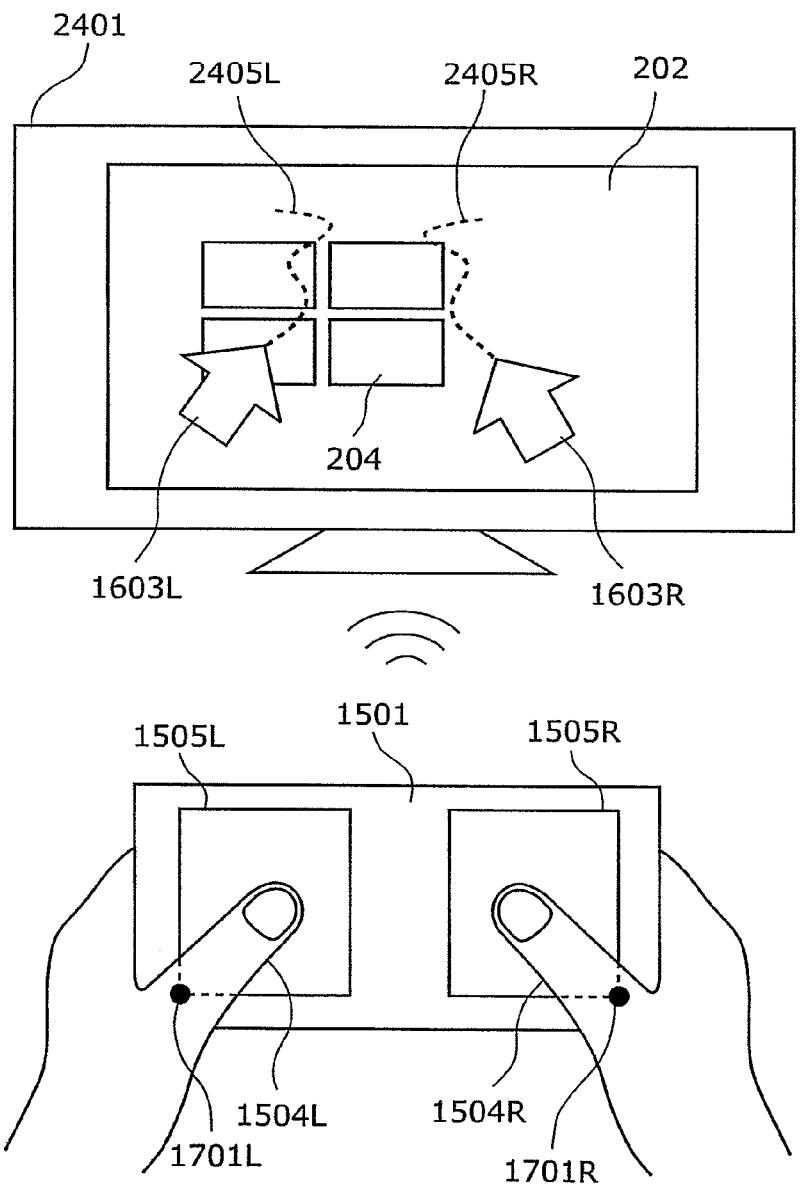
FIG. 32 shows exemplary values of correction information corrected by a correction information determining unit in a variation of the third embodiment of the present invention.
FIG. 33 is a schematic diagram illustrating an example of an input device and a display apparatus in a fourth embodiment of the present invention.

FIG. 32 is a diagram illustrating exemplary values of correction information 2301 corrected by the correction information determining unit in the variation of the third embodiment of the present invention. It should be noted that FIG. 32 is a diagram for explaining correction of correction information made on the basis of the length of a finger of a user, which is an example of user information. In FIG. 32, the same elements as those in FIG. 28 are given the same reference numerals and description of those elements will be omitted.

Correction information 2301 includes an information ID 1901, a correction reference point 1701, a correction judgment threshold 2302, and a correction distance 1705.

In FIG. 32, L1 represents a value that depends on the length of a left finger 1504L and L2 represents a value that depends on the length of a right finger 1504R. The values of L1 and L2 are in the range of 1.0 to 1.5, for example, and are greater for those who have longer fingers.

For example, when a user holds and starts operating the input device 1501, the user is prompted to select an option such as "Having long fingers" or "Having short fingers" for the left and right fingers through a GUI screen or the like, and the lengths of the fingers are determined and stored in the user information storage unit 2215 as user information indicating finger lengths.

Like the correction judgment threshold 2002 shown in FIG. 28, a correction judgment threshold 2302 is associated with an information ID 1901 and a correction distance 1705. The correction judgment threshold 2302 is used for comparison with a correction judgment distance 1706 associated with the same information ID 1901 as that of the correction judgment threshold 2302 when click position information is corrected.

The correction information determining unit 2214 changes the value of the correction determination threshold according to the length L1 of a left finger 1504L and the length L2 of a right finger 1504R of the user provided from the user information storage unit 2215. For example, when L1 is 1.0, a correction judgment threshold 2032 of (300) is used for comparison with a correction judgment distance 1706 with an information ID 1901 of "left". When L1 is 1.5, a correction judgment threshold 2302 of (450) is used for comparison with a correction judgment distance 1706 with an information ID 1901 of "left".

FIG. 32 indicates that "when a correction reference point 1701 with an information ID 1901 of "left", is at (0, 0) and the correction judgment distance 1706 is equal to or greater than a correction judgment threshold 2302 of (300×L1), a position at a correction distance 1705 of (20) from a click position 1702 in the left correction direction 1703L is set as a corrected click position". FIG. 32 also indicates that "when a correction reference point 1701 with an information ID 1901 of "right", is at (960, 0) and the correction judgment distance 1706 is equal to or greater than a correction judgment threshold 2302 of (300×L2), a position at a correction distance 1705 of (20) from a click position 1702 in the right correction direction 1703R is set as a corrected click position".

While one correction judgment threshold 2302 and one correction distance 1705 associated with the correction judgment threshold 2302 are used in the example shown in FIG. 32, a plurality of correction judgment thresholds 2302 and a plurality of correction distances 1705 may be used. Furthermore, while one piece of correction information 2301 is stored for each way of holding in the example shown, the correction information storage unit 1813 can store a plurality of pieces of correction information for each way of holding the input device 1501.

In this way, the click position control apparatus according to the variation of the third embodiment is capable of making more accurate correction adjusted to the user, because correction information is changed according to characteristics of the user.

Fourth Embodiment

A click position control apparatus according to a fourth embodiment is characterized in that the apparatus includes a grip information generating unit generating grip information indicating how a user is holding an input device, a correction information storage unit storing a plurality of pieces of correction information, a selecting unit selecting one of the plurality of pieces of correction information on the basis of the grip information, and a storage unit storing a plurality of pieces of touch position information, and refers to the touch position information stored in the storage unit to correct click position information.

In the fourth embodiment of the present invention, an example is given in which when correction is made based on the distance between a point (reference position) that serves as a benchmark on an input device and a click position (coordinates) indicating a user input on a clickable touch sensor, correction information is changed on the basis of grip information about how the input device is being held, click position information is corrected based on a record of touch position information indicating positions at which a user has touched a touch sensor up to the time of the correction, that is, a trajectory of touch positions. It should be noted that a trajectory of a cursor displayed on a display screen is used as a trajectory of touch positions in the fourth embodiment.

A cross section of an input device in the fourth embodiment of the present invention is similar to that in the first embodiment and therefore a cross-sectional view of the input device will be omitted.

FIG. 33 is a schematic diagram illustrating an example of an input device 1501 and an example of a display apparatus 2401 in the fourth embodiment of the present invention. In FIG. 33, the same components as those in FIG. 22 are given the same reference numerals and description of those components will be omitted.

Like the display apparatus 1601 in the third embodiment, the display apparatus 2401 obtains position information indicating a point on a left clickable touch sensor 1505L touched by a left finger 1504L and position information indicating a point on a right clickable touch sensor 1505R touched by a right finger 1504R on the basis of a signal indicating a position provided from the input device 1501 and displays the position information as a left cursor 1603L and a right cursor 1603R on a display screen 202. Also like the display apparatus 1601 in the third embodiment, the display apparatus 2401 detects a click on the left clickable touch sensor 1505L or the right clickable touch sensor 1505R by a user and performs processing such as processing for determining an object 204. The relationship between a coordinate system of the display screen 202 of the display apparatus 2401 and a coordinate system of each of the clickable touch sensors of the input device 1501 is the same as that in the third embodiment and therefore description of the relationship will be omitted.

The display apparatus 2401 also includes a storage unit that stores a history of movements of the left cursor 1603L displayed on the display screen 202 (a left cursor trajectory 2405L) as series of left cursor positions information and a history of movements of the right cursor 1603R (a right cursor trajectory 2405R) as series of right cursor positions information. In the fourth embodiment, click position information is corrected by selecting one cursor position from series of cursor positions information indicating a trajectory of each corresponding cursor. An example of the series of cursor positions information will be described later in detail with reference to FIG. 34.

The input device 1501 can be held and operated in a vertical orientation as well as a horizontal orientation, operation in a vertical orientation is the same as in the third embodiment and therefore description of such operation is omitted.

FIG. 34 shows exemplary values of series of cursor positions information 2501 representing trajectories of the cursors (the left cursor 1603L and the right cursor 1603R) displayed on the display screen 202 of the display apparatus 2401 in the fourth embodiment of the present invention. In FIG. 34, the same elements as those in FIG. 26 are given the same reference numerals and description of those elements will be omitted.

The series of cursor positions information 2501 indicates an information ID 1901 indicating which of the left cursor 1603L and the right cursor 1603R an associated time 2502 and a cursor position 2503 are related to, a time 2502 at which the cursor position 2503 is inputted, and the cursor position 2503 corresponding to the time 2502. It should be noted that cursor positions 2503 associated with an information ID 1901 indicating "left" that are arranged in chronological order using associated times 2502 represent a left cursor trajectory 2405L. Similarly, cursor positions 2503 associated with an information ID 1901 indicating "right" that are arranged in chronological order using associated times 2502 represent a right cursor trajectory 2405R.

The example in FIG. 34 indicates that "when the left cursor 1603L was displayed on the display screen 202 at positions (150, 90), (180, 90), (195, 95), (160, 85), and (100, 90) at times 30 ms, 60 ms, 90 ms, 120 ms, and 150 ms, respectively, and the right cursor 1603R was displayed on the display screen 202 at positions (520, 235), (580, 260), (640, 260) (640, 300), and (660, 300) at times 30 ms, 60 ms, 90 ms, 120 ms, and 150 ms, respectively.

Figure 35:
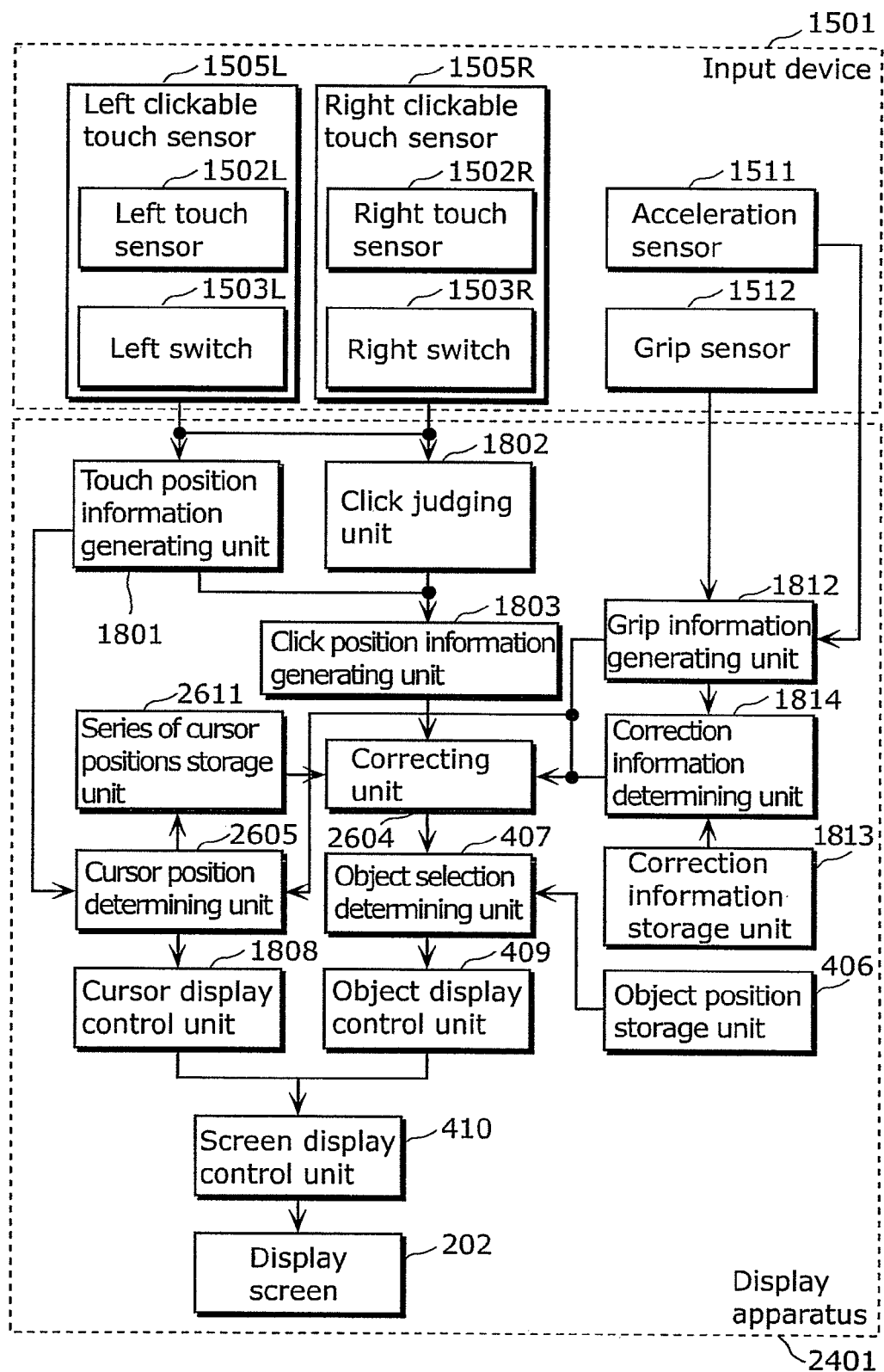
FIG. 35 is a block diagram illustrating an exemplary internal configuration of an input device and an exemplary internal configuration of a display apparatus, which is an example of the click position control apparatus, in the fourth embodiment of the present invention.

FIG. 35 is a block diagram illustrating exemplary internal configurations of the input device 1501 and an exemplary internal configuration of the display apparatus 2401, which is an example of the click position control apparatus, in the fourth embodiment of the present invention. In FIG. 35, the same components as those in FIGS. 25 and 33 are given the same reference numerals and description of those components will be omitted.

The display apparatus 2401 differ from the display apparatus 1601 according to the third embodiment in FIG. 25 in that the display apparatus 2401 includes a correcting unit 2604 and a cursor position determining unit 2605 in place of the correcting unit 1804 and the cursor position determining unit 1805 and includes a series of cursor positions storage unit 2611 in addition.

Like the correcting unit 1804 according to the third embodiment, the correcting unit 2604 uses correction information determined by a correction information determining unit 1814 to correct click position information provided from a click position information generating unit 1803. Specifically, the correcting unit 2604 corrects click position information according to the distance between a click position indicated in click position information provided from the click position information generating unit 1803 and a correction reference point indicated in correction information having the same information ID that is contained in the click position information (correction judgment distance).

More specifically, the correcting unit 2604 selects one cursor position from series of cursor positions information 2501 provided from a series of cursor positions storage unit 2611 and replaces cursor position information indicating the selected point cursor position information with the click position information, thereby correcting the click position information. That is, the correcting unit 2604 provides one piece of cursor position information in the selected series of cursor positions information 2501 to an object selection determining unit 407 as click position information. Specific exemplary values of the click position information, the correction reference point, and the correction judgment distance are illustrated in FIG. 26.

Like the cursor position determining unit 1805 according to the third embodiment, the cursor position determining unit 2605 determines cursor position information for the left cursor 1603L and cursor position information for right cursor 1603R to be displayed on the display screen 202 on the basis of grip information provided from a grip information generating unit 1812 and touch position information provided from a touch position information generating unit 1801. The cursor position determining unit 2605 then provides the determined cursor position information to the series of cursor positions storage unit 2611 as well as to a cursor display control unit 1808.

The series of cursor positions storage unit 2611, which is an example of the storage unit according to the present invention, stores cursor position information generated on the basis of touch position information. Specifically, the series of cursor positions storage unit 2611 associates cursor positions 2503 indicated in cursor position information provided from the cursor position determining unit 2605 with times 2502 corresponding to the cursor positions 2503 and stores the cursor positions 2503 and the times 2502 as series of cursor positions information 2501. The series of cursor positions storage unit 2611 provides all of the stored series of cursor positions information 2501 to the correcting unit 2604.

Figures 36, 37, 38:
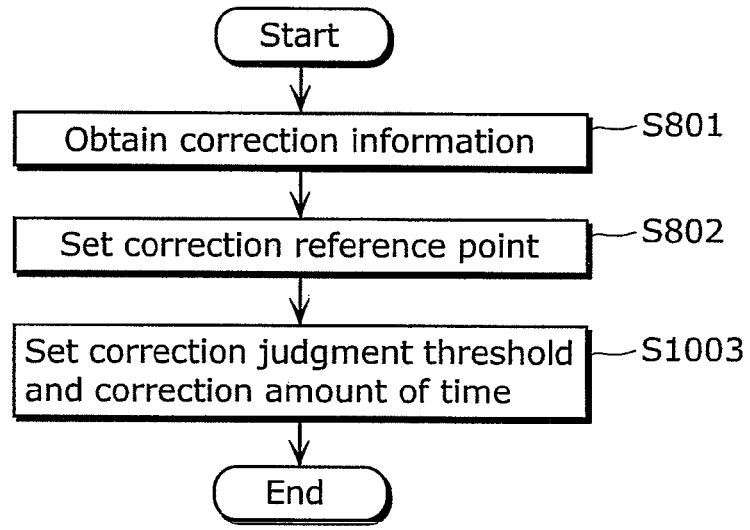
FIG. 36 is a flowchart illustrating an example of operation for presetting parameters such as a correction reference point and a correction amount of time on the basis of correction information in the fourth embodiment of the present invention.
FIG. 37 shows exemplary values of correction information in the fourth embodiment of the present invention.
FIG. 38 shows exemplary values of correction information in the fourth embodiment of the present invention.

FIG. 36 is a flowchart illustrating an example of operation for presetting parameters such as a correction reference point 1701 and a correction amount of time on the basis of correction information in the fourth embodiment of the present invention. The presetting takes place when grip information on the input device 1501 has changed. In FIG. 36, the same operations as those in FIG. 27 are given the same reference numerals and description of those operations will be omitted.

The operations of obtaining correction information and setting a correction reference point performed by the correcting unit 2604 are the same as those operations performed by the correcting unit 1804 according to the third embodiment illustrated in FIG. 27.

The correcting unit 2604 sets a correction judgment threshold for determining whether or not to correct a click position and a correction amount of time corresponding to the correction judgment threshold from the correction information obtained from the correction information determining unit 1814 (step S1003).

FIGS. 37 and 38 show specific exemplary values of coordinates of the correction reference point 1701, the correction judgment threshold, and the correction amount of time set by the correcting unit 1604.

FIG. 37 shows exemplary values of correction information 2701 in the fourth embodiment of the present invention.

The correction information 2701 includes an information ID 1901, a correction reference point 1701, a correction judgment threshold 2002, and correction amount of time 2702. The exemplary values shown in FIG. 37 indicate a case where the input device 1501 is held and operated in a horizontal orientation as illustrated in FIG. 33. In FIG. 37, the same elements as those in FIG. 28 are given the same reference numerals and description of those elements will be omitted.

The correction amount of time 2702 is associated with an information ID 1901 and a correction judgment threshold 2002. The correction amount of time 2702 is a value used for correcting click position information after determination is made using the correction judgment threshold 2002. Specifically, the correcting unit 2604 corrects click position information so that a corrected position is a cursor position indicated in cursor position information indicating a time which precedes the time indicated in the click position information by the correction amount of time 2702.

FIG. 37 indicates that "when a left correction reference point 1701L associated with an information ID 1901 indicating "left" is at (0, 0) and a left correction judgment distance 1706L is equal to or greater than a correction judgment threshold 2002 of (300), a correction amount of time 2702 of (30 ms) is used to make correction". Specifically, FIG. 37 indicates that "when a left correction reference point 1701L associated with an information ID 1901 indicating "left" is at (0, 0) and a left correction judgment distance 1706L is equal to or greater than a correction judgment threshold 2002 of (300), a position on the left touch sensor 1502L touched by the user at a time preceding a time indicated in click position information by a correction amount of time 2702 of (30 ms) is set as a corrected click position".

FIG. 37 also indicates that "when a right correction reference point 1701R associated with an information ID 1901 indicating "right" is at (960, 0) and a right correction judgment distance 1706R is equal to or greater than a correction judgment threshold 2002 of (300), a correction amount of time 2702 of (30 ms) is used to make correction". Specifically, FIG. 37 also indicates that "when a right correction reference point 1701R associated with an information ID 1901 indicating "right" is at (960, 0) and a right correction judgment distance 1706R is equal to or greater than a correction judgment threshold 2002 of (300), a position on the right touch sensor 1502R touched by the user at a time preceding a time indicated in click position information by a correction amount of time 2702 of (30 ms) is set as a corrected click position".

FIG. 38 shows exemplary values of correction information 2801 in the fourth embodiment of the present invention. The exemplary values shown in FIG. 38 indicate a case where the input device 1501 is held and operated in a vertical orientation as illustrated in FIG. 23. In FIG. 38, the same elements as those in FIGS. 26 and 27 are given the same reference numerals and description of those elements will be omitted.

FIG. 38 indicates that "when a right correction reference point 1701R associated with an information ID 1901 indicating "right" is (0, 0) and a right correction judgment distance 1706R is equal to or greater than a correction judgment threshold 2002 of (300), a correction amount of time 2702 of (30 ms) is used to make correction". Specifically, FIG. 38 indicates that "when a right correction reference point 1701R associated with an information ID 1901 indicating "right" is at (0, 0) and a right correction judgment distance 1706R is equal to or greater than a correction judgment threshold 2002 of (300), a position on the right touch sensor 1502R touched by the user at a time a correction amount of time 2702 of (30 ms) before is set as a corrected click position".

It should be noted that while one correction judgment threshold 2002 and one correction amount of time 2702 associated with the correction judgment threshold 2002 are used in the examples shown in FIGS. 37 and 38, a plurality of correction judgment thresholds 2002 and a plurality of correction amount of times 2702 may be used. Furthermore, while one piece of correction information 2701 and 2801 is stored for each way of holding in the example shown, the correction information storage unit 1813 can store a plurality of pieces of correction information for each way of holding the input device 1501.

Figures 39, 40, 41:
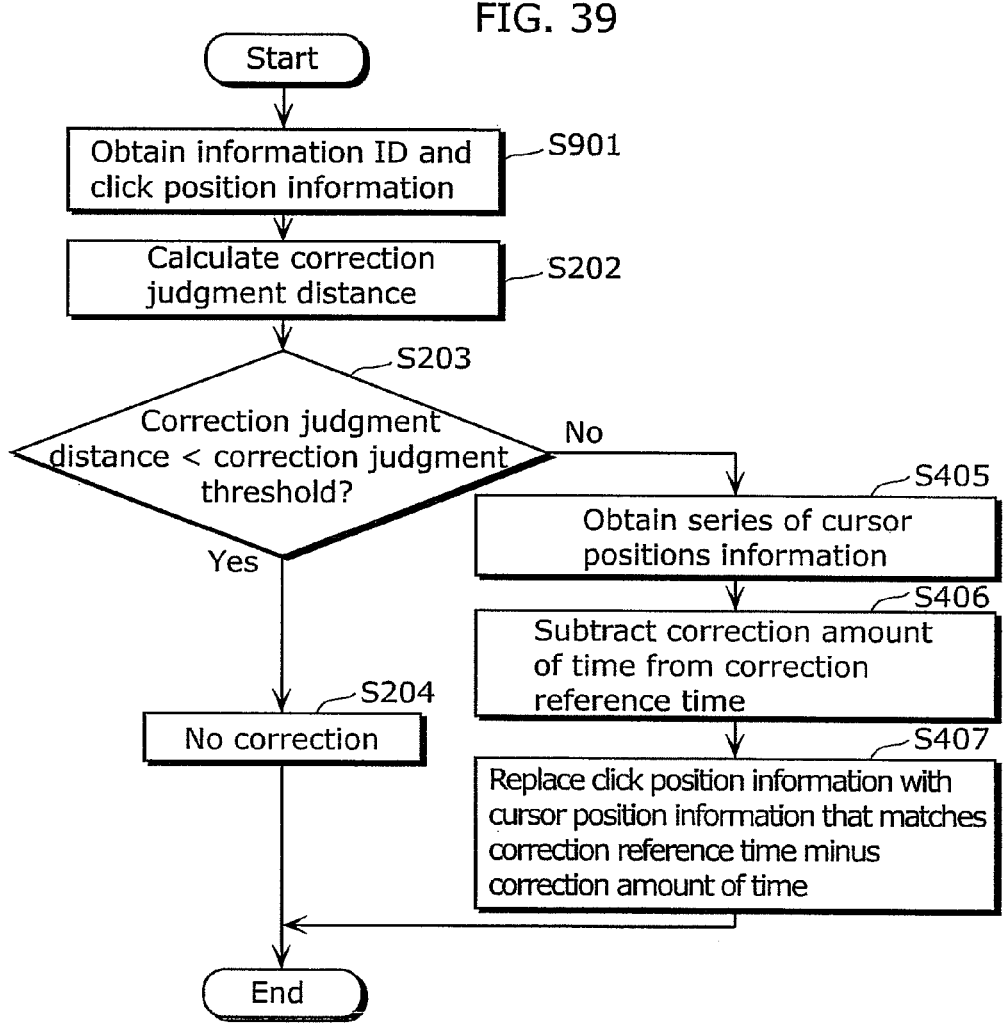
FIG. 39 is a flowchart illustrating an example of a method for correcting click position information performed by a correcting unit in the fourth embodiment of the present invention.
FIG. 40 shows exemplary values of correction information in a first variation of the fourth embodiment of the present invention.
FIG. 41 shows exemplary values of correction information in the first variation of the fourth embodiment of the present invention.

FIG. 39 is a flowchart illustrating an example of a method for correcting click position information performed by the correcting unit 2604 in the fourth embodiment of the present invention. In FIG. 39, the same operations as those in FIGS. 30 and 14 are given the same reference numerals and description of those operations will be omitted.

As illustrated in FIG. 39, the correcting unit 2604 first obtains click position information including an information ID 1901 (step S901). Specifically, like the correcting unit 1804 according to the third embodiment illustrated in FIG. 30, the correcting unit 2604 is provided with click position information including an information ID 1901 from the click position information generating unit 1803 when a user clicks the left clickable touch sensor 1505L or the right clickable touch sensor 1505R.

The rest of the process is the same as the process performed by the correcting unit 804 of the second embodiment illustrated in FIG. 14. However, the correcting unit 2604 according to the fourth embodiment uses information associated with the same information ID 1901 as the information ID 1901 provided to the correcting unit 2604 to perform the rest of the process (step S202 to step S407).

The process illustrated in FIG. 39 will be described using specific exemplary values.

A case will be described first in which an information ID 1901 indicating "left", a correction reference point 1701 of (0, 0), and click position information indicating a click position 1702 of (200, 200) as shown in the first row of FIG. 26 are provided. Here, because the information ID associated with the click position information is "left", the correcting unit 2604 uses (300) as the correction judgment threshold 2002 associated with the information ID 1901 indicating "left" and (30 ms) as the correction amount of time 2702 as illustrated in FIG. 37.

First, the correcting unit 2604 calculates a correction judgment distance 1706 (step S202). As a result, a correction judgment distance 1706 of (280) is yielded.

The correcting unit 2604 then compares the correction judgment distance 1706 (280) with the correction judgment threshold 2002 (300) (step S203). Since the correction judgment distance 1706 (280) is less than the correction judgment threshold 2002 (300) (Yes at step S203), the correcting unit 2604 does not correct the click position information (step S204). Thus, the click position information indicating the click position (200, 200) is provided to an object selection determining unit 407 without being corrected.

A case will be described next in which an information ID 1901 indicating "right", a correction reference point 1701 of (960, 0), and click position information indicating a click position 1702 (660, 300) as shown in the second row of FIG. 26 are provided. Here, because the information ID associated with the click position information is "right", the correcting unit 2604 uses (300) as the correction judgment threshold 2002 corresponding to the information ID 1901 indicating "right" and (30 ms) as the correction amount of time as illustrated in FIG. 37.

First, the correcting unit 2604 calculates a correction judgment distance 1706 (step S202). As a result, a correction judgment distance 1706 of (420) is yielded.

The correcting unit 2604 then compares the correction judgment distance (420) with the correction judgment threshold 2002 (300) (step S203). Since the correction judgment distance 1706 (420) is greater than the correction judgment threshold 2002 (300) (No at step S203), the correcting unit 2604 corrects the click position information indicating the click position (660, 300).

Specifically, the correcting unit 2604 obtains series of cursor positions information 2501 from the series of cursor positions storage unit 2611 (step S405). For example, the correcting unit 2604 obtains the series of cursor positions information 2501 shown in FIG. 34.

Here, the correction reference time is the time of click position information indicating a click position (300, 300). In this case, the correction reference time is (150 ms) as shown in FIG. 34.

The correcting unit 2604 then subtracts the correction amount of time 2702 (30 ms) from the correction reference time (150 ms) to obtain a past time (step S406). Here, a past time of (120 ms) is yielded.

The correcting unit 2604 then corrects the click position information so that a corrected click position is a cursor position 2503 (600, 260) corresponding to the time 2502 identical to the past time (120 ms).

The process illustrated in FIG. 39 performed when the user has switched to holding the input device 1501 only with the right hand in a vertical orientation as illustrated in FIG. 23 will also be described using specific exemplary values.

For example, a case will be described in which an information ID 1901 indicating "right", a correction reference point 1701 of (960, 0), and click position information indicating a click position 1702 (860, 100) as shown in the third row of FIG. 26 are provided. It should be noted that the fact that the user is holding the input device 1501 in a vertical orientation can be determined from grip information provided from the grip information generating unit 1812. Accordingly, the correcting unit 2604 makes settings such as a correction reference point 1701 on the basis of the correction information 2801 shown in FIG. 38. Here, the correcting unit 2604 uses (400) as the correction judgment threshold 2002 associated with an information ID 1901 indicating "right" and (30 ms) as the correction amount of time 2702.

First, the correcting unit 2604 calculates a correction judgment distance 1706 (step S202). As a result, a correction judgment distance 1706 of (100) is yielded.

The correcting unit 2604 then compares the correction judgment distance 1706 (100) with the correction judgment threshold 2002 (400) (step S203). Since the correction judgment distance 1706 (100) is less than the correction judgment threshold 2002 (400) (Yes at step S203), correcting unit 2604 does not correct the click position information (step S204). Accordingly, the click position information indicating the click position (860, 100) is provided to an object selection determining unit 407 without being corrected.

In this way, as in the third embodiment, the click position control apparatus according to the fourth embodiment determines how a user is holding the input device 1501 and changes correction information on the basis of the result of the determination to correct a click position. As in the second embodiment, series of cursor positions information stored in the series of cursor positions storage unit 2611 is referred to and the click position information is corrected so that a corrected click position is a position indicated in cursor position information indicating a time which precedes a time indicated in the click position information by a predetermined correction amount of time.

Thus, a click position can be corrected simply by storing a plurality of pieces of correction information for each way of holding the input device 1501 and for each clickable touch sensor. Furthermore, a click position can be corrected to a more accurate click position by making correction based on a trajectory of a cursor, that is, a trajectory of movements of a finger. Accordingly, operation errors due to a deflection of click by a user can be prevented without needing a history of user operations even when the user is changed or a new user uses the input device.

(First Variation of the Fourth Embodiment)

While a method performed by the correcting unit 2604 for correcting click position using a correction amount of time 2702 has been described with respect to FIGS. 37 to 39, a correction distance may be used in a first variation of the fourth embodiment instead of the correction amount of time 2702. A method for correcting click position information using a correction distance will be described below with reference to FIGS. 40, 41, and 42.

FIG. 40 shows exemplary values of correction information 2901 in the first variation of the forth embodiment of the present invention.

The correction information 2901 includes an information ID 1901, a correction reference point 1701, a correction judgment threshold 2002, and a correction distance 2902. The exemplary values shown in FIG. 40 indicate a case where an input device 1501 is held and operated in a horizontal orientation as illustrated in FIG. 33. In FIG. 40, the same elements as those in FIG. 28 are given the same reference numerals and description of those elements will be omitted.

FIG. 40 indicates that when a left correction reference point 1701L associated with an information ID 1901 indicating "left" is at (0, 0) and a left correction judgment distance 1706L is equal to or greater than a correction judgment threshold 2002 of (300), a left click position 1702L is corrected to a position closest to a position at a correction distance 2902 of (15) from the left click position 1702L". FIG. 40 also indicates that "when a right correction reference point 1701R associated with an information ID 1901 indicating "right" is at (960, 0) and a right correction judgment distance 1706R is equal to or greater than a correction judgment threshold 2002 of (300), a right click position 1702R is corrected to a position closet to a position at a correction distance 2902 of (25) from the right click position 1702R".

FIG. 41 shows exemplary values of correction information 3001 in the first variation of the fourth embodiment of the present invention. The example in FIG. 41 shows a case where an input device 1501 is held and operated in a vertical orientation as illustrated in FIG. 23. In FIG. 41, the same elements as those in FIGS. 28 and 40 are given the same reference numerals and description of those elements will be omitted.

FIG. 41 indicates that "when a right correction reference point 1701R associated with an information ID 1901 indicating "right" is at (960, 0) and a right correction judgment distance 1706R is equal to or greater than a correction judgment threshold 2002 of (300), a right click position 1702R is corrected to a position closest to a position at a correction distance 2902 of (15) from the right click position 1702R.

It should be noted that while one correction judgment threshold 2002 and one correction distance 2903 associated with the correction judgment threshold 2002 are used in the examples shown in FIGS. 40 and 41, a plurality of correction judgment thresholds 2002 and a plurality of correction distances 2902 may be used. Furthermore, while one piece of correction information 2901 and 3001 is stored for each way of holding in the examples shown, the correction information storage unit 1813 can store a plurality of pieces of correction information for each way of holding the input device 1501.

Figure 42:
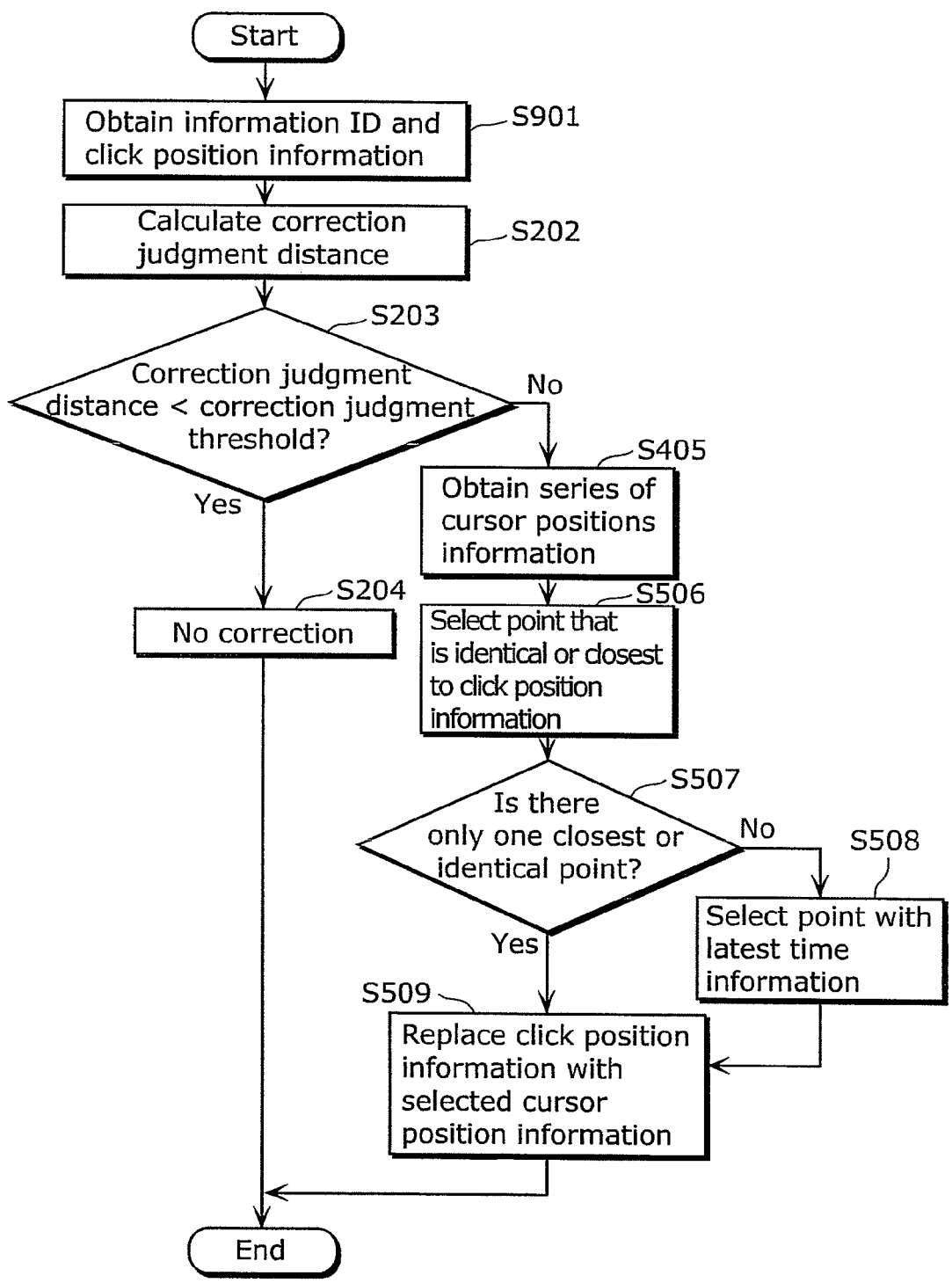
FIG. 42 is a flowchart illustrating an example of a method for correcting click position information performed by a correcting unit in the first variation of the fourth embodiment of the present invention.

FIG. 42 is a flowchart illustrating an example of a method for correcting click position information performed by the correcting unit 2604 in the first variation of the fourth embodiment of the present invention. In FIG. 42, the same elements as those in FIGS. 39 and 16 are given the same reference numerals and description of which will be omitted.

As illustrated in FIG. 42, first the correcting unit 2604 obtains click position information including an information ID 1901 (step S901). Specifically, like the correcting unit 1804 according to the third embodiment illustrated in FIG. 30, the correcting unit 2604 is provided with click position information including an information ID 1901 from the click position information generating unit 1803 when a user clicks a left clickable touch sensor 1505L or a right clickable touch sensor 1505R.

The rest of the process is the same as the process performed by the correcting unit 804 according to the first variation of the second embodiment illustrated in FIG. 16. However, here the correcting unit 2604 according to the first variation of the fourth embodiment uses information associated with the same information ID 1901 as the information ID 1901 provided to the correcting unit 2604 to perform the rest of the process (step S202 to step S509).

The process illustrated in FIG. 42 will be described using specific exemplary values. It should be noted that when the click position information shown in the first row of FIG. 26 is inputted and when the click position information shown in the third row of FIG. 26 is inputted, correction is not made (step S204) as described with reference to FIG. 39 and therefore description of those cases will be omitted.

A case will be described in which an information ID 1901 of "right", a correction reference point 1701 of (960, 0), and click position information indicating a click position 1702 of (660, 300) is provided as shown in the second row of FIG. 26. Since the information ID associated with the click position information here is "right", the correcting unit 2604 uses a correction judgment threshold 2002 of (300) and a correction distance 2902 of (25) that are associated with the information ID 1901 indicating "right" as shown in FIG. 40.

Since the correction judgment distance 1706 (420) is greater than the correction judgment threshold 2002 (300) (No at step S203), the correcting unit 2604 obtains series of cursor positions information 2502 (step S405). Specifically, the correcting unit 2604 obtains cursor position information indicating cursor positions (660, 300), (640, 300), (640, 260), (580, 260), and (520, 235) associated with the information ID 1901 indicating "right" from among series of cursor positions information 2501.

The correcting unit 2604 then calculates the distance from the click position 1702 (660, 300) to every cursor positions 2503 (640, 300), (640, 260), (580, 260), and (520, 235) indicated in all pieces of cursor position information included in the obtained series of cursor positions information 2501, excluding a cursor position identical to the click position 1702 (660, 300). The calculated distances are 20, 44, 89, and 154 (all digits to the right of the decimal point are discarded), respectively, and the cursor position 2503 closest to the correction distance 2902 (25) is (640, 300) (step S506).

The correcting unit 2604 then determines whether or not there is more than one piece of cursor position information with calculated distance information identical or closest to the correction distance 2902. Here, there is not more than one piece of such cursor position information (Yes at step S507), the correcting unit 2604 determines the cursor position information indicating the cursor position 2503 (640, 300) as corrected click position information.

(Second Variation of Fourth Embodiment)

As a second variation of the fourth embodiment, a correction method will be described with reference to FIG. 43 in which distances between cursor positions along a trajectory of a cursor are calculated and click position information is replaced with cursor position information with a sum of the calculated distances between cursor positions that is identical or closest to a correction distance, thereby making correction.

Figure 43:
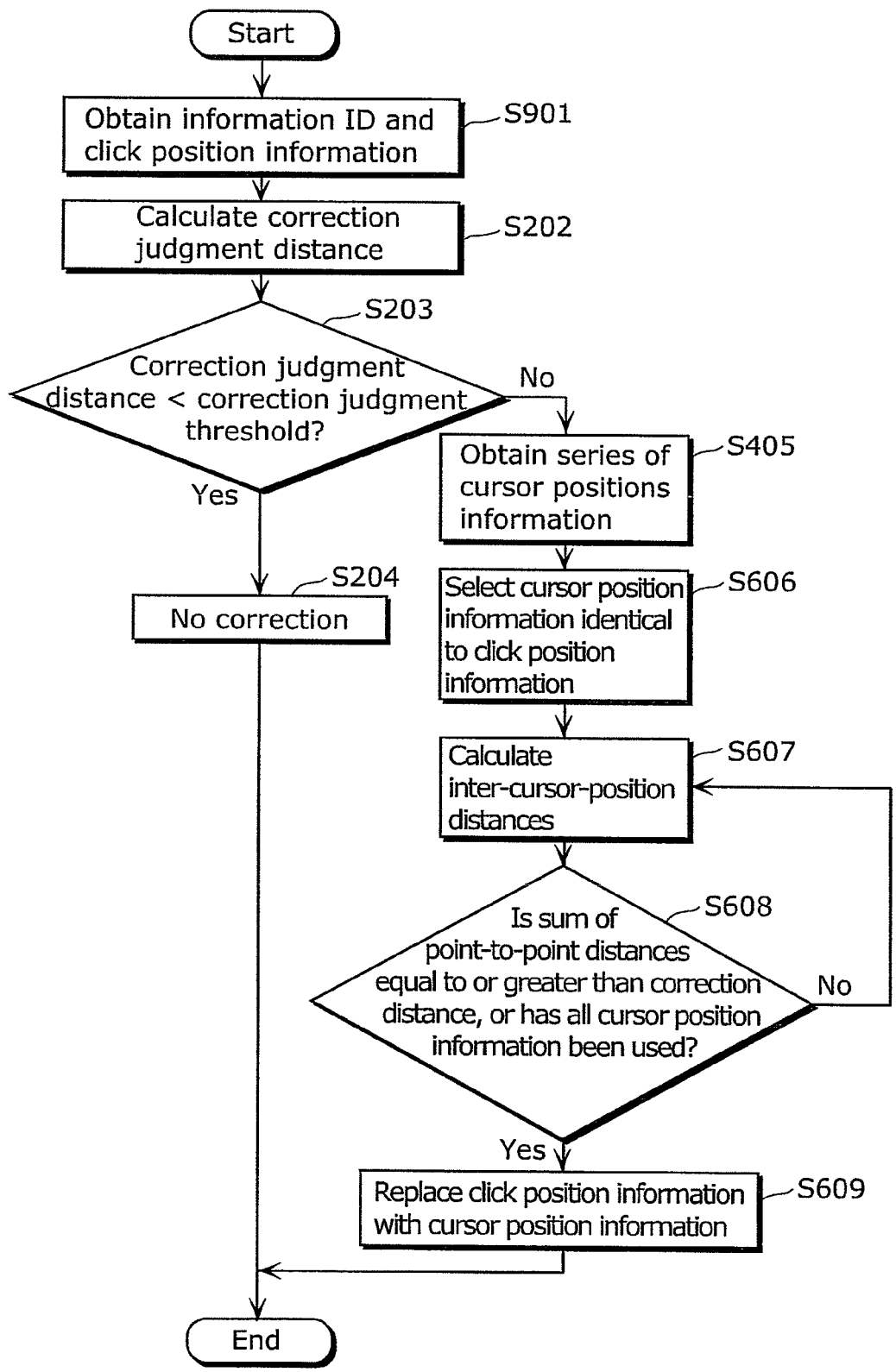
FIG. 43 is a flowchart illustrating an example of a method for correcting click position information performed by a correcting unit in a second variation of the fourth embodiment of the present invention.

FIG. 43 is a flowchart illustrating an example of method for correcting click position information performed by a correcting unit 2604 in the second variation of the fourth embodiment of the present invention. In FIG. 43, the same operations as those in FIGS. 39 and 17 are given the same reference numerals and description of those operations will be omitted.

As illustrated in FIG. 43, first the correcting unit 2604 obtains click position information including an information ID 1901 (step S901). Specifically, like the correcting unit 1804 according to the third embodiment illustrated in FIG. 30, the correcting unit 2604 is provided with click position information including an information ID 1901 from a click position information generating unit 1803 when a user clicks a left clickable touch sensor 1505L or a right clickable touch sensor 1505R.

The rest of the process is the same as the process performed by the correcting unit 804 according to the second variation of the second embodiment illustrated in FIG. 17. However, here, the correcting unit 2604 according to the second variation of the fourth embodiment uses information associated with the same information ID 1901 as the provided information ID 1901 to perform the rest of the process (step S202 to step S609).

The process illustrated in FIG. 43 will be described using specific exemplary values. It should be noted that when the click position information shown in the first row of FIG. 26 is inputted and when the click position information shown in the third row of FIG. 26 is inputted, correction is not made as also described with respect to FIG. 39 (step S204) and therefore description of those cases will be omitted.

A case will be described in which an information ID 1901 of "right", a correction reference point 1701 of (960, 0), and click position information indicating a click position 1702 of (660, 300) is provided as shown in the second row of FIG. 26. Since the information ID associated with the click position information here is "right", the correcting unit 2604 uses a correction judgment threshold 2002 of (300) and a correction distance 2902 of (25) that are associated with the information ID 1901 indicating "right" as shown in FIG. 40. Note that the process is the same as the process in FIG. 42 until the correcting unit 2604 obtains series of cursor positions information and therefore description of the process up to that point will be omitted.

The correcting unit 2604 refers to the series of cursor positions information 2501 to determine correction reference position information (step S606). In this case, since the click position information indicates a click position 1702 of (660, 300), it is determined that the correction reference position is (660, 300).

The correcting unit 2604 then calculates the distance between the correction reference position (660, 300) and a cursor position (640, 300) immediately preceding the correction reference position to yield an inter-cursor-position distance of (20) (step S607). The correcting unit 2604 then compares the inter-cursor-position distance (20) with the correction distance 2902 (25) (step S608). Here, since the inter-cursor-position distance (20) is smaller (No at step S608), the correcting unit 2604 calculates the distance between the cursor position (640, 300) immediately preceding the correction reference position information and a cursor position (640, 260) immediately preceding that cursor position (640, 300) to yield an inter-cursor-position distance of (40) (step S607).

The inter-cursor-position distance (40) is added to the previously calculated inter-cursor-position distance (20) to yield a sum of the inter-cursor-position distances of (60). The correcting unit 2604 then compares the sum (60) of the inter-cursor-position distances with the correction distance 2902 (25) (step S608).

Here, since the sum of the inter-cursor-position distances is greater (Yes at step S608), the correcting unit 2604 sets the cursor position (640, 260) that is associated with an earliest time among the cursor position information (660, 300), (640, 300), and (640, 260) used in the calculation of the inter-cursor-position distances as a corrected click position.

In this way, the correcting unit 2604 may correct click position information so that a corrected position is a cursor position closest to a position at a correction distance 2902 from the click position indicated in the click position information. Furthermore, here the correcting unit 2604 may correct click position information so that a corrected position is a cursor position closest to a position at the correction distance 2902 from the click position along a trajectory of the cursor.

(Third Variation of Fourth Embodiment)

Figure 44:
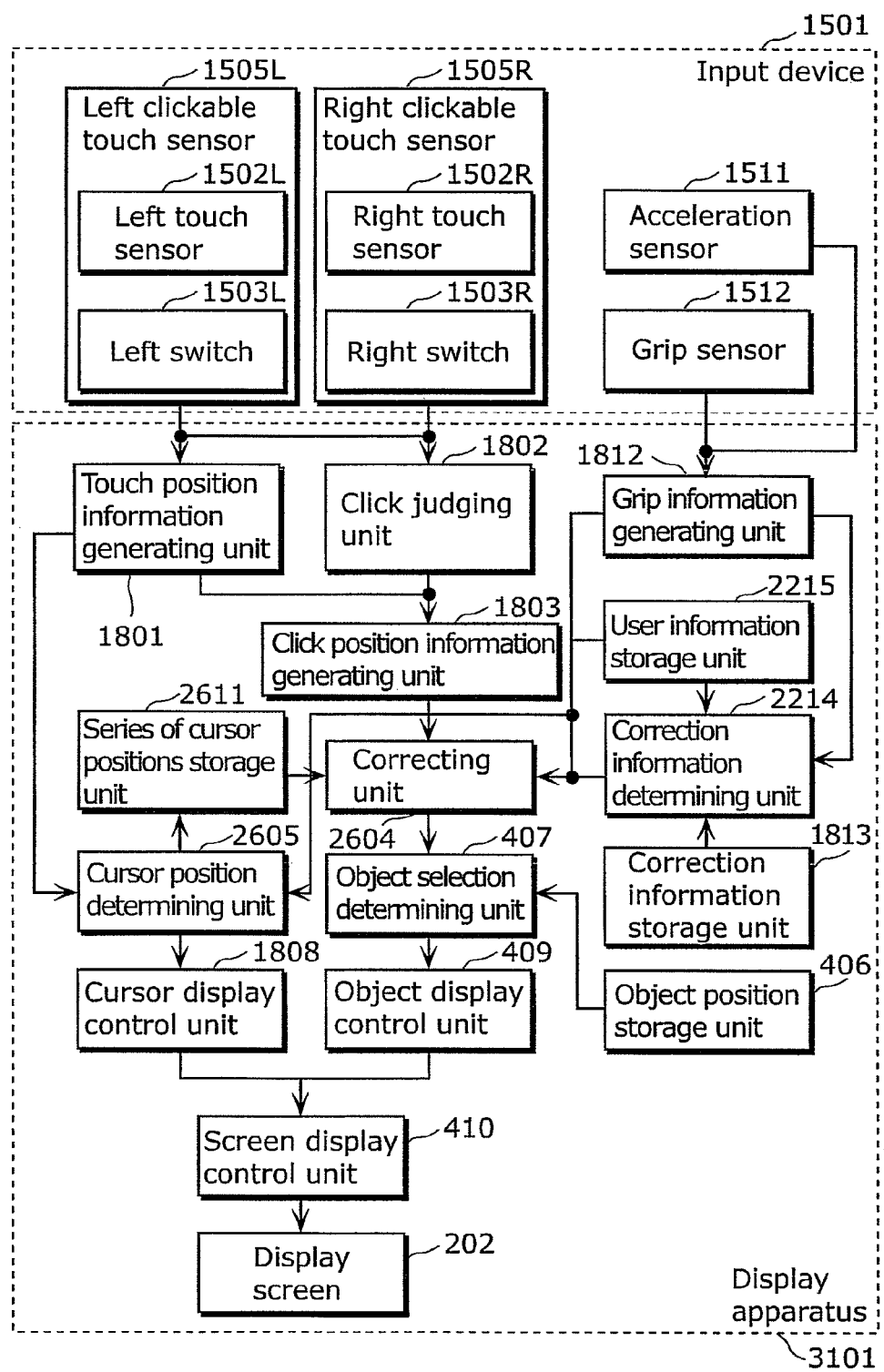
FIG. 44 is a block diagram illustrating an exemplary internal configuration of an input device and an exemplary internal configuration of a display apparatus, which is an example of the click position control apparatus, in a third variation of the fourth embodiment of the present invention.

In a third variation of the fourth embodiment, correction information may be changed on the basis of user information registered previously. FIG. 44 shows a block diagram illustrating an implementation in which correction information is changed on the basis of previously registered user information.

FIG. 44 is a block diagram illustrating an exemplary internal configuration of an input device 1501 and an exemplary internal configuration of a display apparatus 3101, which is an example of the click position control apparatus, in the third variation of the fourth embodiment of the present invention. In FIG. 44, the same components as those in FIGS. 31 and 35 are given the same reference numerals and description of those components will be omitted.

The display apparatus 3101 differs from the display apparatus 2401 illustrated in FIG. 35 in that the display apparatus 2401 includes a correction information determining unit 2214 in place of the correction information determining unit 1814 and includes a user information storage unit 2215 in addition.

The user information storage unit 2215 and the correction information determining unit 2214 are the same as the user information storage unit 2215 and the correction information determining unit 2214 according to the variation of the third embodiment illustrated in FIG. 31. Detailed operations of these units are the same as the operations described with reference to FIG. 32 and therefore description of the operations will be omitted.

Thus, the click position control apparatus according to the fourth embodiment is capable of making more accurate correction adjusted to the user, because correction information is changed according to characteristics of the user.

(Fourth Variation of Fourth Embodiment)

An input device according to a fourth variation of the fourth embodiment may include a pressure sensor in place of a switch. A method for correcting click position information using an input device 3201 including a left pressure sensor 3203L and a right pressure sensor 3203R in place of the left switch 1503L and the right switch 1503R illustrated in FIG. 35 will be described below with reference to FIGS. 45 to 48.

Figure 45:
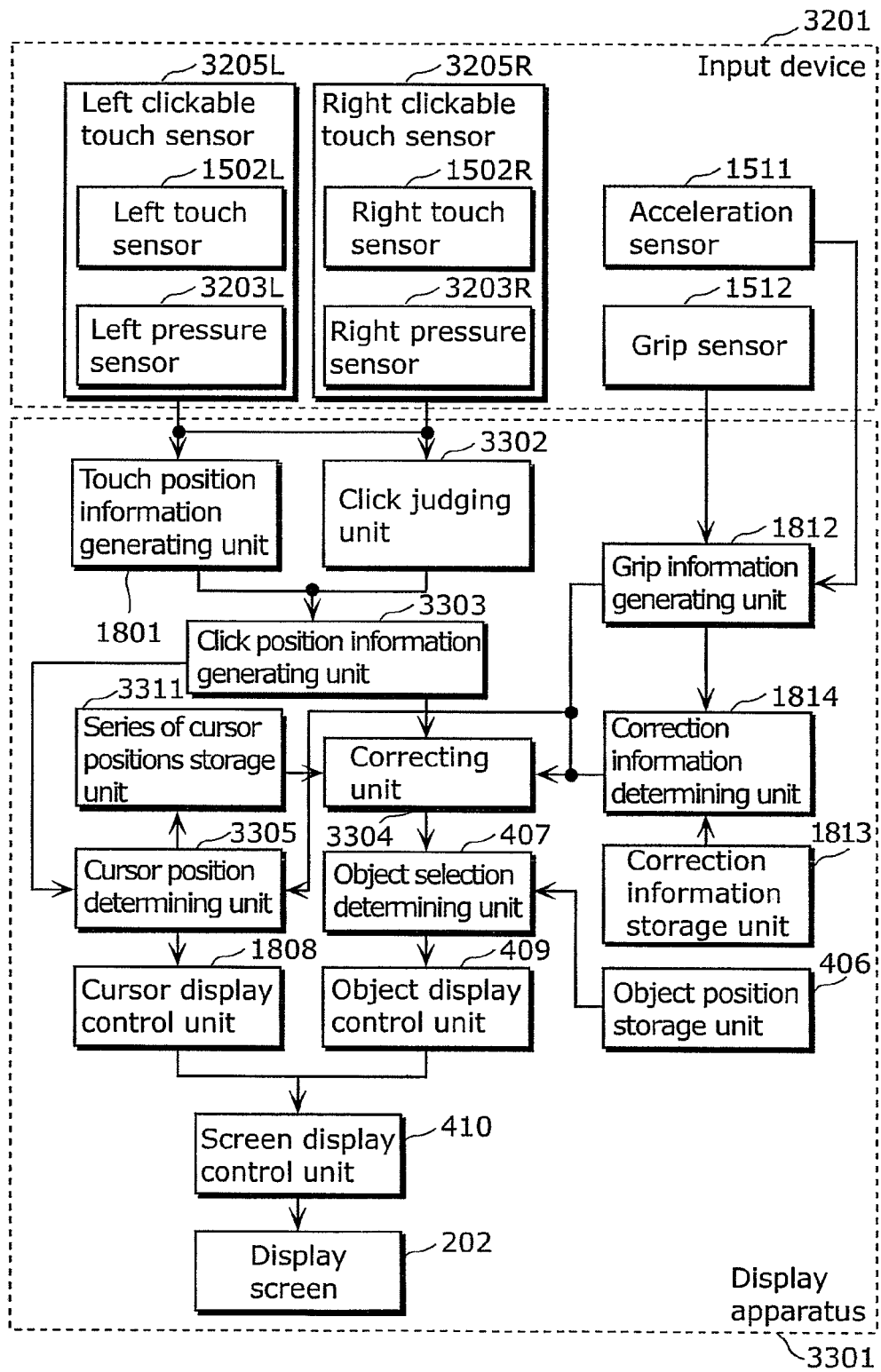
FIG. 45 is a block diagram illustrating an exemplary internal configuration of an input device and an exemplary internal configuration of a display apparatus, which is an example of the click position control apparatus, in a fourth variation of the fourth embodiment of the present invention.

FIG. 45 is a block diagram illustrating an exemplary internal configuration of an input device 3201 and an exemplary internal configuration of a display apparatus 3301, which is an example of the click position control apparatus, in the fourth variation of the fourth embodiment. In FIG. 45, the same components as those in FIGS. 33 and 35 are given the same reference numerals and description of those components will be omitted.

The input device 3201 includes a left clickable touch sensor 3205L including a left touch sensor 1502L and a left pressure sensor 3203L, a right clickable touch sensor 3205R including a right touch sensor 1502R and a right pressure sensor 3203R, an acceleration sensor 1511, and a grip sensor 1512.

The left pressure sensor 3203L, which is an example of a click judging unit according to the present invention, is disposed under the left touch sensor 1502L, is integral with the left touch sensor 1502L, and detects the intensity of a click on the left touch sensor 1502L by a user. The left pressure sensor 3203L provides a signal indicating the intensity of a click on the left touch sensor 1502L by the user to the display apparatus 3301.

The right pressure sensor 3203R, which is an example of the click judging unit according to the present invention, is disposed under the right touch sensor 1502R, is integral with the right touch sensor 1502R, and detects the intensity of a click on the right touch sensor 1502R by a user. The right pressure sensor 3203R provides a signal indicating the intensity of a click on the right touch sensor 1502R by the user to the display apparatus 3301.

The display apparatus 3301 differs from the display apparatus 2401 of the fourth embodiment illustrated in FIG. 35 in that the display apparatus 3301 includes a click judging unit 3302, a click position information generating unit 3303, a correcting unit 3304, a cursor position determining unit 3305, and a series of cursor positions storage unit 3311 in place of the click judging unit 1802, the click position information generating unit 1803, the correcting unit 2604, the cursor position determining unit 2605, and a series of cursor positions storage unit 2611.

The click judging unit 3302 generates intensity information indicating intensity obtained from at least one of the left pressure sensor 3203L and the right pressure sensor 3203R and, when the intensity obtained from the left pressure sensor 3203L or the right pressure sensor 3203R is equal to or greater than a predetermined reference intensity value, detects a click on the left pressure sensor 3203L or the right pressure sensor 3203R. It should be noted that "the click on the left pressure sensor 3203L or the right pressure sensor 3203R" means that the user has clicked the left touch sensor 1502L or the right touch sensor 1502R in order to select an object 204 displayed on the display screen 202, for example.

Specifically, the click judging unit 3302 receives a signal indicating the intensity of clicks on the left pressure sensor 3203L and the right pressure sensor 3203R by a user from the left pressure sensor 3203L and the right pressure sensor 3203R, respectively, and generates click intensity information indicating the received intensity. The click judging unit 3302 represents the timing at which the intensity of the click on each pressure sensor by the user has been measured as time information and provides click information indicating the click intensity information and the time information to the click position information generating unit 3303. It should be noted that when the click judging unit 3302 provides the click information, the click judging unit 3302 puts an information ID 1901 indicating "left" or "right" information in the click position information and provides the information to the click position information generating unit 3303.

The click position information generating unit 3303 compares the information ID and the time information contained in the click information provided from the click judging unit 3302 with an information ID and time information contained in touch position information provided from a touch position information generating unit 1801. That is, the click position information generating unit 3303 associates click information with touch position information that includes the same information ID and time information as the click information. The click position information generating unit 3303 then provides the click information and the touch position information associated with each other to the cursor position determining unit 2605.

The click position information generating unit 3303 further provides touch position information having a time identical to the time at which the user has clicked the left clickable touch sensor 1505L or the right clickable touch sensor 1505R with an intensity equal to or greater than a certain intensity as click position information to the correcting unit 3304. It should be noted that when the click position information generating unit 3303 provides the click position information, the click position information generating unit 3303 puts an information ID 1901 indicating "left" or "right" information in the click position information and provides the information.

The correcting unit 3304 selects one cursor position from series of cursor positions information obtained from the series of cursor positions storage unit 3311 according to the distance between a click position 1702 indicated in the click position information provided from the click position information generating unit 3303 and a correction reference point 1701. The correcting unit 3304 then provides cursor position information indicating the selected cursor position to an object selection determining unit 407 as click position information.

It should be noted that the correcting unit 3304 uses correction information provided from the correction information determining unit 1814 to correct the click position information provided from the click position information generating unit 3303. Specifically, the correcting unit 33304 uses correction information including the same information ID included in the click position information provided from the click position information generating unit 3303 to set parameters such as a correction reference point, a correction judgment threshold, and a click intensity threshold. The correcting unit 3304 then corrects the click position information according to the distance between the set correction reference point 1701 and the click position 1702. The corrected click position information is provided to the object selection determining unit 407.

Specific exemplary values of the click position information, the correction reference point, and the correction judgment distance are the same as those in the third embodiment and therefore description of those values will be omitted. An example of the series of cursor positions information provided from the series of cursor positions storage unit 3311 will be described with reference to FIG. 46.

The cursor position determining unit 3305 determines cursor position information for a left cursor 1603L and a right cursor 1603R to be displayed on a display screen 202 on the basis of grip information provided from a grip information generating unit 1812 and touch position information provided form the click position information generating unit 1803. The cursor position determining unit 3305 provides the determined cursor position information to a cursor display control unit 1808. The cursor position determining unit 3305 also provides the cursor position information, the click intensity information obtained from the click position information generating unit 1803, and the information ID 1901 to the series of cursor positions storage unit 3311.

The series of cursor positions storage unit 3311 associates the information ID 1901, the cursor position information, the time information, and the click intensity information which have been provided from the cursor position determining unit 3305 with one another and stores as series of cursor positions information. The series of cursor positions information is stored for a predetermined period of time; series of cursor positions information that has been stored for a period of time exceeding the predetermined period of time is discarded. The series of cursor positions storage unit 3311 provides all series of cursor positions information stored to the correcting unit 3304 according to an instruction from the correcting unit 3304.

FIG. 46 shows exemplary values of series of cursor positions information 3401 indicating trajectories of the left cursor 1603L and the right cursor 1603R displayed on the display screen 202 of the display apparatus 3301 in the fourth variation of the fourth embodiment of the present invention. In FIG. 46, the same elements as those in FIG. 34 are given the same reference numerals and description of those elements will be omitted.

The series of cursor positions information 3401 indicates an information ID 1901 indicating which of the left cursor 1603L and the right cursor 1603R an associated time 2502 and cursor position 2503 correspond to, the time 2502 at which the cursor position 2503 was inputted, the cursor position 2503 corresponding to the time 2502, and a click intensity 3402.

The click intensity 3402 is represented by a value ranging from 0 to 100, where 0 represents a "not pressed at all" state and 100 represents a "fully pressed" state. FIG. 46 indicates that "the left clickable touch sensor 1505L was clicked with intensities of (0), (0), (0), (0), and (0) (that is, the left clickable touch sensor 1505L was not pressed at all) at times 30 ms, 60 ms, 90 ms, 120 ms, and 150 ms, while the left cursor 1603L was at positions of (150, 90), (180, 90), (195, 95), (160, 85), and (100, 90), respectively. FIG. 46 also indicates that "the right clickable touch sensor 1505R was clicked with intensities of (20), (40), (60), (80), and (100) at times 30 ms, 60 ms, 90 ms, 120 ms, and 150 ms, respectively, while the right cursor 1603R was at positions of (520, 235), (580, 260), (640, 260), (640, 300), and (660, 300), respectively.

FIG. 47 shows exemplary values of correction information 3501 in the fourth variation of the fourth embodiment of the present invention. In FIG. 47, the same elements as those in FIGS. 26 and 28 are given the same reference numerals and description of those elements will be omitted.

The correction information 3501 indicates an information ID 1901, a correction reference point 1701, a correction judgment threshold 2002, and a click intensity threshold 3502.

The click intensity threshold 3502 is a value used for correcting click position information. A method for using the click intensity threshold 3502 will be described in detail with reference to FIG. 48.

FIG. 47 indicates that "for click position information associated with an information ID 1901 indicating "left", when a left correction reference point 1701L is at (0, 0) and a left correction judgment distance 1706L is equal to or greater than a correction judgment threshold 2002 of (300), a click intensity threshold 3502 of (60) is used to make correction". Specifically, FIG. 47 indicates that "for click position information associated with an information ID 1901 indicating "left", when a left correction reference point 1701L is at (0, 0) and a left correction judgment distance 1706L is equal to or greater than a correction judgment threshold 2002 of (300), a left click position 1702L is corrected to a cursor position associated with intensity information indicating intensity equal to or greater than a click intensity threshold 3502 of (60)".

FIG. 47 also indicates that "for click position information associated with an information ID indicating "right", when a right correction reference point 1701R is (960, 0) and a right correction judgment distance 1706R is equal to or greater than a correction judgment threshold 2002 of (300), a click intensity threshold 3502 of (60) is used to make correction". Specifically, FIG. 47 indicates that "for click position information associated with an information ID 1901 indicating "right", when a right correction reference point 1701R is at (0, 0) and a right correction judgment distance 1706R is equal to or greater than a correction judgment threshold 2002 of (300), a right click position 1702R is corrected to a cursor position associated with intensity information indicating intensity equal to or greater than a click intensity threshold 3502 of (60).

While one correction judgment threshold 2002 and one click intensity threshold 3502 associated with the correction judgment threshold 2002 are used in the example shown in FIG. 47, a plurality of correction judgment thresholds 2002 and a plurality of click intensity thresholds 3502 may be used. Furthermore, while one piece of correction information 3501 is stored for each way of holding in the example shown, the correction information storage unit 1813 can store a plurality of pieces of correction information for each way of holding the input device 3201.

Figure 48:
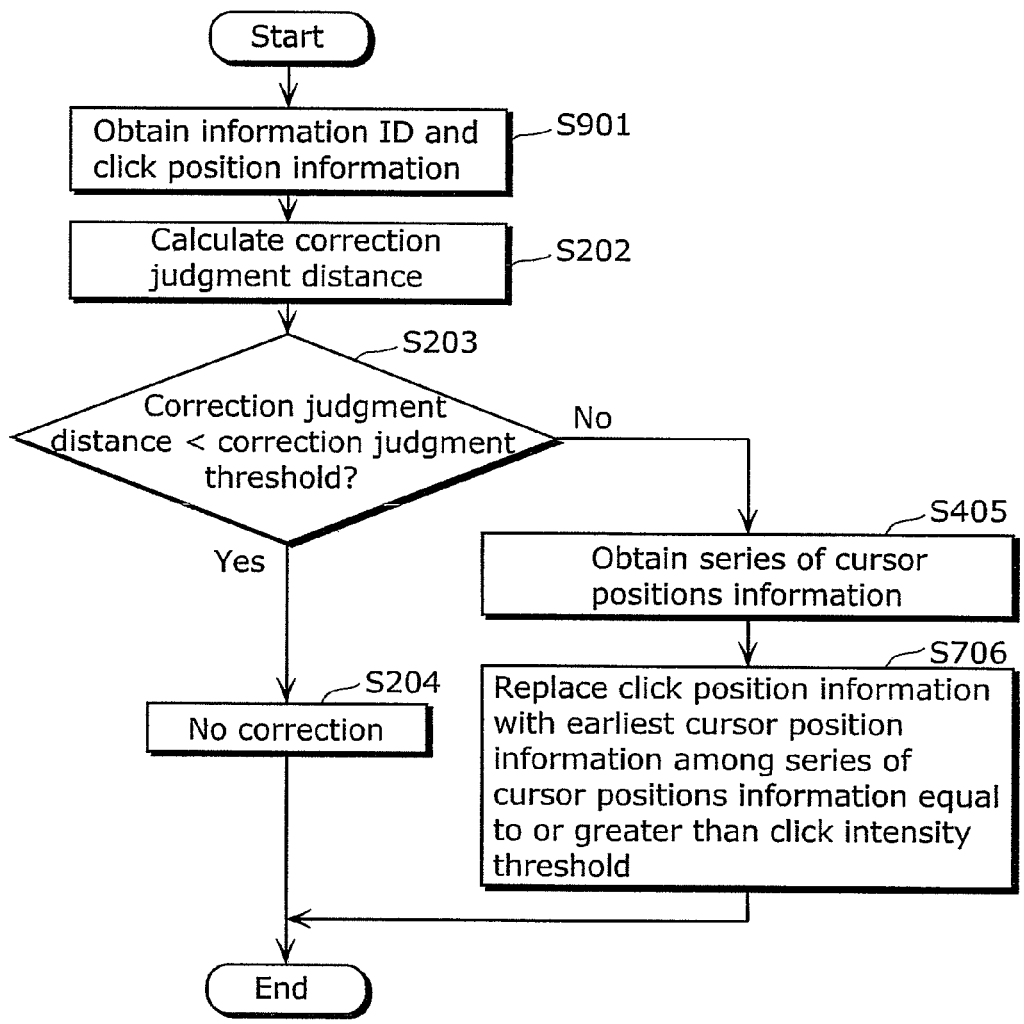
FIG. 48 is a flowchart illustrating an example of a method for correcting click position information performed by a correcting unit in the fourth variation of the fourth embodiment of the present invention.

FIG. 48 is a flowchart illustrating an example of a method for correcting click position information performed by the correcting unit 3304 in the fourth variation of the fourth embodiment of the present invention. In FIG. 48, the same operations as those in FIGS. 21 and 30 are given the same reference numerals and description of those operations will be omitted.

As illustrated in FIG. 48, the correcting unit 3304 first obtains click position information including an information ID 1901 (step S901). Specifically, like the correcting unit 1804 according to the third embodiment illustrated in FIG. 30, the correcting unit 3304 is provided with click position information including an information ID 1901 from the click position information generating unit 3303 when a user clicks a left clickable touch sensor 3205L or a right clickable touch sensor 3205R.

The rest of the process is the same as the process performed by the correcting unit 804 according to the third variation of the second embodiment illustrated in FIG. 21. However, the correcting unit 3304 according to the fourth variation of the fourth embodiment uses information associated with the same information ID 1901 as the provided information ID 1901 to perform the rest of the process (step S202 to step S706).

The process described above and illustrated in FIG. 48 will be described using specific exemplary values.

Note that a case will be described in which an information ID 1901 of "right", a correction reference point 1701 of (960, 0), and click position information indicating a click position 1702 of (660, 300), as shown in the second row of FIG. 26 is provided. Here, because the information ID associated with the click position information is "right", the correcting unit 3304 uses a correction judgment threshold 2002 of (300) that is associated with the information ID 1901 and a click intensity threshold 3502 of (60) as illustrated in FIG. 47.

A correction judgment distance 1706 of (420) is yielded, which is greater than the correction judgment threshold 2002 (300) (No at step S203) and therefore the correcting unit 3304 obtains series of cursor positions information 3401 (step S405).

Among the obtained series of cursor positions information 3401, cursor positions 2503 associated with an click intensity 3402 equal to or greater than the click intensity threshold 3502 (60) are (660, 300), (640, 300), and (640, 260). Since the cursor position 2503 associated with the earliest time 2502 among these cursor positions 2503 is (640, 260), the correcting unit 3304 sets cursor position information indicating the cursor position (640, 260) as corrected click position information.

As has been described above, the input device 3201 according to the fourth variation of the fourth embodiment may include the left pressure sensor 3203L and the right pressure sensor 3203R which detect click intensity, in place of the left switch 1503L and the right switch 1503R. In this case, when it is determined that the left touch sensor 1502L or the right touch sensor 1502R has been clicked, that is, when intensity detected by the left pressure sensor 3203L or the right pressure sensor 3203R is equal to or greater than a reference intensity value (for example 100), the correcting unit 3304 corrects click position information.

Specifically, the correcting unit 3304 corrects the click position information so that a corrected position is an earliest cursor position among cursor positions with intensities equal to or greater than the click intensity threshold 3502. Accordingly, the click position 1702 can be corrected to a touch position touched before occurrence of a deflection of click and therefore an operation error can be prevented.

Although the click position control apparatus and the click position control method according to the implementation of the present invention have been described based on the embodiments, the present invention is not limited to the embodiments. Modifications resulting from various modifications to the respective embodiments that can be conceived by those skilled in the art and modifications realized by arbitrarily combining the constituent elements and functions of the respective embodiments without materially departing from the teachings of the present invention are intended to be included in the scope of the present invention.

Figure 49:
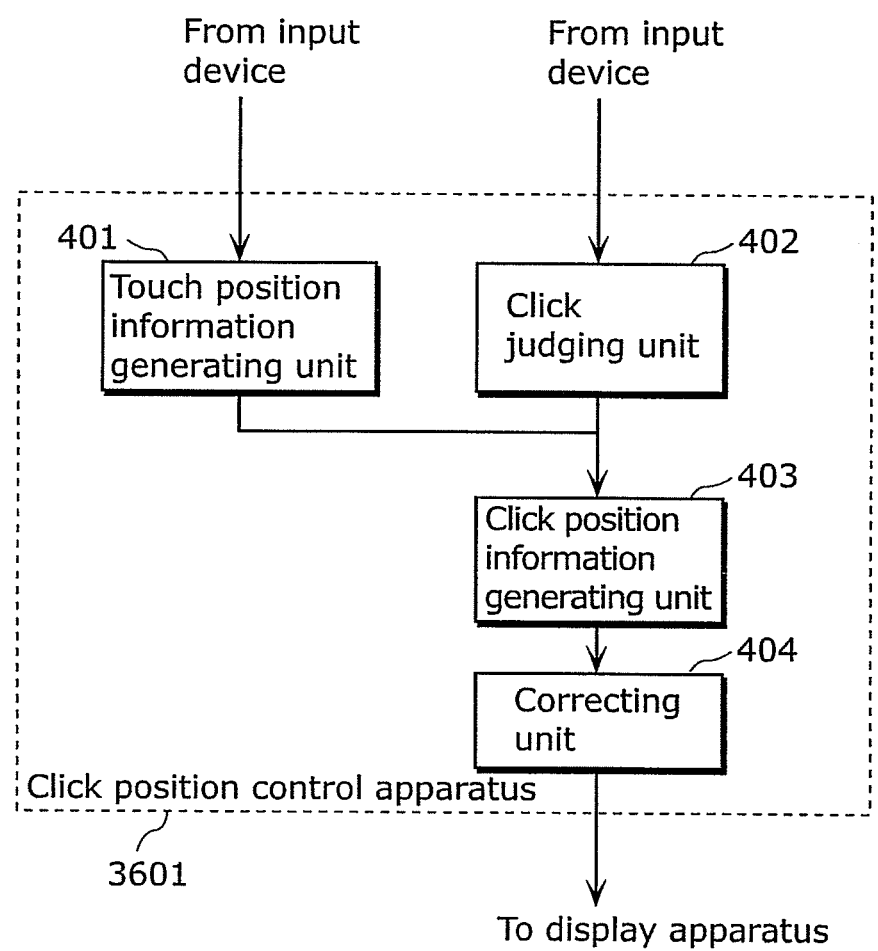
FIG. 49 is a block diagram illustrating an exemplary configuration of a click position control apparatus in a variation of an embodiment of the present invention.

For example a click position control apparatus according to the present invention may include only a touch position information generating unit 401, a click judging unit 402, a click position information generating unit 403, and a correcting unit 404, like a click position control apparatus 3601 illustrated in FIG. 49. In FIG. 49, the same components as those in FIG. 4A are given the same reference numerals.

With this configuration, correction is made based on a positional relationship between a predetermined reference position and a click position and therefore an operation history or the like does not need to be stored for each individual user and operation errors can be prevented without needing an operation history.

While click position control apparatuses according to the present invention that are provided in a display apparatus have been described, the click position control apparatuses may be provided in an input device. In that case, preferably a click position is corrected on the basis of a touch position represented in a coordinate system of a touch sensor, rather than a cursor position represented in a coordinate system of a display screen.

It is to be noted that, as stated above, the present invention can be realized not only as the click position control apparatus and the click position control apparatus but also as the program causing the computer to execute the click position control apparatus according to this embodiment. Moreover, the present invention may be realized as a program causing a computer to execute the steps. Furthermore, the present invention may be realized as the computer-readable recording medium having the program recorded thereon such as the CD-ROM (Compact Disc-Read Only Memory) as well as the information, data, or signals indicating the program. The program, information, data, and signals may be distributed via the communication network such as the Internet.

Moreover, in the present invention, the part or all of the constituent elements included in each of the click position control apparatuses may be included in the one system large scale integration (LSI). The system LSI is the super-multi-functional LSI manufactured by integrating the constituent elements on the one chip and is, specifically, the computer system including the micro processing unit, the ROM, the RAM (Random Access Memory), and so on.

All of the numerals used in the foregoing are given as examples for specifically explaining the present invention and the present invention is not limited to those numerals. Connections between components are given as examples for specifically explaining the present invention and connections that implement functions of the present invention are not limited to those connections

INDUSTRIAL APPLICABILITY

A click position control apparatus according to the present invention has the effect of preventing operation errors in click operations on a remote control including a clickable touch sensor without needing an operation history and can be used in a system such as an input system including a clickable touch sensor.

REFERENCE SIGNS LIST 101, 1101, 1501, 3201 Input device
102 Touch sensor
103 Switch
104 Finger
105, 1105 Clickable touch sensor
106 Enclosure
201, 601, 1201, 1601, 2201, 2401, 3101, 3301 Display apparatus
202 Display screen
203 Cursor
204 Object
301, 1701 Correction reference point
302, 1702 Click position
303 Correction direction
304, 1704 Corrected position
305, 1001, 1705, 2902 Correction distance
306, 1706 Correction judgment distance
401, 1801 Touch position information generating unit
402, 1202, 1802, 3302 Click judging unit
403, 803, 1203, 1803, 3303 Click position information generating unit
404, 804, 1204, 1804, 2604, 3304 Correcting unit
405, 805, 1205, 1805, 2605, 3305 Cursor position determining unit
406 Object position storage unit
407 Object selection determining unit
408, 1808 Cursor display control unit
409 Object display control unit
410 Screen display control unit
441 Correction reference point storage unit
442 Correction judgment threshold storage unit
443 Correction value storage unit
444 Correction calculating unit
445 Click position information calculating unit
501, 2002, 2302 Correction judgment threshold
605 Cursor trajectory
701, 1301, 2501, 3401 Series of cursor positions information
702, 2502 Time
703, 2503 Cursor position
811, 1211, 2611, 3311 Series of cursor positions storage unit
901, 2702 Correction amount of time
1103 Pressure sensor
1302, 3402 Click intensity
1401, 3502 Click intensity threshold
1502L Left touch sensor
1502R Right touch sensor
1503L Left switch
1503R Right switch
1504L Left finger
1504R Right finger
1505L, 3205L Left clickable touch sensor
1505R, 3205R Right clickable touch sensor
1511 Acceleration sensor
1512 Grip sensor
1603L Left cursor
1603R Right cursor
1701L Left correction reference point
1701R Right correction reference point
1702L Left click position
1702R Right click position
1703L Left correction direction
1703R Right correction direction
1704L Left corrected position
1704R Right corrected position
1705L Left correction distance
1705R Right correction distance
1706L Left correction judgment distance
1706R Right correction judgment distance
1812 Grip information generating unit
1813 Correction information storage unit
1814, 2214 Correction information determining unit
1901 Information ID
2001, 2101, 2301, 2701, 2801, 2901, 3001, 3501 Correction information
2215 User information storage unit
2405L Left cursor trajectory
2405R Right cursor trajectory
3203L Left pressure sensor
3203R Right pressure sensor
3601 Click position control apparatus

The invention claimed is:

1. A click position control apparatus that controls a click position on a touch sensor clicked by a user when the user operates an input device including a clickable touch sensor including the touch sensor and a click detecting unit which is disposed under the touch sensor and is pressed when the user clicks the touch sensor, said click position control apparatus comprising:

a touch position information generating unit configured to generate touch position information indicating a position on the touch sensor touched by the user;

a click judging unit configured to detect a click on the click detecting unit;

a click position information generating unit configured to generate click position information indicating a click position by using the touch position information when said click judging unit detects the click on the click detecting unit, the click position being a position at which the click detecting unit is pressed; and a correcting unit configured to correct the click position information on the basis of a positional relationship between at least one reference position previously fixed on the input device and the click position, the reference position being indicated in predetermined correction information, wherein the reference position is determined based on a position at which a hand of the user is in contact with the input device in a posture of the user holding the input device, the correction information further indicates a predetermined distance threshold, said correcting unit is configured to correct the click position information when a distance between the reference position and the click position is equal to or greater than the distance threshold, the touch position information further indicates a time at which the user has touched the touch sensor, said click position control apparatus further comprises a storage unit configured to store a plurality of pieces of touch position information including the touch position information, said correcting unit is configured to correct the click position information with reference to the pieces of touch position information stored in said storage unit, the click detecting unit is a pressure sensor which detects an intensity of a click on the touch sensor by the user, the correction information further indicates a predetermined correction intensity, said click judging unit is configured to:
generate intensity information indicating an intensity obtained from the pressure sensor; and
detect the click on the click detecting unit when the intensity obtained from the pressure sensor is equal to or greater than a predetermined reference intensity value, said storage unit is further configured to store the intensity information and the touch position information in association with each other, and said correcting unit is configured to correct the click position information with reference to a plurality of pieces of intensity information and the pieces of touch position information stored in said storage unit so that the corrected click position is a position indicated in the touch position information associated with the intensity information indicating the intensity equal to or greater than the correction intensity, the pieces of intensity information including the intensity information.

2. The click position control apparatus according to claim 1, wherein the click detecting unit is a pressure sensor which detects an intensity of a click on the touch sensor by the user, and said click judging unit is configured to detect the click on the click detecting unit when an intensity obtained from the pressure sensor is equal to or greater than a predetermined reference intensity value.

3. The click position control apparatus according to claim 1, further comprising:

a grip information generating unit configured to generate grip information indicating how the user is holding the input device;

a correction information storage unit configured to store a plurality of pieces of correction information including the correction information; and a selecting unit configured to select one of the pieces of correction information on the basis of the grip information, wherein said correcting unit is configured to correct the click position information using the correction information selected by said selecting unit.

4. The click position control apparatus according to claim 3, further comprising a user information storage unit configured to store user information indicating a characteristic of the user, wherein said selecting unit is further configured to correct the selected correction information on the basis of the user information, and said correcting unit is configured to correct the click position information using the correction information corrected by said selecting unit.

5. The click position control apparatus according to claim 3, wherein the grip information is information indicating that the input device is being held by a left hand, a right hand or both hands of the user.

6. The click position control apparatus according to claim 3, wherein the grip information is information indicating a position at which a hand of the user is in contact with the input device.

7. The click position control apparatus according to claim 3, wherein the grip information is information indicating an orientation of the input device.

8. The click position control apparatus according to claim 1, wherein the reference position is a position on the clickable touch sensor or on a perimeter of the clickable touch sensor.

9. The click position control apparatus according to claim 1, wherein the reference position is a position at which a base of a finger operating the clickable touch sensor is located.

10. The click position control apparatus according to claim 1, wherein the correction information further indicates a predetermined correction distance, and said correcting unit is configured to correct the click position information so that the corrected click position is a position at the correction distance from the click position and in a direction from the reference position toward the click position.

11. The click position control apparatus according to claim 1, wherein the click position information further indicates a time at which the click detecting unit is pressed, the correction information further indicates a predetermined correction amount of time, and said correcting unit is configured to correct the click position information with reference to the pieces of touch position information stored in said storage unit so that the corrected click position is a position indicated in one of the pieces of touch position information which indicates a time which precedes the time indicated in the click position information by the correction amount of time.

12. The click position control apparatus according to claim 1, wherein the correction information further indicates a predetermined correction distance, and said correcting unit is configured to correct the click position information so that the corrected click position is, among positions indicated in the pieces of touch position information stored in said storage unit, a position closest to a position at the correction distance from the click position indicated in the click position information.

13. The click position control apparatus according to claim 12, wherein said correcting unit is configured to correct the click position information so that the corrected click position is, among the positions indicated in the pieces of touch position information stored in said storage unit, a position closest to a position at the correction distance from the click position indicated in the click position information along a trajectory of the touch position information.

14. A click position control method for controlling a click position on a touch sensor clicked by a user when the user operates an input device including a clickable touch sensor including a touch sensor and a click detecting unit which is disposed under the touch sensor and is pressed when the user clicks the touch sensor, said click position control method comprising:
   generating touch position information indicating a position on the touch sensor touched by the user;
   detecting a click on the click detecting unit;
   generating click position information indicating a click position by using the touch position information when the click on the click detecting unit is detected in said detecting, the click position being a position at which the click detecting unit is pressed; and
   correcting the click position information on the basis of a positional relationship between at least one reference position previously fixed on the input device and the click position, the reference position being indicated in predetermined correction information,
   wherein the reference position is determined based on a position at which a hand of the user is in contact with the input device in a posture of the user holding the input device,
   the correction information further indicates a predetermined distance threshold,
   the click position information is corrected when a distance between the reference position and the click position is equal to or greater than the distance threshold,
   the touch position information further indicates a time at which the user has touched the touch sensor,
   a plurality of pieces of touch position information including the touch position information are stored in a storage unit,
   the click position information is corrected with reference to the pieces of touch position information stored in the storage unit,
   the click detecting unit is a pressure sensor which detects an intensity of a click on the touch sensor by the user,
   the correction information further indicates a predetermined correction intensity,
   said detecting a click on the click detecting unit includes:
      generating intensity information indicating an intensity obtained from the pressure sensor; and
      detecting the click on the click detecting unit when the intensity obtained from the pressure sensor is equal to or greater than a predetermined reference intensity value,
   the intensity information and the touch position information are stored in the storage unit in association with each other, and
   said correcting unit is configured to correct the click position information is corrected with reference to a plurality of pieces of intensity information and the pieces of touch position information stored in the storage unit so that the corrected click position is a position indicated in the touch position information associated with the intensity information indicating the intensity equal to or greater than the correction intensity, the pieces of intensity information including the intensity information.

15. An integrated circuit that controls a click position on a touch sensor clicked by a user when the user operates an input device including a clickable touch sensor including a touch sensor and a click detecting unit which is disposed under the touch sensor and is pressed when the user clicks the touch sensor, said integrated circuit comprising:
   a touch position information generating unit configured to generate touch position information indicating a position on the touch sensor touched by the user;
   a click judging unit configured to detect a click on the click detecting unit;
   a click position information generating unit configured to generate click position information indicating a click position by using the touch position information when said click judging unit detects the click on the click detecting unit, the click position being a position at which the click detecting unit is pressed; and
   a correcting unit configured to correct the click position information on the basis of a positional relationship between at least one reference position previously fixed on the input device and the click position, the reference position being indicated in predetermined correction information,
   wherein the reference position is determined based on a position at which a hand of the user is in contact with the input device in a posture of the user holding the input device,
   the correction information further indicates a predetermined distance threshold,
   said correcting unit is configured to correct the click position information when a distance between the reference position and the click position is equal to or greater than the distance threshold,
   the touch position information further indicates a time at which the user has touched the touch sensor,
   said click position control apparatus further comprises a storage unit configured to store a plurality of pieces of touch position information including the touch position information,
   said correcting unit is configured to correct the click position information with reference to the pieces of touch position information stored in said storage unit,
   the click detecting unit is a pressure sensor which detects an intensity of a click on the touch sensor by the user,
   the correction information further indicates a predetermined correction intensity,
   said click judging unit is configured to:
      generate intensity information indicating an intensity obtained from the pressure sensor; and
      detect the click on the click detecting unit when the intensity obtained from the pressure sensor is equal to or greater than a predetermined reference intensity value,
   said storage unit is further configured to store the intensity information and the touch position information in association with each other, and
   said correcting unit is configured to correct the click position information with reference to a plurality of pieces of intensity information and the pieces of touch position information stored in said storage unit so that the corrected click position is a position indicated in the touch position information associated with the intensity information indicating the intensity equal to or greater than the correction intensity, the pieces of intensity information including the intensity information.

16. A non-transitory computer-readable recording medium having a computer program recorded thereon for causing a computer to execute a click position control method for controlling a click position on a touch sensor clicked by a user when the user operates an input device including a clickable touch sensor including a touch sensor and a click detecting unit which is disposed under the touch sensor and is pressed when the user clicks the touch sensor, the click position control method comprising:

generating touch position information indicating a position on the touch sensor touched by the user;
detecting a click on the click detecting unit;
generating click position information indicating a click position by using the touch position information when said click judging unit detects the click on the click detecting unit, the click position being a position at which the click detecting unit is pressed; and
correcting the click position information on the basis of a positional relationship between at least one reference position previously fixed on the input device and the click position, the reference position being indicated in predetermined correction information,
wherein the reference position is determined based on a position at which a hand of the user is in contact with the input device in a posture of the user holding the input device,
the correction information further indicates a predetermined distance threshold,
the click position information is corrected when a distance between the reference position and the click position is equal to or greater than the distance threshold,
the touch position information further indicates a time at which the user has touched the touch sensor,
a plurality of pieces of touch position information including the touch position information are stored in a storage unit,
the click position information is corrected with reference to the pieces of touch position information stored in the storage unit,
the click detecting unit is a pressure sensor which detects an intensity of a click on the touch sensor by the user,
the correction information further indicates a predetermined correction intensity,
said detecting a click on the click detecting unit includes:
generating intensity information indicating an intensity obtained from the pressure sensor; and
detecting the click on the click detecting unit when the intensity obtained from the pressure sensor is equal to or greater than a predetermined reference intensity value,
the intensity information and the touch position information are stored in the storage unit in association with each other, and
said correcting unit is configured to correct the click position information is corrected with reference to a plurality of pieces of intensity information and the pieces of touch position information stored in the storage unit so that the corrected click position is a position indicated in the touch position information associated with the intensity information indicating the intensity equal to or greater than the correction intensity, the pieces of intensity information including the intensity information.

17. A touch sensor system comprising:
an input device which includes a clickable touch sensor; and
a click position control apparatus which controls a click position on a touch sensor clicked by a user when the user operates said input device,
wherein said clickable touch sensor includes:
said touch sensor; and
a click detecting unit which is disposed under said touch sensor and is pressed when the user clicks said touch sensor;
said click position control apparatus includes:
a touch position information generating unit configured to generate touch position information indicating a position on said touch sensor touched by the user;
a click judging unit configured to detect a click on said click detecting unit;
a click position information generating unit configured to generate click position information indicating a click position by using the touch position information when said click judging unit detects the click on said click detecting unit, the click position being a position at which said click detecting unit is pressed; and
a correcting unit configured to correct the click position information on the basis of a positional relationship between at least one reference position previously fixed on said input device and the click position, the reference position being indicated in predetermined correction information,
wherein the reference position is determined based on a position at which a hand of the user is in contact with said input device in a posture of the user holding said input device,
the correction information further indicates a predetermined distance threshold,
said correcting unit is configured to correct the click position information when a distance between the reference position and the click position is equal to or greater than the distance threshold,
the touch position information further indicates a time at which the user has touched the touch sensor,
said click position control apparatus further comprises a storage unit configured to store a plurality of pieces of touch position information including the touch position information,
said correcting unit is configured to correct the click position information with reference to the pieces of touch position information stored in said storage unit,
the click detecting unit is a pressure sensor which detects an intensity of a click on the touch sensor by the user,
the correction information further indicates a predetermined correction intensity,
said click judging unit is configured to:
generate intensity information indicating an intensity obtained from the pressure sensor; and
detect the click on the click detecting unit when the intensity obtained from the pressure sensor is equal to or greater than a predetermined reference intensity value,
said storage unit is further configured to store the intensity information and the touch position information in association with each other, and
said correcting unit is configured to correct the click position information with reference to a plurality of pieces of intensity information and the pieces of touch position information stored in said storage unit so that the corrected click position is a position indicated in the touch position information associated with the intensity information indicating the intensity equal to or greater than the correction intensity, the pieces of intensity information including the intensity information.

* * * * *